(12) United States Patent
Nagumo et al.

(10) Patent No.: US 6,400,768 B1
(45) Date of Patent: Jun. 4, 2002

(54) PICTURE ENCODING APPARATUS, PICTURE ENCODING METHOD, PICTURE DECODING APPARATUS, PICTURE DECODING METHOD AND PRESENTATION MEDIUM

(75) Inventors: Takefumi Nagumo, Tokyo; Teruhiko Suzuki, Chiba; Yoichi Yagasaki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/334,853

(22) Filed: Jun. 17, 1999

(30) Foreign Application Priority Data

Jun. 19, 1998 (JP) .............................. 10-173499

(51) Int. Cl.$^7$ ................................ H04N 1/41
(52) U.S. Cl. ................ 375/240.8; 375/240.11
(58) Field of Search .............. 375/240, 240.8, 375/240.11; 382/240, 233

(56) References Cited

U.S. PATENT DOCUMENTS

| 5,784,494 A | * | 7/1998 | Strongin et al. | ............. 382/233 |
| 6,072,831 A | * | 6/2000 | Chen | ......................... 375/240 |
| 6,075,576 A | * | 6/2000 | Tan et al. | ................. 348/845.3 |

FOREIGN PATENT DOCUMENTS

| EP | EP 0 914 007 | 5/1999 |
| WO | WO 98 02003 | 1/1998 |

OTHER PUBLICATIONS

ISO/IEC AD HOC Group On MPEG–4 Video VM Editing: "MPEG–4 Video Verification Model Version 13.0 ISO/IEC JTC1/sc29/WG11 MPEG97/N2687" International Organization for Standardization–Organisation Internationale De Normalisation, XX, XX, Mar. 1999 (1999–03), pp. 1–347, XP002177336.

ISO/IEC AD HOC Group On MPEG–4 Video VM Editing: "MPEG–4 Video Verification Model Version 8.0 ISO/IEC JTC1/sc29/WG11 MPEG97/N1796" International Organization For Standardization–Organisation Internationale De Normalisation, XX, XX, Jul. 1997 (1997–07), pp. 1–283, XP002177337.

"Transmission of non–telephone signals. Information Technology–Generic Coding of moving pictures and associated audio information: video" ITU–T Telecommunication Standardization Sector of ITU, XX, XX, Jul. 1, 1995 (1995–07–01), pp. A–B, I–VIII, 1, XP000198491.

\* cited by examiner

Primary Examiner—Chris Kelley
Assistant Examiner—George A Bugg
(74) Attorney, Agent, or Firm—Frommer Lawrence & Haug LLP; William S. Frommer

(57) ABSTRACT

A picture encoding apparatus, a picture encoding method, a picture decoding method and a presentation medium capable of making efficient random accesses at a high speed. The picture encoding apparatus for encoding a picture and outputting an encoded bitstream obtained as a result of encoding said picture comprises a hierarchy forming means for converting a sequence of objects composing said picture into a hierarchy comprising two or more hierarchical layers, a first encoding means for encoding a first hierarchical layer of said sequence of objects output by said hierarchy forming means by dividing said first hierarchical layer into a plurality of groups, and a second encoding means for encoding a second hierarchical layer of said sequence of objects output by said hierarchy forming means by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

30 Claims, 52 Drawing Sheets

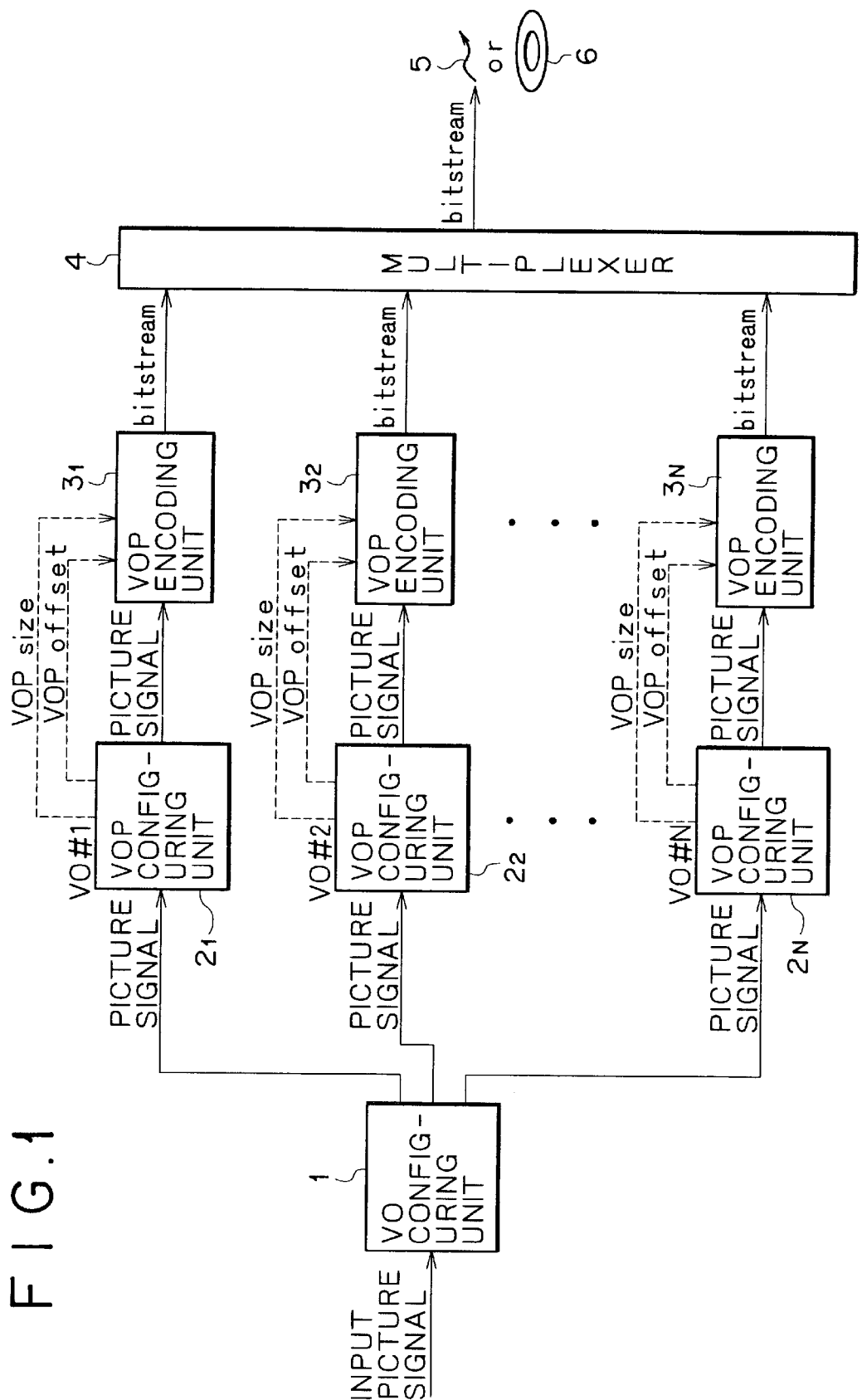

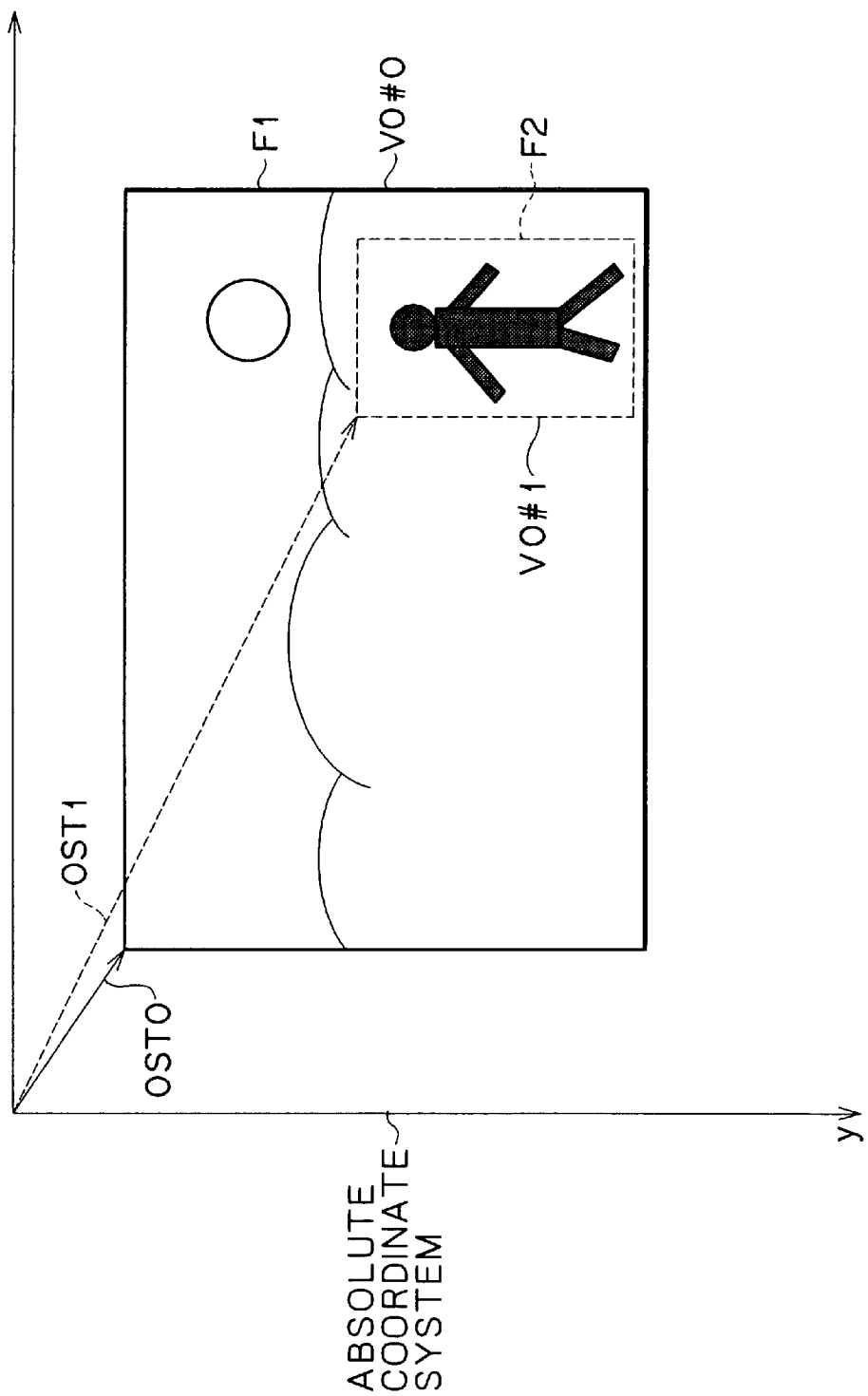

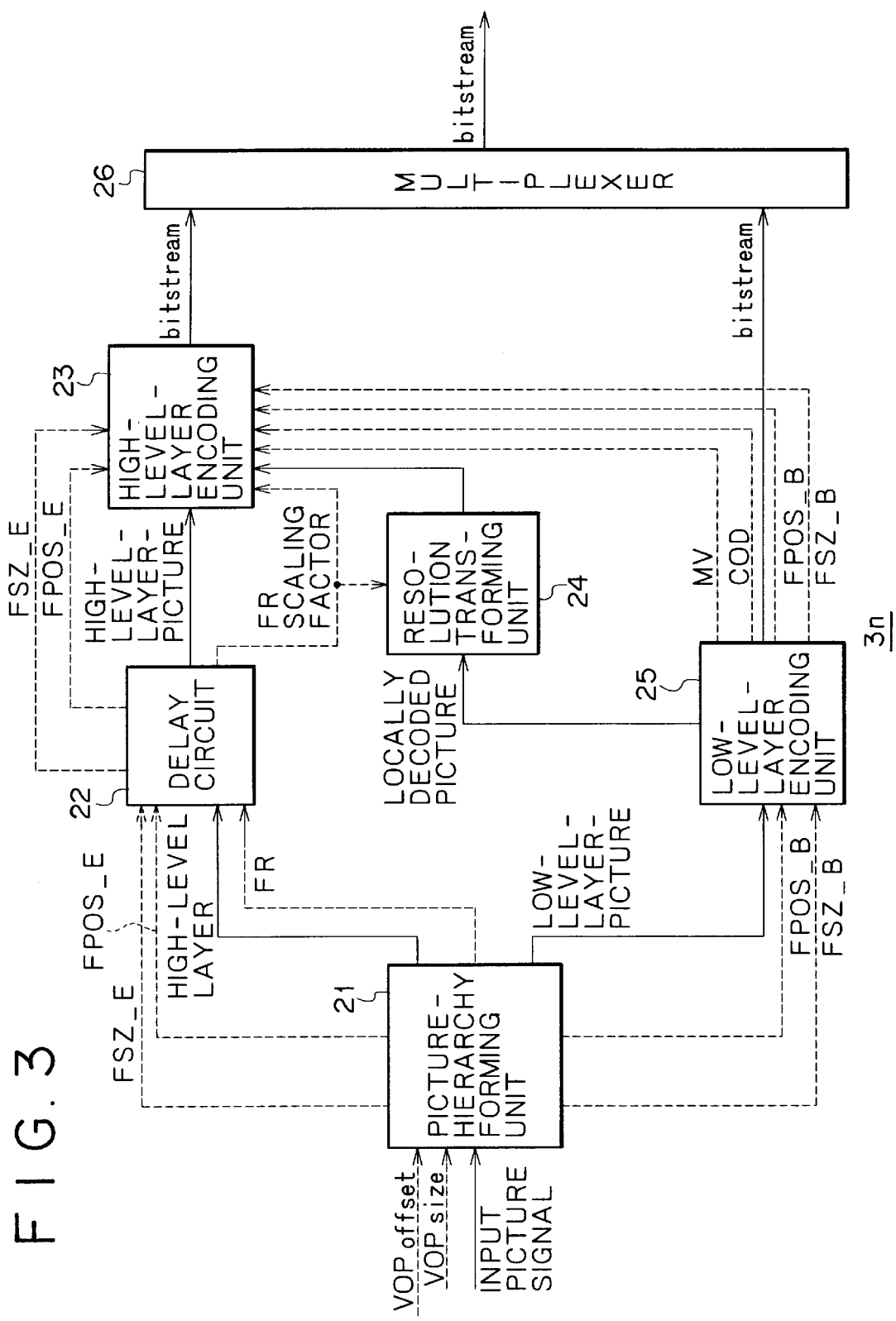

F I G. 4A
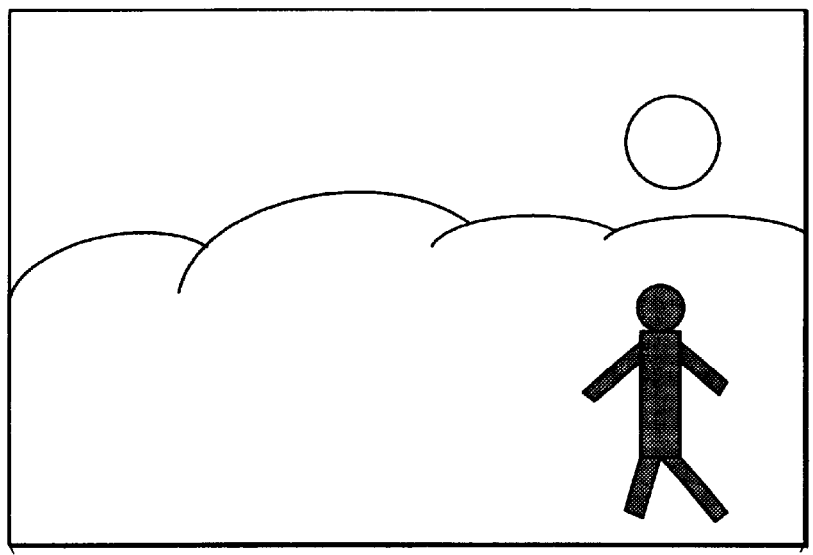
Enhancement Layer
(HIGH-LEVEL LAYER)
F I G. 4B
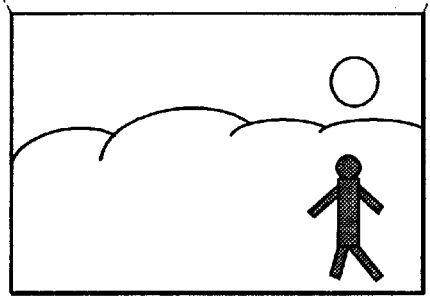
Base Layer
(LOW-LEVEL LAYER)

Enhancement Layer

Base Layer

Enhancement Layer

Base Layer

Enhancement Layer

Base Layer

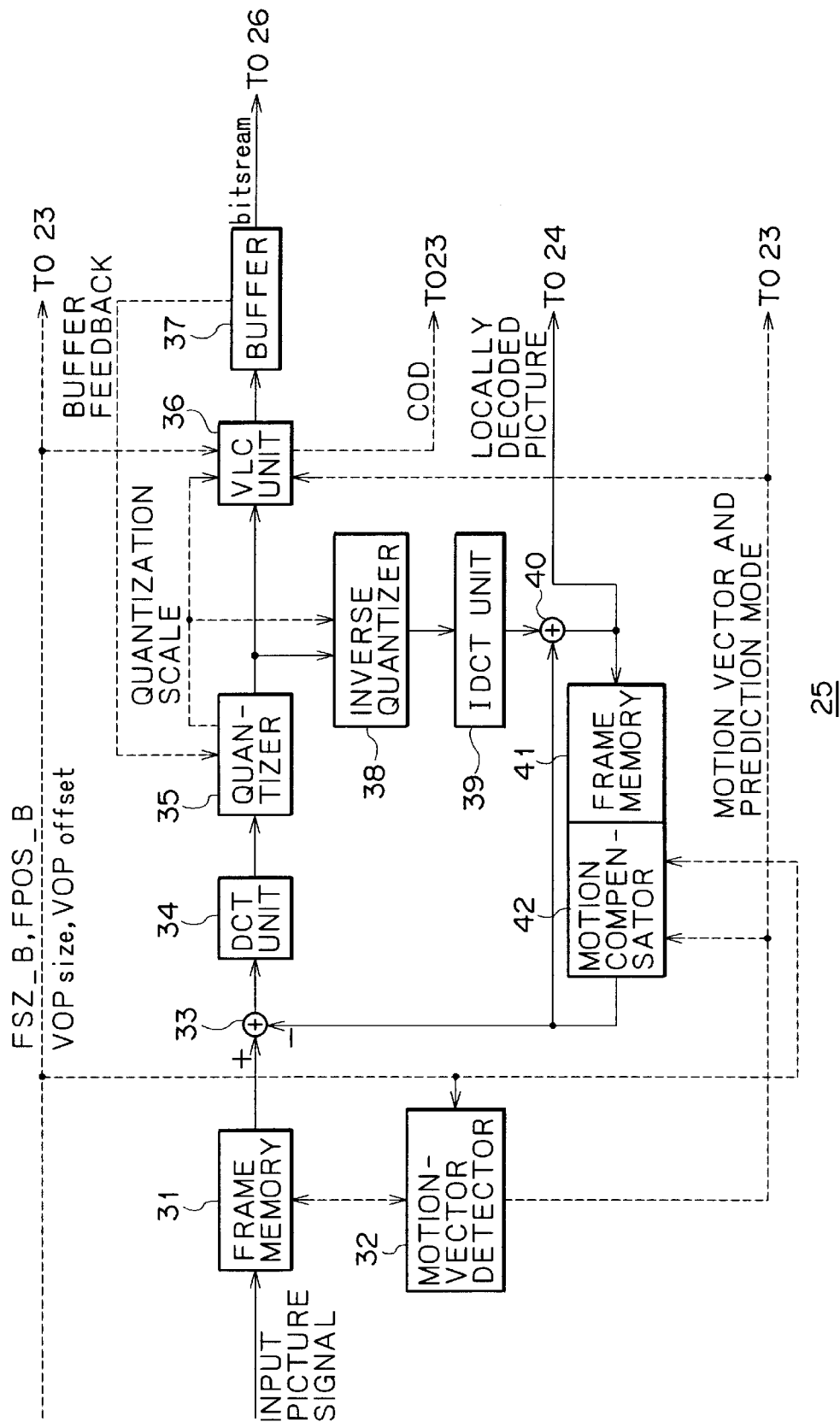

F I G. 11A  Enhancement Layer (HIGH-LEVEL LAYER)

F I G. 11B  Base Layer (LOW-LEVEL LAYER)

F I G.18

Video Session Class

| Syntax | No. of bits | Mnemonic |
|---|---|---|
| VideoSession (){ | | |
|     video_session_start_code | sc+8=32 | |
|     do* | | |
|         VideoObject () | | |
|     }while(nextbits_bytealigned ()==video_object_start_code) | | |
|     next_start_code () | | |
|     video_session_end_code | sc+8=32 | |
| } | | |

*concurrent loop solution to be provided by MSDL.

sc

This code is intended to be used in combination with additional bits, for the purpose of the synchronization. Its binary representation is 23 zeros followed by a 1 (00000000000000000000001), or its hexadecimal representation is '000001'.

video_session_start_code

This code cannot be emulated by any combination of other valid bits in the bistream, and is user for synchronization purpose. Its value is that of the sc followed by 'B0' in hexadecimal.

video_session_end_code

This code cannot be emulated by any combination of other valid bits in the bitstream, and is used for synchronization purpose. Its value is that of the sc followed by 'B1' in hexadecimal. video_session_end_code resets all data relative to VOPs. In other words, different session are treated completely independently.

F I G. 19

Video Object Class
Video Object

| Syntax | No. of bits | Mnemonic |
|---|---|---|
| VideoObject () | | |
|     video_object_start_code | sc+3=27 | |
|     video_object_id | 5 | |
|     do{ | | |
|         VideoObjectLayer () | | |
|     }while(nextbits_bytealigned ()==video_object_layer_start_code) | | |
|     do{ | | |
|         textureObjectLayer () | | |
|     }while(nextbits_bytealigned ()==video_object_layer_start_code) | | |
|     next_start_code () | | |
| } | | | video_object_start_code

This is a unique code of length 27 bits(sc+3) that proceeds the video_object_id.

video_object_id

This is a 5-bit code which identifies a video object in a scene being processed.

FIG. 20

Video Object Layer Class
Video Object Layer

| Syntax | No. of bits | Mnemonic |
|---|---|---|
| VideoObjectLayer (){ | | |
|   video_object_layer_start_code | sc+4=28 | |
|   video_object_layer_id | 4 | |
|   video_object_layer_shape | 2 | |
|   if(video_object_layer_shape== '00'){ | | |
|     video_object_layer_width | 13 | |
|     video_object_layer_height | 13 | |
|   } | | |
|   not_8_bit | 1 | |
|   obmc_disable | 1 | |
|   if(not_8_bit) { | | |
|     quant_precision | 4 | |
|     bits_per_pixcel | 4 | |
|   } | | |
|   video_object_layer_shape_effects | 4 | |
|   if(video_object_layer_shape_effects== '0001' | | |
|   \|\| video_object_layer_shape_effects== '0011' | | |
|   \|\| video_object_layer_shape_effects== '0100' | | |
|   \|\| video_object_layer_shape_effects== '0101' ) | | |
|     video_object_layer_feather_dist | 3 | |
|   if(video_object_layer_shape_effects== '0100' | | |
|   \|\| video_object_layer_shape_effects== '0101' ) { | | |
|     for(i=0;i<video_object_layer_feather_dist; i++) | | |
|       feathering_filter () | 8*15 | |
|   } | | |
|   video_object_layer_sprite_usage | 2 | |
|   if(video_object_layer_sprite_usage !=SPRITE_NOT_USED){ | | |

F I G. 2 1

```
        if(video_object_layer_sprite_usage==STATIC SPRITE
        || video_object_layer_sprite_usage_==ON_LINE_SRITE) {
            sprite_hdim                                          13
            sprite_vdim                                          13
        }
        if(video_object_layer_sprite_usage==STATIC_SPRITE
        || video_object_layer_sprite_usage==ON_LINE_SPRITE){
            sprite_Left_Edge                                     13
            sprite_Top_Edge                                      13
        }
        no_of_sprite_points                                       6
        warpting_accuracy                                         2
        lighting_change_in_sprite                                 1
    }
    inter_mp_enable                                               1
    if(video_object_layer_shape!='00')
        sadct_disable                                             1
    video_object_layer_quant_type                                 1 if(video_object_layer_quant_type) {
        load_intra_quant_mat                                      1
        if(load_intra_quant_mat) {
            i=0;
            do
                intra_quant_mat[i]                                8
            while(intra_quant_mati[i]!=0
                && ++i<64);
            for(j=i; j<64; j++)
                intra_quant_mat[j]=
                        intra_quant_mat [i-1];
        }
        load_nonintra_quant_mat                                   1
        if(load_nonintra_quant_mat) {
            i=0;
            do
                nonintra_quant_mat[i]                             8
```

FIG. 22

```
        while(nonintra_quant_mat[i] !=0
                && ++i <64);
        for(j=i; j<64;j++)
                nonintra_quant_mat[j] =
                        nonintra_quant_mat[I-1];
  }
  if(video_object_layer_shape== '10' ) {
        disable_gray_quant_update                    1
        load_gray_intra_quant_mat                    1
        if(load_gray_intra_quant_mat)
                i=0;
                do
                gray_intra_quant_mat[i]              8
                while(gray_intra_quant_mat[i]!=0
                        && ++i <64);
                for(j=i; j<64; j++)
                        gray_intra_quant_mat [j] =
                                gray_intra_quant_mat [i-1];
        }
        load_gray_nonintra_quant_mat                 1
        if(load_gray_nonintra_quant_mat) {
                i=0;
                do
                gray_nonintra_quant_mat [i]          8
                                             while
(gray_nonintra_quant_mat [i] i=0
                && ++i <64);
        for(j=I ;j<64; j++)
                gray_nonintra_quant_mat [j]=
                        gray_nonintra_quant_mat[i-1];
        }
    }
    quant_smaple                                     1
 }
Complexity_estimation_disable                        1
if(Complexity_estimation_disable){
```

FIG. 23

```
Parameter_list                              8
Estimation_method                           2
if(Estimation_method== '00'){
   INTRA                                    1
    INTRA+Q                                 1
    INTER                                   1
    INTER4V                                 1
   INTRA+Q                                  1
    INTERPOLATE MC+Q                        1
    FORWARD MC+Q                            1
    BACKWARD MC+Q                           1
    H.263 PB DIRECT                         1
   Not Coded                                1
   Zig-zag_DCT_coeff                        1
    Half_pel_advanced_prediction            1
    Half_pel_normal_pred                    1
    VLC_symbol                              1
    Scalability_parameters {
      t.b.d.......                          1
    }
    Scalability_parameters {
      t.b.d.......                          1
    }
    Sprite_coding_parameters {
      t.b.d.......                          1
    }
  }
  if(Estimation_method== 'xx'){
       t.b.d.......
  }
}
error_resilient_disable                     1
if(!error_resilient_disable) {
    data_partitioning                       1
    reversible_VLC                          1
    newpred_enable                          1
```

FIG. 24

```
    if(newpred_enable)
        newpred_mode_flag                               2
}
intra_acdc_pred_disable                                 1
separate_motion_shape_texture                           1
    if(video_object_layer_sprite_usage==STATIC_SPRITE) {
        encodeSpritePiece ()
}
Scalability                                             1
if(scalability) {
    ref_layer_id                                        4
    ref_layer_sampling_direc                            1
    hor_sampling_factor_n                               5
    hor_sampling_factor_m                               5
    ver_sampling_factor_n                               5
    ver_sampling_factor_m                               5
    enhancement_type                                    1
}
do{
    VideoObjectPlane ()
}while(nextbits_bytealigned ()==video_object_plane_start_code)
next_start_code ()
}
``` video_object_layer_start_code

This is a unique code of length 28 bits (sc+4) that proceeds the video_object_layer_id.

video_object_layer_id

This is a 4-bit code which identifies a video object layer for a video object being processed.

video_object_layer_shape

This is a 2-bit code which identifies the shape type of video object layer as shown in Table 16.

| video_object_layer_shape | Code |
|---|---|
| rectangular | 00 |
| binary | 01 |
| gray-scale | 10 |
| Binary-shape-only | 11 |

Table 16 Video Object Lyer shape types

FIG. 25

This flag is "00" if a VOL shape is rectangular, "01" if a VOL has
a binary shape (i.e. if each pixel of the rectangle defined by
video_object_layer_width and video_object_layer_height is either part of a
VOL or not), and "10" if a VOL shape is defined by grey scale data
(i.e. if each pixel of the rectangle defined by video_object_layer_width and
video_object_layer_height is to be linearly combined with the pixel of other
VOLs at the same spatial location). The flag is "11" if the VOL consists
of only binary shape and texture.
video_object_layer_width, video_object_layer_height
There two codes define the picture size for the session, in pixels unit
(zero values are forbidden).
This is also the size of the unique VOL of the session.
not_8_bit.
This one bit flag is set when the video data precision is not 8 bits per
pixel.
quant_precision
This field specifies the number of bits used to represent quantizer
parameters. Values between 3 and 9 are allowed.
When not_8_bit is zero, and therefore quant_precision is not transmitted,
it takes a default value of 5.
bits_per_pixel
This field specifies the video data precision in bits per pixel. It may take
different values for different video object layer within a single video object.
A value of 12 in this field would indicate 12 bits per pixel. This field may
take values between 4 and 12.
When not _8_ bit is zero and bits_per_pixel is not present, the video data
precision is always 8 bits per pixel, which is equivalent to specifying
a value of 8 in this field.
video_object_layer_sprite_usage
This 2-bit code is to indicate the usage of sprite coding or global motion
compensation(GMC).
0x00 means that no sprite is used in the coding. Mnemonic is
SPRITE_NOT_USED.
0x01 means that a sprite is being used directly (i.e., no prediction are
made on the basis of the sprite) to generate some or all of the VOPs in
this VOL(i.e., static sprite). The static sprite is assumed to have been transmitted
as an I-VOP with possible additional pieces transmitted in the future also
as I-VOPs and residual update pieces also transmitted as I-VOPs, but
using the quantization of Non_Intra macroblocks. Mnemonic is STATIC_SPRITE.
0x02 means that a sprite is used in predictive coding for some or all of
the VOPs in this VOL. The sprite is being constructed on-line and the
mechanism for building the sprite is on. Mnemonic is ON-LINE_SPRITE.
0x03 means that GMC is used in predictive coding for some or all of
VOPs in this VOL. GMC is an extension of on-line sprite coding where
blending factor is always 1 and the size of the sprite is just the same as
that of the reference VOP. This means that the previous reconstructed VOP
is regarded as an on_line sprite, and no additional memory for a sprite is
needed. Mnemonic is GMC.
sprite_hdim
This 13-bit field defines the horizontal dimension of the sprite.
sprite_vdim
This 13-bit field defines the vertical dimension of the sprite.
sprite_Left_Edge
This 13-bit field defines the left edge of the sprite.
sprite_Top_Edge
This 13-bit field defines the top edge of the sprite.
no_of_sprite_points

F I G. 26

Group of VOPs class
Syntax of Group of VideoObjectPlane

| group_of_VideoObjectPlane(){ | No. Of bits | Mnemonic |
|---|---|---|
| group_start_code | 32 | bslbf |
| VOP_time_increment_resolution | 15 | uimsbf |
| marker_bit | 1 | bslbf |
| time_code | 18 | bslbf |
| closed_gov | 1 | uimsbf |
| broken_link | 1 | uimsbf |
| do{ | | |
| group_of_VideoObjectPlane() | | |
| }while(nextbits_bytealingned()==group_start_code) | | |
| next_start_code() | | |
| } | | | group_start_code

The group_start_code is the unique of length of 32bit. It identifies the beginning of a GOV header.

VOP_time_increment_resolution

The VOP_time_increment_resolution is a 15bit unsigned integer that indicates the resolution of the VOP_time_increment in terms of number of ticks within one modulo time(one second in this case). The value of zero is forbidden.

Time_code

This is a 18-bit integer containing the following: time_code_hours, time_code_minutes, marker_bit and time_code_seconds as shown in Table 19. The parameters correspond to those defined in the IEC standard publication 461 for "time and control codes for video tape recorders".
The time code refers to the first plane (in display order) after the GOV header.

FIG.27

| Time_code | range of value | No. Of bits | Mnemonic |
|---|---|---|---|
| time_code_hours | 0_23 | 5 | uimsbf |
| time_code_minutes | 0_59 | 6 | uimsbf |
| marker_bit | 1 | 1 | bslbf |
| time_code_seconds | 0_59 | 6 | uimsbf |

Table 19 time code closed_gov

This is a one-bit flag which indicates the nature of the predictions used in the first consecutive B-VOPs(if any) immediately following the first coded I-VOPs after the GOV header. The closed_gov is set to '1' to indicate that these B-VOPs have been encoded using only backward prediction or intra coding. This bit is provided for use during any editing which occurs after encoding. If the previous pictures have been removed by editing, broken_link may be set to '1' so that a decoder may avoid displaying these B-VOPs following the first I-VOP following the group of plane header. However if the closed_gov bit is set to '1', then the editor may choose not to set the broken_link bit as these B-VOPs can be correctly decoded.

Broken_link

This is a one-bit flag which shall be set to '0' during encoding.
It is set to '1' to indicate that the first consecutive B-VOPs (if any) immediately following the first coded I-VOP following the group of plane header may not be correctly decoder because the reference fame which is used for prediction is not available (because of the action of editing). A decoder may use this flag to avoid displaying frames that cannot be correctly decoded.

FIG. 28

VideoObjectPlane Class
VideoObjectPlane

| Syntax | No.of bits | Mnemonic |
|---|---|---|
| VideoObjectPlane(){ | | |
|   VOP_start_code | sc+8=32 | |
|   do{ | | |
|     modulo_time_base | 1 | |
|   }while(modulo_time_base !="0") | | |
|   VOP_time_increment | 1-15 | |
|   vop_coded | 1 | |
|   If (vop_coded= = '0' )next_start_code() | | |
|       VOP_prediction_type | 2 | |
|   if (newpred_enable){ | | |
|     vop_id | 4-15 | |
|     vop_id_for_prediction_indication | 1 | |
|     if (vop_id_for_prediction_indication) | | |
|       vop_id_for_prediction | 4-15 | |
|     marker_bit | 1 | |
|   } | | |
|   intra_dc_vlc_thr | 3 | |
|   vop_reduced_resolution | 1 | |
| if (VOP_prediction_type== "P" \|\| | | |
|     (vudeo_object_layer_sprite_usage !=STATIC_SPRITE && | | |
|       VOP_prediction_type== SPRITE)) | | |
|     VOP_rounding_type | 1 | |
| if(video_object_layer_sprite_usage !=SPRITE_NOT_USED) | | |
|   &&VOP_prediction_type==SPRITE){ | | |
| if(no_of_sprite_points>0){ | | |
|   encorde_sprite_trajectory() | | |
|   } | | |
|   if(lighting_change_in_sprite){ | | |

FIG. 29

```
        lighting_change_factor_encorde ()
    }
    if (video_object_layer_sprite_usage== STATIC_SPRITE){
        if (sprite_transmit_mode !=STOP){
        do{
            sprite_transmit_mode=checkSpriteTransMode ()
            sprite_transmit_mode                                     2
            if ((sprite_transmit_mode==PIECE) ||
              (sprite_transmit_mode==UPDATE))
                encordSpritePiece ()
        }while(sprite_transmit_mode !=STOP
            &&(sprite_transmit_mode !=PAUSE))
    }
    else if(video_object_layer_sprite_usage==ON-LINE_SPRITE){
        blending_factor                                              8
    }
}
if(video_object_layer_shape !="00"){
    VOP_width                                                        13
    marker_bit                                                       1
    VOP_height                                                       13
    VOP_horizontal_mc_spatial_ref                                    13
    marker_bit                                                       1
    VOP_vertical_mc_spatial_ref                                      13
    if (video_object_layer_sprite_usage==STATIC_SPRITE){
        return ();
    }
    if (scalability && enhancement_type)
        background_composition                                       1
    VOP_CR                                                           1
    change_CR_disable                                                1
}
interlaced                                                           1
if (interlaced)
    top_field_first                                                  1
if (VOP_prediction_type== '10' &&!scalability)
```

FIG. 30

```
    VOP_dbquant                                        2
else {
    VOP_quant                                          quant_precision
    if (video_object_layer_shape== "10")
        VOP_gray_quant                                 6
}
if ((video_object_layer_shape_effects=="0010") ||
    (video_object_layer_shape_efffects== "0011") ||
    (video_object_layer_shape_effects=="0101")){
        VOP_constant_alpha                             1
        if (VOP_constant alpha)
            VOP_constant_alpha_value                   8
}
video_object_plane_fcode_forward                       3
video_object_plane_fcode_backward                      3
if (!Complexity_estimation_disable){
    if (estimation_method== '00'){
        if(VOP_prediction_type== '00'){
        in(INTRA)
            DCECS_intra                                8
        if(INTRA+Q)
            DCECS_intra_Q                              8
        if(Not coded)
            DCECS_Not_coded                            8
        if(Zig-zag_DCT_coeff)
            DCECS_Zig-Zag_DCT                          VLC
        if(Half_pel_advanced_prediction)
            DCECS_half_pel_ap                          8
        if(Helf_pel_normal_pred)
            DCECS_help_pel_np                          8
        if(VLC_symbol)
            DCECS_VLC_symbol                           8
        if(shape_coding_parameters){
            DCECS.....t.b.d......                      Tbd
        }
    }
}
```

FIG.31

```
}
if(VOP_prediction_type== '01'){
        if(estimation_method== '00'){
        in(INTRA)
            DCECS_intra                        8
        if(INTRA+Q)
            DCECS_intra_Q                      8
        if(Not coded)
            DCECS_Not_coded                    8
        if(INTER)
            DCECS_inter                        8
        if(INTER4V)
            DCECS_inter4V                      8
        if(INTRA+Q)
            DCECS_intra_Q                      8
        if(Zig-zag_DCT_coeff)
            DCECS_Zig-zag_DCT                  VCL
        if(Half_pel_advanced_prediction)
            DCECS_half_pel_ap                  8
        if(Helf_pel_normal_pred)
            DCECS_held_pel_np                  8
        if(VLC_symbol)
            DCECS_VLC_symbol                   8
        if(Shape_coding_parameters){
            DCECS......t.b.d.......            Tbd
        }
    }
    if(estimation_method== '00'){
        if(VOP_prediction_type== '10'){
        in(INTRA)
            DCECS_intra                        8
        if(INTRA+Q)
            DCECS_intra_Q                      8
        if(Not coded)
            DCECS_Not_coded                    8
```

FIG. 32

| | |
|---|---|
| if(INTER) | |
|     DCECS_inter | 8 |
| if(INTER4V) | |
|     DCECS_inter4V | 8 |
| if(INTRA+Q) | |
|     DCECS_intra_Q | 8 |
|     if(INTERPOLATE MC+Q) | |
|       DCECS_interpolate | 8 |
|     if(FORWARD MC+Q) | 8 |
|       DCECS_forward | |
| | 8 |
|     if(BACKWARD MC+Q) | |
|       DCECS_backward | 8 |
|     if(H.263 PB DIRECT) | VLC |
|       DCECS_direct_h263 | |
| | 8 |
| if(Zig-zag_DCT_coeff) | |
|     DCECS_zig-zag_DCT | 8 |
| if(Half_pel_advanced_prediction) | |
|     DCECS_half_pel_ap | 8 |
| if(Helf_pel_normal_pred) | |
|     DCECS_help_pel_np | Tbd |
| if(VLC_symbol) | |
|     DCECS_VLC_symbol | |
| if(shape_coding_parameters){ | |
|     DCECS_....t.b.d...... | |
|   } | |
|   } | |
| } | 8 |
| if(estimation_method== '00'){ | |
|   if(VOP_prediction_type== '11'){ | 8 |
|     If(INTRA) | |
|       DCECS_intra | 8 |
|     If(INTRA+Q) | |
|       DCECS_intra_Q | |
|     If(Not coded) | |
|       DCECS_Not_coded | |

FIG. 33

```
        if(INTER)
            DCECS_inter                              8
        if(INTER4V)
            DCECS_inter4V                            8
        if(INTER+Q)
            DCECS_intra_Q                            8
            if(INTERPOLATE MC+Q)
                DCECS_interpolate                    8 if(FORWARD MC+Q)                         8
                DCECS_forward
                                                     8
            if(BACKWARD MC+Q)
                DCECS_backward                       8 if(H.263 PB DIRECT)                      VLC
                DCECS_direct_h263
                                                     8
        if(Zig-zag_DCT_coeff)
            DCECS_zig-zag_DCT                        8
        if(Half_pel_advanced_prediction)
            DCECS_half_pel_ap                        8
        if(Helf_pel_normal_pred)
            DCECS_help_pel_np                        t.b.d.
        if(VLC_symbol)
            DCECS_VLC_symbol
        if(shape_coding_parameters){                 t.b.d.
            DCECS_shape.....t.b.d.......
        }
        if(sprite_coding_parameters){
            DCECS_sprite......t.b.d.......
        }
       }
      }
     }
    }
}
if(!scalability){
   if(!separate_motion_shape_texture)
      if(error_resilience_disable)
          combined_motion_shape_texture_coding()
      else
```

FIG. 34

```
do {
    do{
        do{
            combined_motion_shape_texture_coding ()
        }while(nextbits_bytealingned () !=0000 0000 0000 0000)
        if(nextbits_bytealigned () !=000 0000 0000 0000 0000 0000){
            next_resync_marker ()
            resync_marker                              17
            macroblock_number                          1-12
            quant_scale                                quant-precison
            header_extension_code                      1
            if(header_extension_code==1){
                do
                    modulo_time_base                   1
                }while(modulo_time_base !=0)
                VOP_time_increment                     1-15
            }
        }
    }while(nextbits_bytealigned () !=000 0000 0000 0000 0000 0000)
else{
    if(video_object_layer_syape !="00") {
        do
            first_shape_code                           1-3
        }while(count of macroblocks!=total number of macroblocks)
    }
    if(error_resilience_disable){
        motion_coding ()
        if(video_object_layer_shape !="00")
            shape_coding ()
            texture_coding ()
    }
    else
        do {
            do {
                motion_coding ()
            }while(next_bits () != '1010 0000 0000 0000 1' )
            motion_marker                              17
```

FIG. 35

```
                if(video_object_layer_shape !="00")
                        shape_coding ()
                do ()
                        texture_coding ()
                }while(nextbits_bytealigned () !='0000 0000 0000 0000')
                if(nextbits_bytealigned () !=000 0000 0000 0000 0000 0000){
                        next_resync_marker ()
                        resync_marker                           17
                        macroblock_number                       1-12
                        quant_scale                             5
                        header_extension_code                   1
                        if(header_extension_code== 1){
                                do
                                        modulo_time_base        1
                                }while(modulo_time_base !=0)
                                VOP_time_increment              1-15
                        }
                }
        }while(nextbits_bytealigned () !=000 0000 0000 0000 0000 0000)
        }
}
else {
        if(enhancement_type){
                load_backward_shape                             1
                if(load_backward_shape){
                        backward_shape_width                    13
                        backward_shape_height                   13
                        backward_shape_horizontal_mc_spatial_ref  13
                        marker_bit                              1
                        backward_shape_vertical_mc_spatial_ref  13
                        backward_shape_coding ()
                        load_forward_shape                      1
                        if(load_forward_shape){
                                forward_shape_width             13
                                forward_shape_height            13
                                forward_shape_horizontal_mc_spatial_ref 13
```

FIG.36

```
                    maker_bit                                        1
                    forward_shape_vertical_mc_spatial_ref            13
                    forward_shape_coding()
                  }
              }
          }
          ref_select_code                                            2
          if (VOP_prediction_type== "01" ||VOP_prediction_type==    "10"){
              forward_temporal_ref                                   1-15
              if (VOP_prediction_type== "10"){
                  marker_bit                                         1
                  backward_temporal_ref                              1-15
              }
          }
          combined_motion_shape_texture_coding()
      }
      do {
          VideoObjextionPlane ()
      }while (nextbits_bytealigned ()==video_object_plane_start_code)
  next_start_code ()
}
```

VOP_start_code
This code cannot be emulated by any combination of other valid bits in the bitstream, and is used for synchronization purpose. It is sc followed by a unique 8-bit code.

modulo_time_base
This value represents the local time base at the one second resolution unit (1000 milliseconds). It is represented as a marker transmitted in the VOP header. The number of consecutive "1" followed by a "0" indicates the number of seconds has elapsed since the synchronization point marked by the modulo_time_base of the last displayed I/P-VOPs belonging to the same VOL. There are two exceptions, one for the first I/P-VOPs after the GOV header, and the other is for B-VOPs prior (in display order) to the first I/VOP after the GOV header.

For the first I/P-VOP after the GOV header, the modulo_time_base indicates the time_code in the GOV header.

For the first B-VOPs prior (in display order) to the first I-VOP after the GOV header, the modulo_time_base indicates the time relative to the time_code in the GOV header.

Note: When the bistream contains B-VOPs, the decoder needs to store two time_base, one is indicated by the last displayed I/P VOP or the GOV header and the other is indicated by the last decoded I/P-VOP.

VOP_time_increment
This value represents the absolute VOP_time_increment from the synchronization point marked by the modulo_time_base measured in the number of clock ticks. It can take a value in the range (0, VOP_time_increment_resolution). The number of bits representing this value is calculated as the minimum number of bits required to represent the above range. The local time base in units of seconds is recovered by dividing this value by the VOP_time_increment_resolution. For I/P and B-VOP this value is the absolute VOP_time_increment from the synchronization point marked by the modulo_time_base.

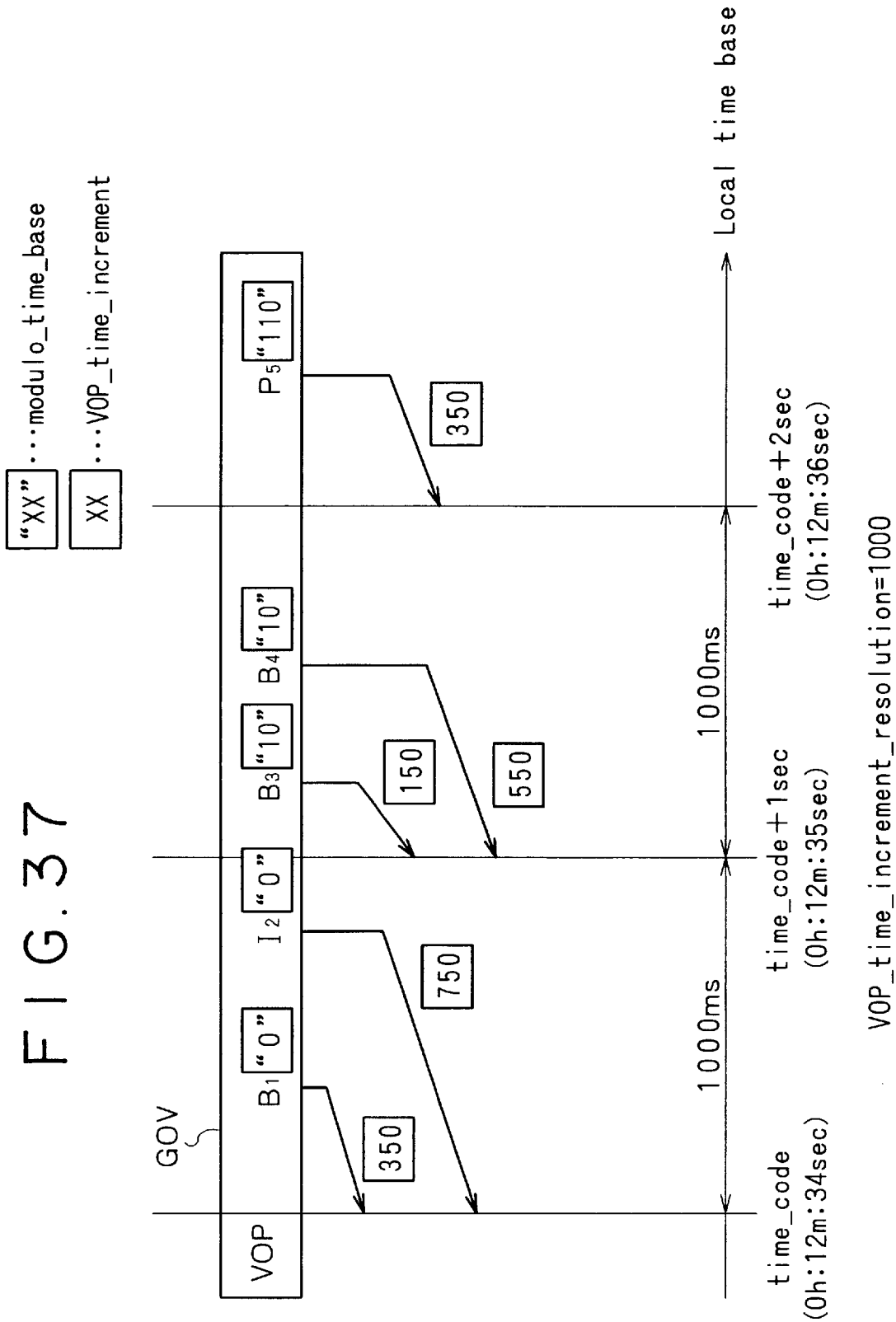

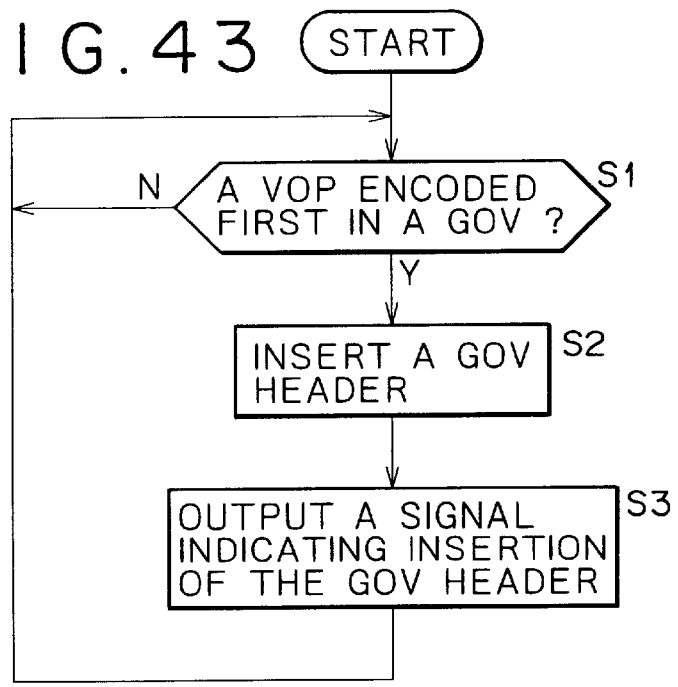
PROCESSING OF THE LOW-LEVEL-LAYER VLC UNIT 36
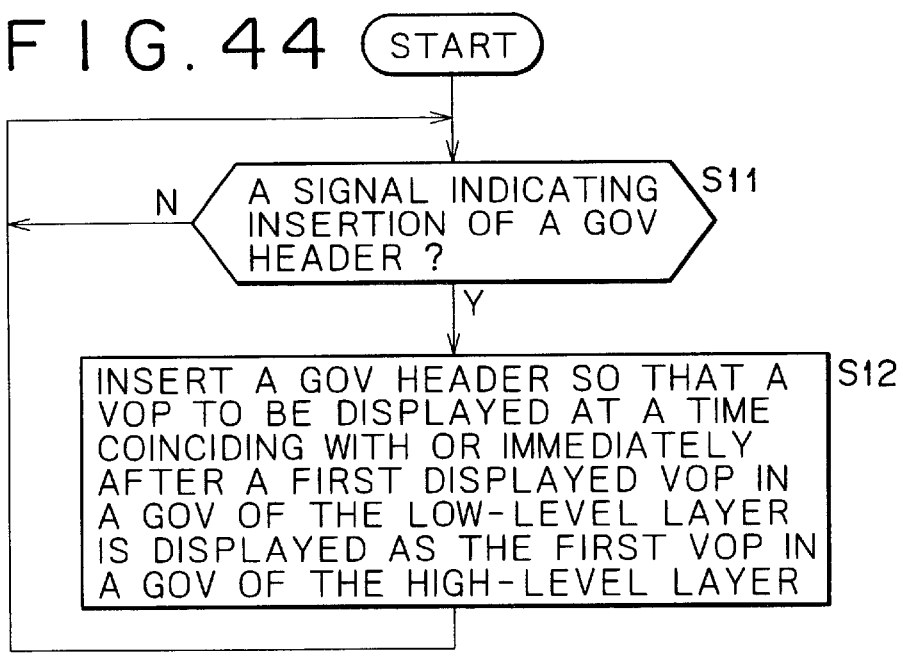
PROCESSING OF THE HIGH-LEVEL-LAYER VLC UNIT 36

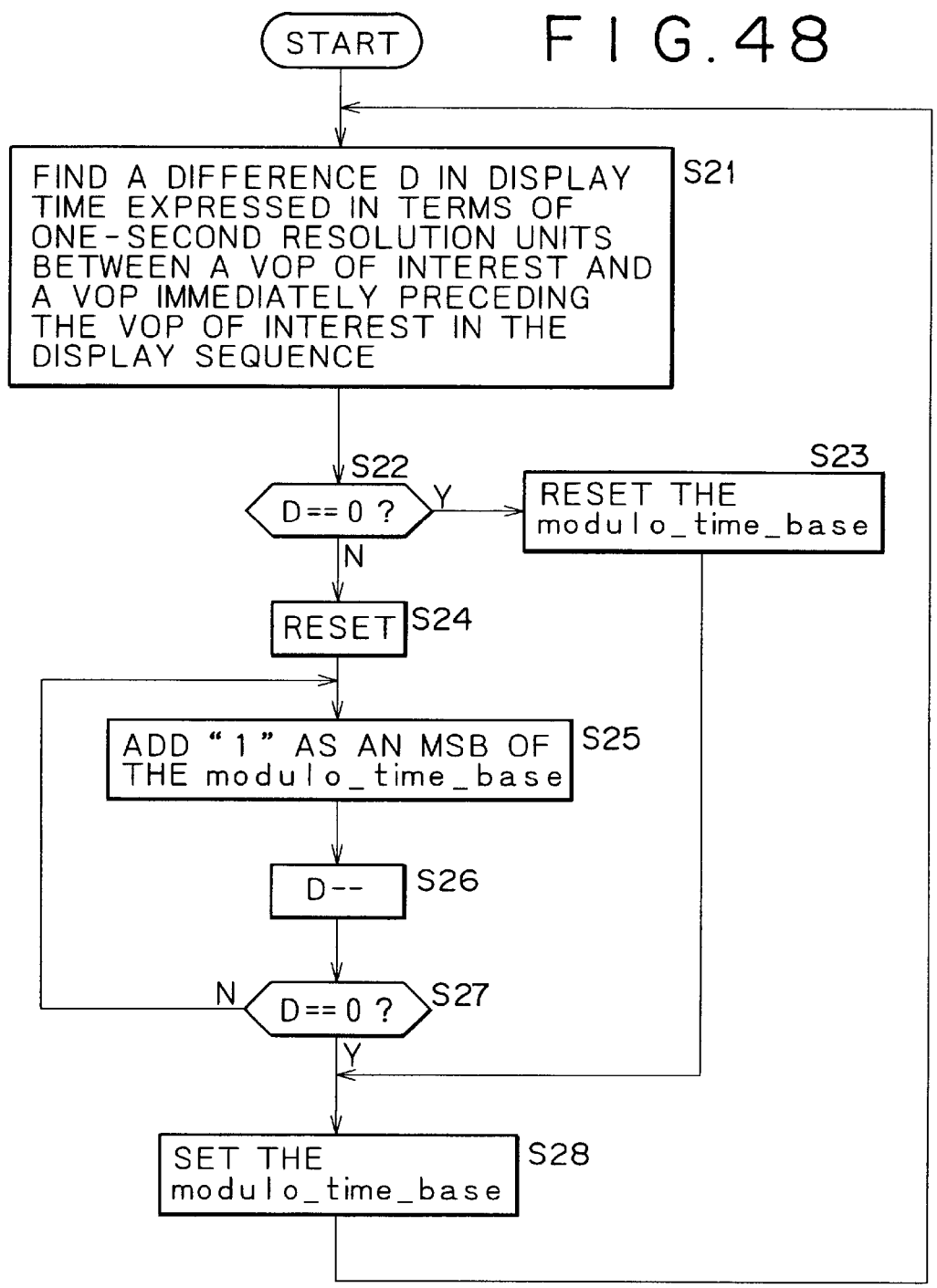

PICTURE ENCODING APPARATUS, PICTURE ENCODING METHOD, PICTURE DECODING APPARATUS, PICTURE DECODING METHOD AND PRESENTATION MEDIUM

BACKGROUND OF THE INVENTION

In general, the present invention relates to a picture encoding apparatus, a picture encoding method, a picture decoding apparatus, a picture decoding method and a presentation medium. More particularly, the present invention relates to a good picture encoding apparatus, a good picture encoding method, a good picture decoding apparatus, a good picture decoding method and a good presentation medium typically used for recording moving-picture data onto an optical magnetic disc or a magnetic tape, playing back the recorded data and displaying the reproduced data on a display as well as used for transmitting moving-picture data from a transmitter side to a receiver side by way of a transmission line, displaying, editing and recording the received moving-picture data on the receiver side in systems such as a television conference system, a television telephone system, broadcasting equipment and a multimedia data-base search system.

In a system for transmitting moving-picture data to a remote destination, such as a television conference system or a television telephone system, the moving-picture data is subjected to a compression-encoding process by taking advantage of line correlation or interframe correlation in order to allow the transmission to be utilized a high degree of efficiency.

As a representative high-performance system for encoding a moving picture, there is provided an MPEG (Moving Picture Experts Group) system which is a kind of cumulative moving-picture encoding technique. The MPEG system is proposed as a standard system, as a result of discussions by an ISO-IEC/JTC1/SC2/WG11. The MPEG system adopts a hybrid method combining a motion-compensation predicting/encoding technique and a DCT (Discrete Cosine Transform) encoding technique.

In the MPEG system, some profiles and levels are defined in order to keep up with a variety of applications and functions. The most basic one is a so-called main profile main level (MP@ML (Main Profile at Main Level).

FIG. 53 is a block diagram showing a typical configuration of an MP@ML encoder of the MPEG system.

Picture data to be encoded is supplied to a frame memory 31 to be temporarily stored therein. A motion-vector detector 32 reads out the picture data stored in the frame memory 31 in macroblock units each composed of typically 16 pixels× 16 pixels and detects motion vectors thereof.

The motion-vector detector 32 processes picture data of each frame as an I-picture (in an intraframe encoding process), a P-picture (in a forward-prediction encoding process) of a B-picture (in a bidirectional-prediction encoding process). It should be noted that pictures of frames sequentially supplied to the motion-vector detector 32 are processed as an I, P or B-picture in an order determined in advance. For example, the frames are processed in the order of I, B, P, B, P, - - - , B and P-pictures, for example.

To put it in detail, the motion-vector detector 32 refers to a predetermined reference frame set in advance in the picture data stored in the frame memory 31 and detects a motion vector of a macroblock of the reference frame and a frame being encoded currently by carrying out a pattern matching process (a block matching process) on a small block which is the macroblock with dimensions of 16 pixels×16 lines.

The MPEG system has four picture-prediction modes, namely, an intra- encoding mode (an intraframe encoding mode), a forward-prediction encoding mode, a backward-prediction encoding mode and a bidirectional-prediction encoding mode. An I-picture is encoded in the intra-encoding mode and a P-picture is encoded either in the intra-encoding mode or the forward-prediction encoding mode. A B-picture is encoded in either one of the intra-encoding mode, the forward-prediction encoding mode, the backward-prediction encoding mode and the bidirectional-prediction encoding mode.

That is to say, the motion-vector detector 32 sets the intra-encoding mode as a prediction mode for an I-picture. In this case, the motion-vector detector 32 does not detect a motion vector. Instead, the motion-vector detector 32 supplies information indicating the prediction mode (that is, the intra-encoding mode in this case) to a VLC (Variable-Length Coder) unit 36 and a motion compensator 42.

In the case of a P-picture, the motion-vector detector 32 carries out forward prediction on the picture to detect a motion vector thereof. Furthermore, the motion-vector detector 32 compares a prediction error obtained as a result of the forward prediction with, for example, a variance of a macroblock being encoded. If the comparison indicates that the variance of the macroblock is smaller than the prediction error, the motion-vector detector 32 sets the intra-encoding mode as a prediction mode and supplies information indicating the intra-encoding mode to the VLC unit 36 and the motion compensator 42. If the comparison indicates that the prediction error obtained as a result of the comparison is smaller than the variance of the macroblock, on the other hand, the motion-vector detector 32 sets the forward-prediction encoding mode as a prediction mode and supplies information indicating the forward-prediction encoding mode to the VLC unit 36 and the motion compensator 42 along with a detected motion vector.

In the case of a B-picture, the motion-vector detector 32 carries out forward, backward and bidirectional predictions on the picture to detect a motion vector thereof. Furthermore, the motion-vector detector 32 detects the smallest one among prediction errors resulting from the forward, backward and bidirectional predictions and compares the smallest prediction error thus detected (which is referred to hereafter also as a minimum prediction error for the sake of convenience) with, for example, a variance of a macroblock being encoded. If the comparison indicates that the variance of the macroblock is smaller than the smallest prediction error, the motion-vector detector 32 sets the intra-encoding mode as a prediction mode and supplies information indicating the intra-encoding mode to the VLC unit 36 and the motion compensator 42. If the comparison indicates that the minimum prediction error is smaller than the variance of the macroblock, on the other hand, the motion-vector detector 32 sets an encoding mode producing the minimum prediction error as a prediction mode and supplies information indicating the set prediction mode to the VLC unit 36 and the motion compensator 42 along with a detected motion vector.

Receiving the prediction mode and the detected motion vector from the motion-vector detector 32, the motion compensator 42 reads out picture data from a frame. memory 41 and supplies the picture data to processors 33 and 40. It should be noted that the picture data stored in the frame memory 41 to be read out by the motion compensator 42 has been encoded and then decoded back locally in the MP@ML encoder.

The processor 33 reads out the macroblock from the frame memory 31 and computes a difference between the macroblock and a predicted picture received from the motion compensator 42. The processor 33 then supplies the difference to a DCT unit 34. It should be noted that the macroblock is a macroblock of the picture data read out by the motion-vector detector 32 from the frame memory 31.

If the motion-compensator 42 receives only information on a prediction mode from the motion-vector detector 32, that is, if the intraframe-encoding mode is set as a prediction mode, on the other hand, no prediction picture is output. In this case, the processor 33 (and the processor 40) does not carry out any processing in particular, merely passing on a macroblock read out from the frame memory 31 to the DCT unit 34 as it is.

In the DCT unit 34, the data output by the processor 33 is subjected to DCT processing. A DCT coefficient obtained as a result of the DCT processing is supplied to the quantizer 35. In the quantizer 35, a quantization step (quantization scale) appropriate for a data accumulation quantity of a buffer 37 (the amount of data stored in the buffer 37 which is also referred to as a buffer feedback) is set. The DCT coefficient received from the DCT unit 34 is quantized at the quantization step. The quantized DCT coefficient (which is referred to hereafter simply as a quantized coefficient for the sake of convenience) and information on the quantization step are supplied to a VLC unit 36.

In the VLC unit 36, the quantized coefficient received from the quantizer 35 is converted into a variable-length code such as a Huffman code which is then output to the buffer 37. In addition, the VLC unit 36 also converts the information on the quantization step received from the quantizer 35, the information on the prediction mode and the motion vector which are received from the motion-vector detector 32 each into a variable-length code. As described above, the prediction mode can be any one of the intra-encoding mode (or the intraframe-prediction encoding mode), the forward-prediction encoding process, the backward-prediction encoding process and the bidirectional-prediction encoding process. An encoded bitstream obtained as a result of the conversion is supplied to the buffer 37.

By temporarily storing the encoded bitstream generated by the VLC unit 36 in the buffer 37, the data amount thereof is smoothed before the bitstream is output to a transmission line or recorded onto a recording medium.

The buffer 37 outputs the data accumulation quantity thereof to the quantizer 35. As described above, the quantizer 35 sets a quantization step appropriate for the data accumulation quantity received from buffer 37. To put it in detail, when an overflow is about to occur in the buffer 37, the quantizer 35 increases the quantization step so as to reduce the data amount of the quantized coefficient. When an underflow is about to occur in the buffer 37, on the other hand, the quantizer 35 decreases the quantization step so as to increase the data amount of the quantized coefficient. As a result, an overflow and an underflow in the buffer 37 are prevented from occurring.

The quantizer 35 outputs a quantized coefficient and information on a quantization step not only to the VLC unit 36, but also to an inverse quantizer 38. In the inverse quantizer 38, the quantized coefficient received from the quantizer 35 is subjected to inverse quantization in accordance with the quantization step set by the quantizer 35 for being converted back into a DCT coefficient. The DCT coefficient is then supplied to an IDCT unit (Inverse DCT unit) 39. In the IDCT unit 39, the DCT coefficient is subjected to inverse-DCT processing and data obtained as a result of the inverse-DCT processing is supplied to the processor 40.

In addition to the data output by the IDCT unit 39, the processor 40 also receives data from the motion compensator 42 which is also supplied to the processor 33 as described earlier. The processor 40 adds the data output by the IDCT unit 39 (a prediction residual or differential data) to prediction picture data received from the motion compensator 42 in order to carry out a local decoding process to produce the original picture data. The picture data output to the frame memory 41 as a result of the local decoding process is also referred to as locally decoded picture data. (If the intra-encoding mode is set as a prediction mode, however, the data output by the IDCT unit 39 is passed through the processor 40 as it is, being supplied to the frame memory 41 as locally decoded picture data) . It should be noted that the locally decoded picture data is the same as data obtained as a result of a decoding process carried out on the receiver side.

The decoded picture data (locally-decoded picture data) output by the processor 40 is supplied to the frame memory 41 to be stored therein. Later on, the locally decoded picture data is used as reference picture data (a reference frame) for a picture subjected to an interframe encoding process (forward-prediction encoding, backward-prediction encoding or bidirectional-prediction encoding.)

FIG. 54 is a block diagram showing a typical configuration of an MP@ML decoder of the MPEG system for decoding an encoded bitstream output by the encoder shown in FIG. 53.

An encoded bitstream transmitted through a transmission line is received by a receiver not shown in the figure, or an encoded bitstream recorded on a recording medium is played back by a playback apparatus also not shown in the figure. The encoded bitstream received by the receiver or an encoded bitstream played back by the playback apparatus is supplied to a buffer 101 to be stored therein.

An IVLC (Inverse VLC) unit 102 serving as a variable-length decoder reads out the encoded bitstream stored in the buffer 101, carrying out a variable-length decoding process on the encoded bitstream to split the bitstream into a motion vector, information on a prediction mode and a quantization step, and a quantized coefficient in macroblock units. The motion vector and the information on a prediction mode are supplied to a motion compensator 107 whereas the information on a quantization step and the quantized coefficient of a macroblock are supplied to an inverse quantizer 103.

The inverse quantizer 103 carries out inverse quantization on the quantized coefficient of a macroblock received from the IVLC unit 102 in accordance with a quantization step supplied also by the IVLC unit 102, outputting a DCT coefficient obtained as a result of the inverse quantization to an IDCT unit 104. The IDCT unit 104 carries out an inverse DCT process on the DCT coefficient of the macroblock received from the inverse quantizer 103, supplying data obtained as a result of the inverse DCT processing to a processor 105.

In addition to the data output by the IDCT unit 104, the processor 105 also receives data output by the motion compensator 107. To put it in detail, much like the motion compensator 42 shown in FIG. 53, the motion compensator 107 reads out picture data already-decoded and stored in a frame memory 106 in accordance with the motion vector and the prediction mode received from the IVLC 102 for supplying the decoded picture data to the processor 105 as prediction picture data. The processor 105 adds the data output by the IDCT unit 104 (a prediction residual or differential value) to prediction picture data received from the motion compensator 107 in order to carry out a decoding process to produce an original picture data. The original picture data is output to the frame memory 106 to be stored therein. It should be noted that, if the intra-encoding mode is set as a prediction mode for data output by the IDCT unit 104, however, the data is then passed through the processor 105 as it is, being supplied to the frame memory 106 as decoded picture data to be stored therein.

The decoded picture data stored in the frame memory 106 is used as reference picture data (a reference frame) for picture data to be decoded later. In addition, the decoded picture data is supplied as an output playback picture to typically a display not shown in the figure to be displayed thereon.

It should be noted that, in the MPEG1 and MPEG2 systems, a B-picture is not used as reference picture data. Thus, locally decoded picture data of a B-picture is stored neither in the frame memory 41 shown in FIG. 53, nor in the frame memory 106 shown in FIG. 54.

The encoder and the decoder shown in FIGS. 53 and 54, respectively conform to MPEG1/2 specifications. With regard to a system for encoding data in VO (Video Object) units, specificationization work of an MPEG4 (Moving Picture Experts Group) system is being done by an ISO-IEC/JTC1/SC29/WG11. A VO unit is a sequence of objects such as bodies composing a picture.

By the way, specificationization work of the MPEG4 system is under way to define specifications to be utilized mainly in the field of communication. For this reason, a GOP (Group Of Pictures) prescribed in the MPEG1/2 system is not prescribed in the MPEG4 system for the time being. Accordingly, when the MPEG4 system is utilized in storage media, it is expected that efficient random accesses are difficult to make.

In order to solve this problem, the applicants of a patent for the present invention have already proposed a GOV (Group of VOP) corresponding to the GOP prescribed in the MPEG1/2 system as disclosed in Japanese Patent Laid-open No. Hei10-80758 and the GOV was introduced in the MPEG4 system.

In the MPEG4 system, on the other hand, picture data is converted into a hierarchical structure comprising at least two hierarchical layers, making it possible to carry out flexible scalable encoding/decoding processes utilizing a picture at each of the hierarchical layers.

By the way, since a relation between GOVs of picture data at hierarchical layers is not prescribed in the MPEG4 system, a GOV can be inserted for each hierarchical layer independently. Since pieces of picture data at hierarchical layers are not independent, however, it is expected that efficient random accesses are difficult to make in some cases when a GOV is inserted for each hierarchical layer independently.

SUMMARY OF THE INVENTION

It is thus an object of the present invention addressing the problems described above to provide a picture encoding apparatus, a picture encoding method, a picture decoding apparatus, a picture decoding method and a presentation medium which allow efficient random accesses to be made.

According to the present invention, there is provided a picture encoding apparatus for encoding a picture and outputting an encoded bitstream obtained as a result of encoding the picture including; a hierarchy forming means for converting a sequence of objects composing the picture into a hierarchy comprising two or more hierarchical layers, a first encoding means for encoding a first hierarchical layer of the sequence of objects output by the hierarchy forming means by dividing the first hierarchical layer into a plurality of groups, and a second encoding means for encoding a second hierarchical layer of the sequence of objects output by the hierarchy forming means by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

According to the present invention, there is provided a picture encoding method for encoding a picture and outputting an encoded bitstream obtained as a result of encoding the picture having the steps of; converting a sequence of objects composing the picture into a hierarchy comprising two or more hierarchical layers, encoding a first hierarchical layer of the sequence of objects by dividing the first hierarchical layer into a plurality of groups, and encoding a second hierarchical layer of the sequence of objects by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

By a virtue of the picture encoding apparatus and the picture encoding method, it is possible to make efficient random accesses at a high speed.

According to the present invention, there is provided a picture decoding apparatus for decoding a picture including a receiving means for receiving an encoded bitstream and a decoding means for decoding the encoded bitstream, wherein the encoded bitstream is obtained by executing the steps of; converting a sequence of objects composing the picture into a hierarchy comprising two or more hierarchical layers, encoding a first hierarchical layer of the sequence of objects by dividing the first hierarchical layer into a plurality of, groups, and encoding a second hierarchical layer of the sequence of objects by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

According to the present invention, there is provided a picture decoding method for decoding a picture having the steps of receiving an encoded bitstream and decoding the encoded bitstream, wherein the encoded bitstream is obtained by executing the steps of; converting a sequence of objects composing the picture into a hierarchy comprising two or more hierarchical layers, encoding a first hierarchical layer of the sequence of objects by dividing the first hierarchical layer into a plurality of groups, and encoding a second hierarchical layer of the sequence of objects by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

As a result, it is possible to make efficient random accesses at a high speed.

According to the present invention, there is provided a presentation medium for presenting an encoded bitstream obtained as a result of encoding a picture, wherein the encoded bitstream is obtained as a result of executing the steps of; converting a sequence of objects composing the picture into a hierarchy comprising two or more hierarchical layers, encoding a first hierarchical layer of the sequence of objects by dividing the first hierarchical layer into a plurality of groups, and encoding a second hierarchical layer of the sequence of objects by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer. As a result, it is possible to make efficient random accesses to the encoded bit stream at a high speed.

According to the present invention, there is provided a picture encoding apparatus for encoding a picture and outputting an encoded bitstream obtained as a result of encoding the picture including; a hierarchy forming means for converting a sequence of objects composing the picture into a hierarchy comprising two or more hierarchical layers, an encoding means for dividing a first or second hierarchical layer of the sequence of objects output by the hierarchy forming means into one or more groups, for encoding each of the groups and for including a one-second resolution first-object display time representing a display time of a first displayed object of each of the groups pertaining to the first or second hierarchical layer in terms of one-second resolution units in the group, an adding means for providing each of the objects pertaining to the first or second hierarchical layer with one-second resolution relative time information representing a display time of the object relative to the one-second resolution first-object display time in terms of one-second resolution units, and a resetting means for resetting the one-second resolution relative time information added to any one of the objects pertaining to the second hierarchical layer in dependence on a difference in display time between the object and another object of the second hierarchical layer adjacent to the object in a display sequence.

According to the present invention, there is provided a picture encoding method for encoding a picture and outputting an encoded bitstream obtained as a result of encoding the picture having the steps of; converting a sequence of objects composing the picture into a hierarchy comprising two or more hierarchical layers, dividing a first or second hierarchical layer of the sequence of objects into one or more groups, encoding each of the groups and including a one-second resolution first-object display time representing a display time of a first displayed object of each of the groups pertaining to the first or second hierarchical layer in terms of one-second resolution units in the group, and providing each of the objects pertaining to the first or second hierarchical layer with one-second resolution relative time information representing a display time of the object relative to the one-second resolution first-object display time in terms of one-second resolution units, wherein the one-second resolution relative time information added to any one of the object pertaining to the second hierarchical layer is reset in dependence on a difference in display time between the object and another object of the second hierarchical layer adjacent to the object in a display sequence.

As a result, it is possible to prevent the encoding efficiency from becoming poor.

According to the present invention, there is provided a picture decoding apparatus for decoding a picture including; a receiving means for receiving an encoded bitstream and a decoding means for decoding the encoded bitstream which is obtained by executing the steps of; converting a sequence of objects composing the picture into a hierarchy comprising two or more hierarchical layers, dividing a first or second hierarchical layer of the sequence of objects into one or more groups, encoding each of the groups and including a one-second resolution first-object display time representing a display time of a first displayed object of each of the groups pertaining to the first or second hierarchical layer in terms of one-second resolution units in the group, and providing each of the objects pertaining to the first or second hierarchical layer with one-second resolution relative time information representing a display time of the object relative to the one-second resolution first-object display time in terms of one-second resolution units, wherein the one-second resolution relative time information added to any one of the objects pertaining to the second hierarchical layer is reset in dependence on a difference in display time between the object and another object pertaining to the second hierarchical layer adjacent to the object in a display sequence.

According to the present invention, there is provided a picture decoding method for decoding a picture having the steps of; receiving an encoded bitstream and decoding the encoded bitstream which is obtained by executing the steps of; converting a sequence of objects composing a picture into a hierarchy comprising two or more hierarchical layers, dividing a first or second hierarchical layer of the sequence of objects into one or more groups, encoding each of the groups and including a one-second resolution first-object display time representing a display time of a first displayed object of each of the groups pertaining to the first or second hierarchical layer in terms of one-second resolution units in the group, and providing each of the objects pertaining to the first or second hierarchical layer with one-second resolution relative time information representing a display time of the object relative to the one-second resolution first-object display time in terms of one-second resolution units, wherein the one-second resolution relative time information added to any one of the objects pertaining to the second hierarchical layer is reset in dependence on a difference in display time between the object and another object pertaining to the second hierarchical layer adjacent to the object in a display sequence.

As a result, it is possible to decode an encoded bitstream which has been subjected to prevention of deterioration of an encoding efficiency thereof.

According to the present invention, there is provided a presentation medium for presenting an encoded bitstream obtained as a result of encoding a picture, in which the encoded bitstream is generated by executing the steps of; converting a sequence of objects composing a picture into a hierarchy comprising two or more hierarchical layers, dividing a first or second hierarchical layer of the sequence of objects into one or more groups, encoding each of the groups and including a one-second resolution first-object display time representing a display time of a first displayed object of each of the groups pertaining to the first or second hierarchical layer in terms of one-second resolution units in the group, and providing each of the objects pertaining to the first or second hierarchical layer with one-second resolution relative time information representing a display time of the object relative to the one-second resolution first-object display time in terms of one-second resolution units to the objects, wherein the one-second resolution relative time information added to any one of the objects pertaining to the second hierarchical layer is reset in dependence on a difference in display time between the object and another object pertaining to the second hierarchical layer adjacent to the object in a display sequence.

As a result, it is possible to present an encoded bitstream which has been subjected to a process to prevent an encoding efficiency thereof from deteriorating.

According to the present invention, there is provided a picture encoding apparatus for encoding a picture and outputting an encoded bitstream including; a hierarchy forming means for converting a sequence of objects composing the picture into a hierarchy comprising two or more hierarchical layers including a high-level hierarchical layer and a low-level hierarchical layer for enabling space scalability, a first encoding means for encoding a sequence of objects pertaining to the low-level hierarchical layer output by the hierarchy forming means, and a second encoding means for encoding a sequence of objects pertaining to the high-level hierarchical layer output by the hierarchy forming means in the same order as a display sequence of the objects pertaining to the high-level hierarchical layer.

According to the present invention, there is provided a picture encoding method for encoding a picture and outputting an encoded bitstream having the steps of; receiving the picture, converting a sequence of objects composing the picture into a hierarchy comprising two or more hierarchical layers including a high-level hierarchical layer and a low-level hierarchical layer for enabling space scalability, and encoding a sequence of objects pertaining to the low-level hierarchical layer as well as encoding a sequence of objects pertaining to the high-level hierarchical layer in the same order as a display sequence of the objects pertaining to the high-level hierarchical layer.

As a result, the encoding process is made simple.

According to the present invention, there is provided a picture decoding apparatus for decoding a picture including; a receiving means for receiving an encoded bitstream and a decoding means for decoding the encoded bitstream, wherein the encoded bitstream is obtained by executing the steps of; converting a sequence of objects composing the picture into a hierarchy comprising two or more hierarchical layers including a high-level hierarchical layer and a low-level hierarchical layer for enabling space scalability, and encoding a sequence of objects pertaining to the low-level hierarchical layer as well as encoding a sequence of objects pertaining to the high-level hierarchical layer in the same order as a display sequence of the objects pertaining to the high-level hierarchical layer.

According to the present invention, there is provided a picture decoding method for decoding a picture having the steps of; receiving an encoded bitstream and decoding the encoded bitstream obtained by executing the steps of; converting a sequence of objects composing the picture into a hierarchy comprising two or more hierarchical layers including a high-level hierarchical layer and a low-level hierarchical layer for enabling space scalability, and encoding a sequence of objects pertaining to the low-level hierarchical layer as well as encoding a sequence of objects pertaining to the high-level hierarchical layer in the same order as a display sequence of the objects pertaining to the high-level hierarchical layer.

As a result, the decoding process is made simple.

According to the present invention, there is provide a presentation medium for presenting an encoded bitstream obtained as a result of encoding a picture, wherein the encoded bitstream is generated by executing the steps of; converting a sequence of objects composing the picture into a hierarchy comprising two or more hierarchical layers including a high-level hierarchical layer and a low-level hierarchical layer for enabling space scalability, and encoding a sequence of objects pertaining to the low-level hierarchical layer as well as encoding a sequence of objects pertaining to the high-level hierarchical layer in the same order as a display sequence of the objects pertaining to the high-level hierarchical layer. As a result, it is possible to present an encoded bitstream which can be decoded with ease.

BRIEF DESCRIPTION OF THE DRAWINGS

FIG. 1 is a block diagram showing a typical configuration of an embodiment implementing an encoder to which the present invention is applied;

FIG. 2 is a diagram used for explaining that the position and the size of a VO which change with the lapse of time;

FIG. 3 is a block diagram showing a typical configuration of each of VOP encoding units shown in FIG. 1;

FIGS. 4A and 4B are diagrams used for explaining space scalability;

FIG. 9 is a block diagram showing a typical configuration of a low-level-layer encoding unit shown in FIG. 3;

FIG. 18 shows the syntax of a VS;

FIG. 19 shows the syntax of a VO;

FIG. 20 shows the syntax of a VOL;

FIG. 21 shows the syntax of a VOL;

FIG. 22 shows the syntax of a VOL;

FIG. 23 shows the syntax of a VOL;

FIG. 24 shows the syntax of a VOL;

FIG. 25 shows the syntax of a VOL;

FIG. 26 shows the syntax of a GOV;

FIG. 27 shows the syntax of a GOV;

FIG. 28 shows the syntax of a VOP;

FIG. 29 shows the syntax of a VOP;

FIG. 30 shows the syntax of a VOP;

FIG. 31 shows the syntax of a VOP;

FIG. 32 shows the syntax of a VOP;

FIG. 33 shows the syntax of a VOP;

FIG. 34 shows the syntax of a VOP;

FIG. 35 shows the syntax of a VOP;

FIG. 36 shows the syntax of a VOP;

FIG. 37 is a diagram showing a relation among a time_code, a modulo_time_base and a VOP_time_increment;

FIG. 43 shows a flowchart used for explaining processing carried out by a low-level VLC unit shown in FIG. 9 to in association with a GOV pertaining to the high-level layer with a GOV pertaining to the low-level layer;

FIG. 44 shows a flowchart used for explaining processing carried out by a low-level VLC unit shown in FIG. 10 in association with a GOV pertaining to the high-level layer with a GOV pertaining to the low-level layer;

FIG. 48 is a diagram used for explaining a technique to prevent the number of bits in the modulo_time_base from increasing;

DESCRIPTION OF THE PREFERRED EMBODIMENTS

Before describing embodiments of the present invention, in order to clarify relations between each means of the present invention described in the claims and a typical implementation of the means, the implementation is appended to the means in the following description of characteristics of the present invention, being enclosed in parentheses in the form of "a means (implemented by typically an implementation)".

According to a picture encoding apparatus of the present invention for encoding a picture and outputting an encoded bitstream obtained as a result of encoding the picture, the picture encoding apparatus includes; a hierarchy forming means (implemented by typically a picture-hierarchy forming unit 21 shown in FIG. 3) for converting a sequence of objects composing the picture into a hierarchy including two or more hierarchical layers, a first encoding means (implemented by typically a low-level-layer encoding unit 25 shown in FIG. 3) for encoding a first hierarchical layer of the sequence of objects output by the hierarchy forming means by dividing the first hierarchical layer into a plurality of groups, and a second encoding means (implemented by typically a high-level-layer encoding unit 23 shown in FIG. 3) for encoding a second hierarchical layer of the sequence of objects output by the hierarchy forming means by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

Figure 14:
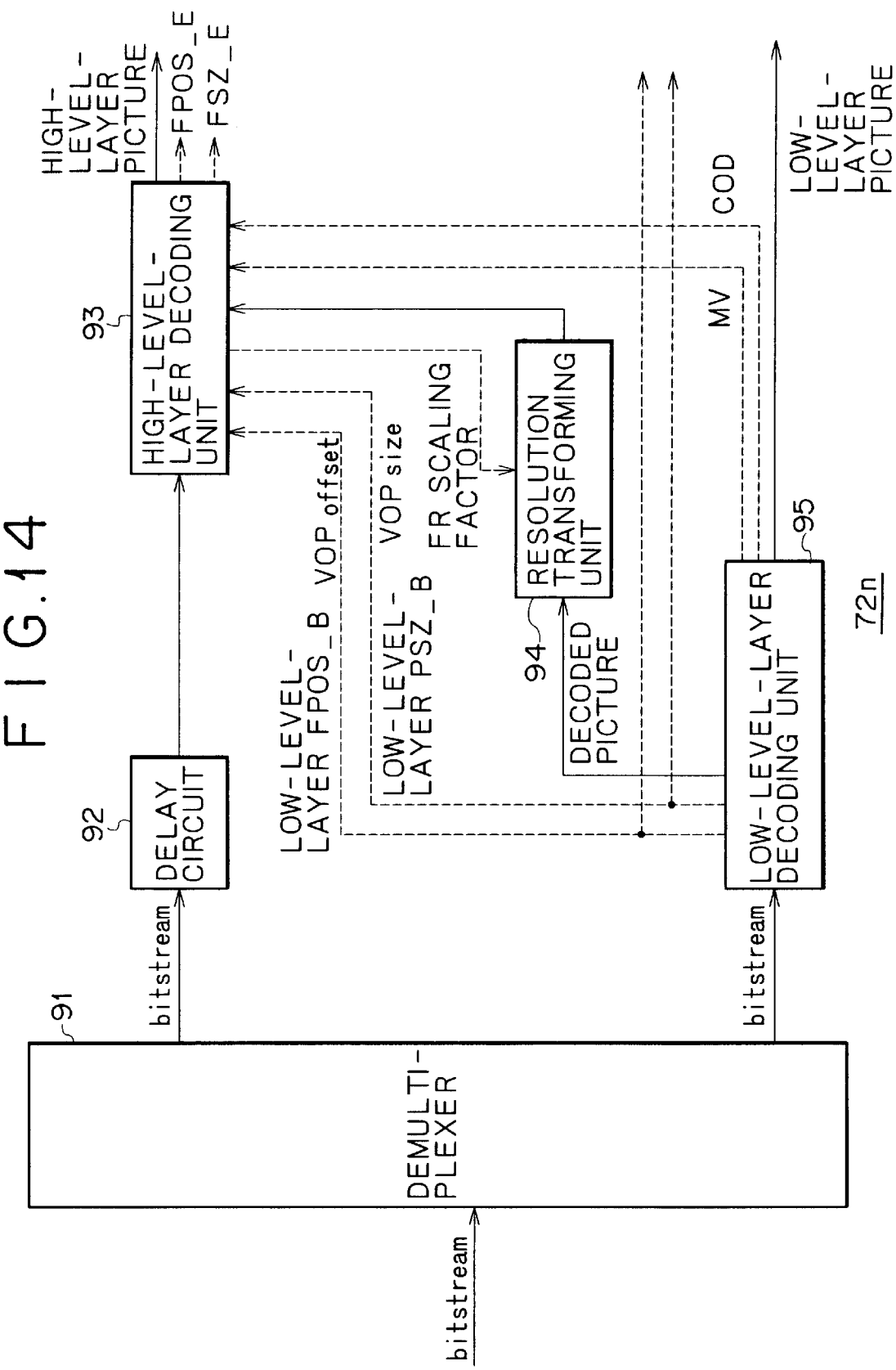
FIG. 14 is a block diagram showing a typical configuration of each of VOP decoding units shown in FIG. 13.

According to claim 8, a picture decoding apparatus for decoding a picture is characterized in that the picture decoding apparatus includes; a receiving means (implemented by typically a demultiplexer 91 shown in FIG. 14) for receiving an encoded bitstream and a decoding means (implemented by typically a high-level-layer decoding unit 93 and a low-level-layer decoding unit 95 shown in FIG. 14) for decoding the encoded bitstream obtained by executing the steps of; converting a sequence of objects composing the picture into a hierarchy including two or more hierarchical layers, encoding a first hierarchical layer of the sequence of objects by dividing the first hierarchical layer into a plurality of groups, and encoding a second hierarchical layer of the sequence of objects by dividing the second hierarchical layer into a plurality of groups in such a way that an object at the second hierarchical layer to be displayed at a time coinciding with or immediately after a display time of an object first displayed in a group pertaining to the first hierarchical layer is first displayed in a group pertaining to the second hierarchical layer.

According to a picture encoding apparatus of the present invention for encoding a picture and outputting an encoded bitstream obtained as a result of encoding the picture, the picture encoding apparatus includes; a hierarchy forming means (implemented by typically the picture-hierarchy forming unit 21 shown in FIG. 3) for converting a sequence of objects composing the picture into a hierarchy including two or more hierarchical layers, an encoding means (implemented by typically the high-level-layer encoding unit 23 and the low-level-layer encoding unit 25 shown in FIG. 3) for dividing a first or second hierarchical layer of the sequence of objects output by the hierarchy forming means into one or more groups, for encoding each of the groups and for including a one-second resolution first-object display time representing a display time of a first displayed object of each of the groups pertaining to the first or second hierarchical layer in terms of one-second resolution units in the group, an adding means (implemented by typically the high-level-layer encoding unit 23 and the low-level-layer encoding unit 25 shown in FIG. 3) for providing each of the objects pertaining to the first or second hierarchical layer with one-second resolution relative time information representing a display time of the object relative to the one-second resolution first-object display time in terms of one-second resolution units, and a resetting means (implemented by typically a processing step S23 of a program shown in FIG. 48) for resetting the one-second resolution relative time information added to any one of the objects pertaining to the second hierarchical layer in dependence on a difference in display time between the object and another, object of the second hierarchical layer adjacent to the object in a display sequence.

According to a picture decoding apparatus of the present invention for decoding a picture, the picture decoding apparatus includes; a receiving means (implemented by typically a demultiplexer 91 shown in FIG. 14) for receiving an encoded bitstream and a decoding means (implemented by typically a high-level-layer decoding unit 93 and a low-level-layer decoding unit 95 shown in FIG. 14) for decoding the encoded bitstream obtained by executing the steps of; converting a sequence of objects composing the picture into a hierarchy including two or more hierarchical layers; dividing a first or second hierarchical layer of the sequence of objects into one or more groups for encoding each of the groups and including a one-second resolution first-object display time representing a display time of a first displayed object of each of the groups pertaining to the first or second hierarchical layer in terms of one-second resolution units in the group; and providing each of the objects pertaining to the first or second hierarchical layer with one-second resolution relative time information representing a display time of the object relative to the one-second resolution first-object display time in terms of one-second resolution units, wherein the one-second resolution relative time information added to any one of the objects pertaining to the second hierarchical layer is reset in dependence on a difference in display time between the object and another object pertaining to the second hierarchical layer adjacent to the object in a display sequence.

According to a picture encoding apparatus of the present invention for outputting an encoded bitstream obtained as a result of encoding, the picture encoding apparatus includes; a hierarchy forming means (implemented by typically the picture-hierarchy forming unit 21 shown in FIG. 3) for converting a sequence of objects composing the picture into a hierarchy including two or more hierarchical layers including a high-level hierarchical layer and a low-level hierarchical layer for enabling space scalability, a first encoding means (implemented by typically the low-level-layer encoding unit 25 shown in FIG. 3) for encoding a sequence of objects pertaining to the low-level hierarchical layer output by the hierarchy forming means, and a second encoding means (implemented by typically the high-level-layer encoding unit 23 shown in FIG. 3) for encoding a sequence of objects pertaining to the high-level hierarchical layer output by the hierarchy forming means in the same order as a display sequence of the objects pertaining to the high-level hierarchical layer.

According to a picture decoding apparatus of the present invention for decoding a picture, the picture decoding apparatus includes; a receiving means (implemented by typically a demultiplexer 91 shown in FIG. 14) for receiving an encoded bitstream and a decoding means (implemented by typically a high-level-layer decoding unit 93 and a low-level-layer decoding unit 95 shown in FIG. 14) for decoding the encoded bitstream obtained by executing the steps of; converting a sequence of objects composing the picture into a hierarchy including two or more hierarchical layers including a high-level hierarchical and a low-level hierarchical layer for enabling space scalability, and encoding a sequence of objects pertaining to the low-level hierarchical layer as well as encoding a sequence of objects pertaining to the high-level hierarchical layer in the same order as a display sequence of the objects pertaining to the high-level hierarchical layer.

It should be noted that the above description of course is not intended to limit each of the means to a typical implementation associated with the means.

FIG. 1 is a block diagram showing a typical configuration of an embodiment implementing an encoder to which the present invention is applied. To put it concretely, the encoder carries out processing in conformity with the MPEG4 specifications.

Data of a picture (moving picture) to be encoded is supplied to a VO (Video Object) configuring unit 1. The VO configuring unit 1 forms VOs which are each a sequence of objects composing an input picture signal supplied thereto. The VOs are supplied to VOP configuring units $2_1$ to $2_N$. To put it in detail, when N VOs, namely, VO#1 to VO#N, are formed, VO#1 to VO#N are supplied to the VOP configuring units $2_1$ to $2_N$, respectively.

To put it concretely, assume for example that picture data to be encoded comprises a sequence of a background F1 and a sequence of a foreground F2 which are independent of each other. In this case, the VO configuring unit 1 typically outputs the sequence of the foreground F2 to the VOP configuring unit $2_1$ as VO#1 and the sequence of the background F1 to the VOP configuring unit $2_2$ as VO#2.

It should be noted that, if the picture data to be encoded comprises a sequence of a background F1 and a sequence of a foreground F2 which have been already synthesized, the picture is first subjected to area division by using a predetermined algorithm in order to extract the background F1 and the foreground F2. Then, VOs or sequences of the background F1 and the foreground F2 are supplied to the VOP configuring units $2_n$, where n=1, 2, - - - , N, corresponding thereto.

A VOP configuring unit $2_n$ forms a VOP (VO plane) from an output of the VO configuring unit 1. For example, an object is first extracted from each frame. Typically, a smallest rectangle enclosing the object, which is referred to hereafter simply as a smallest rectangle for the sake of convenience, is then treated as a VOP. It should be noted that, at that time, the VOP configuring unit $2_n$ forms a VOP so that the number of pixels in the horizontal direction and the vertical direction are each a multiple of 16. The VOP configured in VO configuring unit $2_n$ is then output to a VOP encoding unit $3_n$.

In addition, the VOP configuring unit $2_n$ also detects size data (a VOP size) representing the size (typically the horizontal and vertical lengths) of the VOP and offset data (a VOP offset) representing the position of the VOP in the frame, outputting the size data and the offset data to the VOP encoding unit $3_n$ as well. The position of a VOP in a frame is typically expressed in terms of coordinates with the upper left corner of the frame taken as an origin.

The VOP encoding unit $3_n$ encodes the output of the VOP configuring unit $2_n$ by adopting a system typically conforming to the MPEG or H.263 specifications. A bitstream obtained as a result of the encoding process is output to a multiplexer 4. The multiplexer 4 multiplexes bitstreams received from the VOP encoding units $3_1$ to $3_N$ and transmits multiplexed data obtained as a result of the multiplexing process to a destination through a transmission line 5 implemented by typically a ground wave, a satellite line or a CATV network or other transmission means, or records the multiplexed data into a recording medium 6 such as a magnetic disc, an optical magnetic disc, an optical disc or a magnetic tape.

The VO and VOP are described as follows.

A VO is a sequence of objects composing a synthesized picture in case a sequence of the synthesized picture exists and a VOP means a VO at a certain time. To be more specific, assume that a synthesized picture F3 is obtained by synthesizing pictures F1 and F2. In this case, a sequence along the time axis of the picture F1 or F2 is a VO. On the other hand, the picture F1 or F2 at a certain time is a VOP. Thus, a VO can be the to be a set of VOPs of the same object at different times.

Assume for example that the picture F1 is a background and the picture F2 is a foreground. It should be noted that the synthesized picture F3 is obtained by synthesizing the pictures F1 and F2 by using a key signal for extracting the picture F2. The VOP of the picture F2 in this case appropriately includes a key signal in addition to picture data (that is, a luminance signal and a chrominance signal) composing the picture F2.

In the case of a sequence of picture frames, the size and the position thereof do not change. In the case of a VO, on the other hand, the size and the position thereof change in some cases. That is to say, even a VOP composing the same VO can have the size and the position thereof changing from time to time in some cases.

To put it concretely, let a synthesized picture including a picture F1 of a background and a picture F2 of a foreground be shown in FIG. 2.

Assume for example that the picture F1 is obtained by shooting certain natural scenery and a sequence of the entire picture is a VO, namely, VO#0. On the other hand, the picture F2 is obtained by shooting the state of a walking person and a sequence of a smallest rectangle enclosing the person is another VO, namely, VO#1.

In this case, since VO#0 is a picture of scenery, its position and size basically do not change as is the case with the frame of an ordinary picture. Since VO#1 is a picture of a person, on the other hand, the object moves to the right and left as well as backward and forward with respect to the screen, causing the size and the position thereof to change. Although FIG. 2 is a diagram showing VO#0 and VO#1 at a same certain time, the position and the size of VO#1 may change with the lapse of time.

For this reason, a bitstream output by the VOP encoding unit $3_n$ shown in FIG. 1 includes information on the size and the position of the VOP in a predetermined absolute coordinate system in addition to encoded data of the VOP. It should be noted that, in FIG. 2, a reference notation OST0 denotes a vector showing the position of the VOP (or the picture F1) composing VO#0 at a certain time and a reference notation OST1 denotes a vector showing the position of the VOP (or the picture F2) composing VO#1 at the same time.

FIG. 3 is a block diagram showing a typical configuration of the VOP encoding unit $3_n$ of FIG. 1 for enabling scalability. To put it in detail, in the MPEG4 system, a scalable encoding technique enabling scalability for different picture sizes and frame rates is introduced and implemented in the VOP encoding unit $3_n$ shown in FIG. 3.

A VOP (picture data), its size data (VOP size) and its offset data (VOP offset) from the VOP configuring unit $2_n$ are supplied to a picture-hierarchy forming unit 21.

The picture-hierarchy forming unit 21 generates picture data of at least one or more hierarchical layer (or forms a hierarchy of the VOP which comprises at least one or more hierarchical layer). That is to say, in a space-scalable encoding process, for example, the picture hierarchy forming unit 21 outputs data supplied thereto as picture data at a high-level layer (enhancement hierarchical layer) as it is, and reduces the number of pixels composing the picture data by applying typically a thinning technique (or decreases the picture resolution), outputting the thinned data as picture data at a low-level layer (base hierarchical layer).

It should be noted that, as an alternative, an input VOP is treated as data pertaining to a low-level layer and the picture resolution of the VOP is increased (or the number of pixels is raised) by using some means to produce a high-resolution picture as data pertaining to a high-level layer.

In addition, the number of hierarchical layers can be set at 1. In this case, however, the scalability is not enabled. It should be noted that, in this case, the VOP encoding unit $3_n$ typically comprises only a low-level layer encoding unit 25.

Furthermore, the number of hierarchical layers can be set at three or a value greater than three. For the sake of simplicity, a case with a hierarchical-layer count of 2 is explained below.

In a time-scalability (temporal-scalability) encoding process, for example, the picture-hierarchy forming unit 21 outputs picture data as data pertaining to low-level and high-level layers typically alternately with the lapse of time. To put it concretely, assume that VOPs composing a certain VO are input in the following order: VOP0, VOP1, VOP2, VOP3 and so on. In this case, VOPs each having an even subscript, namely, VOP0, VOP2, VOP4, VOP6 and so on, are each output as data pertaining to a low-level layer. On the other hand, VOPs each having an odd subscript, namely, VOP1, VOP3, VOP5, VOP7 and so on, are each output as data pertaining to a high-level layer. It should be noted that, in the case of temporal scalability, thinned VOPs are merely output as data pertaining to low-level and high-level layers and picture data is neither enlarged nor shrunk, that is, the picture resolution is not changed. It is worth noting, however, that picture data can also be either enlarged or shrunk, that is, the picture resolution can also be changed.

In an SNR (Signal to Noise Ratio)-scalability encoding process, for example, the picture-hierarchy forming unit 21 outputs picture data supplied thereto as data pertaining to a low-level or high-level layer as it is. That is to say, in this case, picture data pertaining to the low-level layer is the same as picture data pertaining to the high-level layer.

As for space scalability in an encoding process for each VOP, there are typically the following three possible types.

Assume now for example that a synthesized picture comprising pictures F1 and F2 like the ones shown in FIG. 2 is received as a VOP. In this case, first space scalability puts the entire input VOP as shown in FIG. 4A at a high-level layer (enhancement layer) and an entirely shrunk VOP as shown in FIG. 4B at a low-level layer (base layer) as shown in FIGS. 4A and 4B.

Figure 5A:
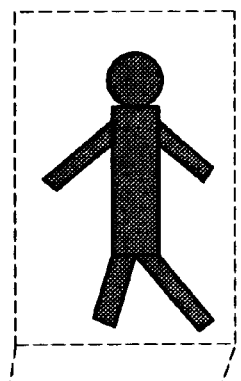
FIGS. 5A and 5B are diagrams used for explaining space scalability.
Figure 5B:
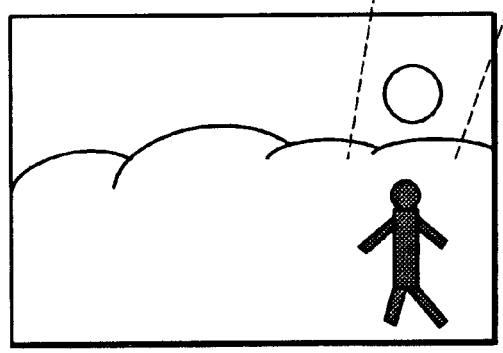

On the other hand, second space scalability extracts a partial object of the input VOP as shown in FIG. 5A for putting the partial object at a high-level layer and puts an entirely shrunk VOP as shown in FIG. 5B at a low-level layer. It should be noted that the extracted object corresponds to the picture F2 in this case and the object is extracted typically in the same way as the extraction carried out in the VOP configuring unit $2_n$ so that the extracted object can also be considered to be a VOP.

Figure 6A:
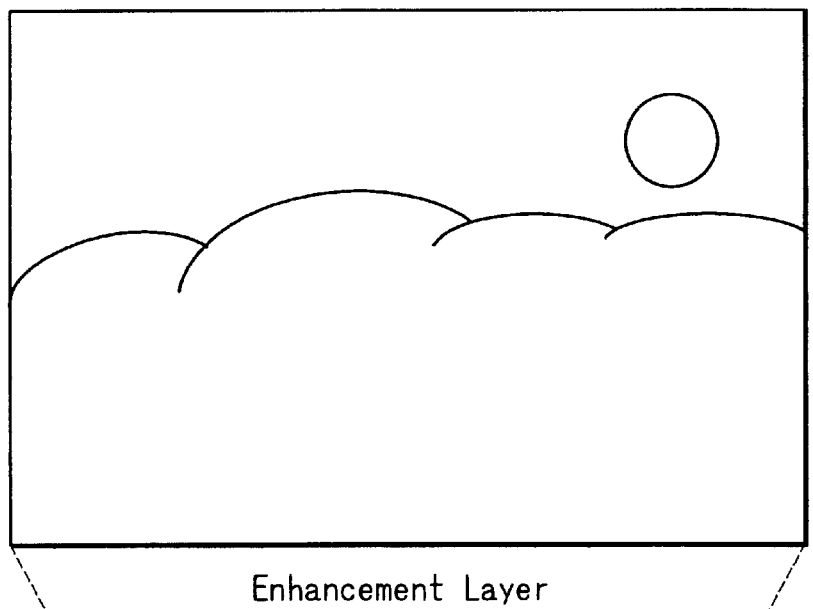
FIGS. 6A and 6B are diagrams used for explaining space scalability.
Figure 6B:
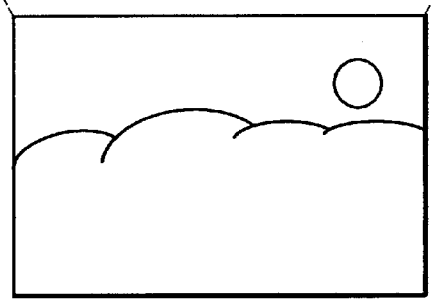
Figure 7A:
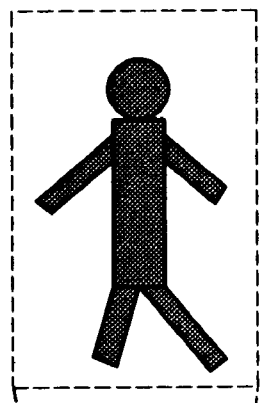
FIGS. 7A and 7B are diagrams used for explaining space scalability.
Figure 7B:

Further, third space scalability extracts objects (VOPs) composing an input VOP and generates high-level and low-level layers for each of the objects as shown in FIGS. 6A, 6B and 7. It should be noted that FIGS. 6A and 6B are diagrams showing generation of high-level and low-level layers from a background (that is, the picture F1) composing the VOP shown in FIG. 2 and FIGS. 7A and 7B are diagrams showing generation of high-level and low-level layers from a foreground (that is, the picture F2) composing the VOP shown in FIG. 2.

A type of scalability described above to be adopted is determined in advance and the picture-hierarchy forming unit 21 forms a hierarchy of a VOP so as to allow an encoding process based on the predetermined space scalability determined to be carried out.

In addition, the picture-hierarchy forming unit 21 computes (or determines) offset data representing positions of VOPs pertaining to the generated low-level and high-level layers in a predetermined absolute coordinate system and size data representing the sizes thereof from offset data and size data of the input VOP which are referred to hereafter as initial offset data and initial size data, respectively for the sake of convenience.

A technique of determining offset data (information on positions) and size data of VOPs pertaining to the low-level and high-level layers is exemplified by the second space scalability described earlier with reference to FIGS. 5A and 5B, for example.

Figure 8A:
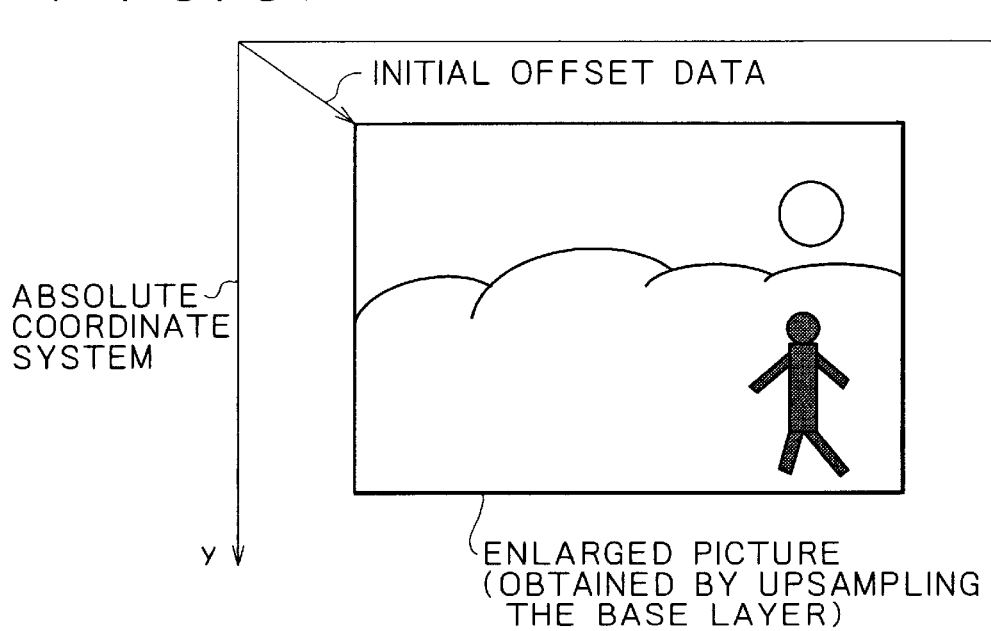
FIGS. 8A and 8B are diagrams used for explaining size data and offset data of a VOP.

Offset data FPOS_B for the low-level layer is determined so that the offset data of an enlarged picture in the absolute coordinate system matches the initial offset data as shown in FIG. 8A. The enlarged picture is obtained as a result of an enlargement process (an upsampling process) carried on in the picture data pertaining to the low-level layer on the basis of a difference between a resolution at the low-level layer and a resolution at the high-level layer. That is to say, the enlarged picture is obtained as a result of an enlargement process at a factor of enlargement that makes the size of the picture pertaining to the low-level layer match the size of the picture pertaining to the high-level layer. (In other words, the enlarged picture is obtained as a result of an enlargement process at a factor of enlargement equal to the reciprocal of a shrinking factor at which the picture pertaining to the high-level layer is shrunk to the picture pertaining to the low-level layer). The factor of enlargement is referred to hereafter as a scaling factor FR for the sake of convenience. By the same token, size data FSZ_B for the low-level layer is determined so that the size data of an enlarged picture obtained as a result of a process of enlarging the picture pertaining to the low-level layer at the scaling factor FR matches the initial size data. That is to say, the offset data FPOS_B and the size data FSZ_B are determined such data that the offset data and the size data of a picture obtained as a result of enlargement by the scaling factor FR match the initial offset data and the initial size data, respectively.

Figure 8B:
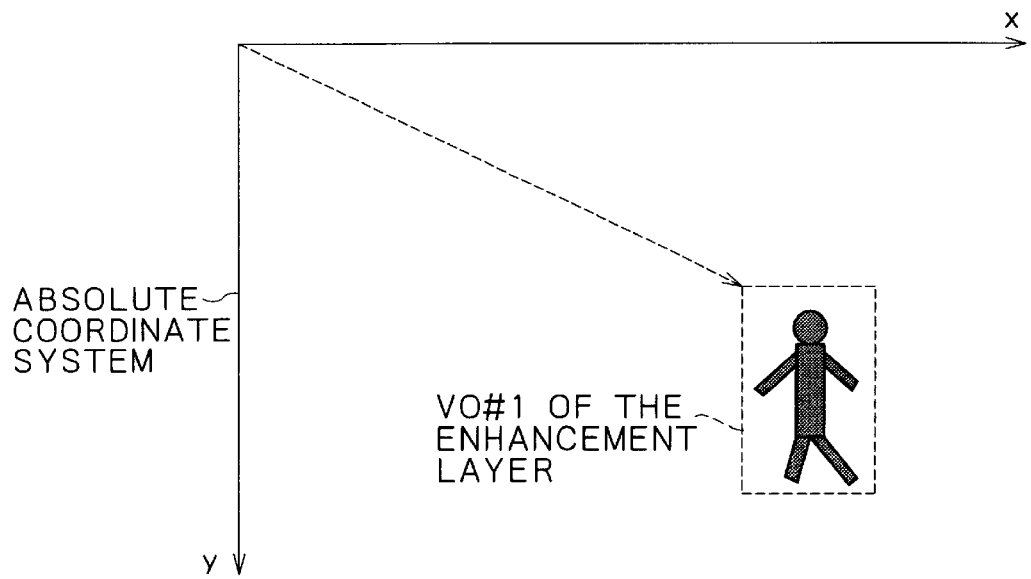

Offset data FPOS_E for the high-level layer is determined at a value of coordinates representing the position of typically the left upper corner of a smallest rectangle (a VOP) enclosing an object extracted from an input VOP as shown in FIG. 8B. The coordinates of the position of such a corner are found from the initial offset data. On the other hand, size data FSZ_E for the high-level layer is determined to be typically by the horizontal and vertical lengths of the smallest rectangle enclosing the object extracted from the input VOP.

Now, consider a picture frame with a size corresponding to transformed size data FSZ_B being placed in the absolute coordinate system at a position corresponding to transformed offset data FPOS_B where the transformed offset data FPOS_B and transformed size data FSZ_B are obtained as results of transformation of the offset data FPOS_B and the size data FSZ_B, respectively for the low-level layer at the scaling factor FR (That is to say, the transformed offset data FPOS_B and the transformed size data FSZ_B are referred to as the post-transformation offset data FPOS_B and the post-transformation size data FSZ_B, respectively). Also assume that an enlarged picture obtained as a result of an enlargement process of the picture data pertaining to the low-level layer by the scaling factor FR is placed at the same position as shown in FIG. 8A. Likewise, assume that the picture pertaining to the high-level layer with a size corresponding to the size-data FSZ_E for the high-level layer is placed in the absolute coordinate system at a position corresponding to the offset data FPOS_E for the high-level layer as shown in FIG. 8B. In this case, pixels composing the enlarged picture are placed in the same absolute coordinate system at locations coinciding with locations of corresponding pixels composing the picture pertaining to the high-level layer. In the case of the examples shown in FIGS. 8A and 8B, for instance, the person object in the picture pertaining to the high-level layer as shown in FIG. 8B is placed at a location coinciding with the location of a person object in the enlarged picture as shown in FIG. 8A.

Also in the case of the first and the third space scalability, offset data FPOS_B and FPOS_E as well as size data FSZ_B and FSZ_E are determined so that pixels composing an enlarged picture pertaining to the low-level layer are placed in the absolute coordinate system at locations coinciding with locations of corresponding pixels composing a picture pertaining to the high-level layer.

Refer back to FIG. 3, picture data, offset data FPOS_E and size data FSZ_E for the high-level layer generated by the picture-hierarchy forming unit 21 are delayed by a delay circuit 22 by a period of time equal to a processing time of a low-level-layer encoding unit 25 to be described later before being supplied to a high-level-layer encoding unit 23. On the other hand, picture data, offset data FPOS_B and size data FSZ_B for the low-level layer is supplied to the low-level-layer encoding unit 25. The scaling factor FR is supplied to the high-level-layer encoding unit 23 and a resolution transforming unit 24 by way of the delay circuit 22.

The low-level-layer encoding unit 25 encodes picture data pertaining to the low-level layer to generate a bitstream including offset data FPOS_B and size data FSZ_B as a result of the encoding process. The encoded bitstream is supplied to a multiplexer 26.

In addition, the low-level-layer encoding unit 25 locally decodes an encoded bitstream and outputs picture data at the low-level layer obtained as a result of the local decoding process to the resolution transforming unit 24. The resolution transforming unit 24 enlarges or shrinks the picture data pertaining to the low-level layer received from the low-level-layer encoding unit 25 at the scaling factor FR in order to restore the picture to the original size. A picture obtained as a result of the enlargement/shrinking process is supplied to the high-level-layer encoding unit 23.

On the other hand, the high-level-layer encoding unit 23 encodes picture data pertaining to the high-level layer to generate an encoded bitstream including offset data FPOS_E and size data FSZ_E as a result of the encoding process. The encoded bitstream is supplied to the multiplexer 26. It should be noted that the high-level-layer encoding unit 23 encodes picture data pertaining to the high-level layer by using an enlarged picture received from the resolution transforming unit 24 as a reference picture as will be described later.

The multiplexer 26 multiplexes the outputs of the high-level-layer encoding unit 23 and the low-level-layer encoding unit 25 for output ting multiplexed data.

It should be noted that the low-level-layer encoding unit 25 supplies information such as the size data FSZ_B, the offset data FPOS_B, a motion vector MV and a COD flag to the high-level-layer encoding unit 23. The high-level-layer encoding unit 23 carries out processing by referring to the information if necessary as will be described later in detail.

Figure 53:
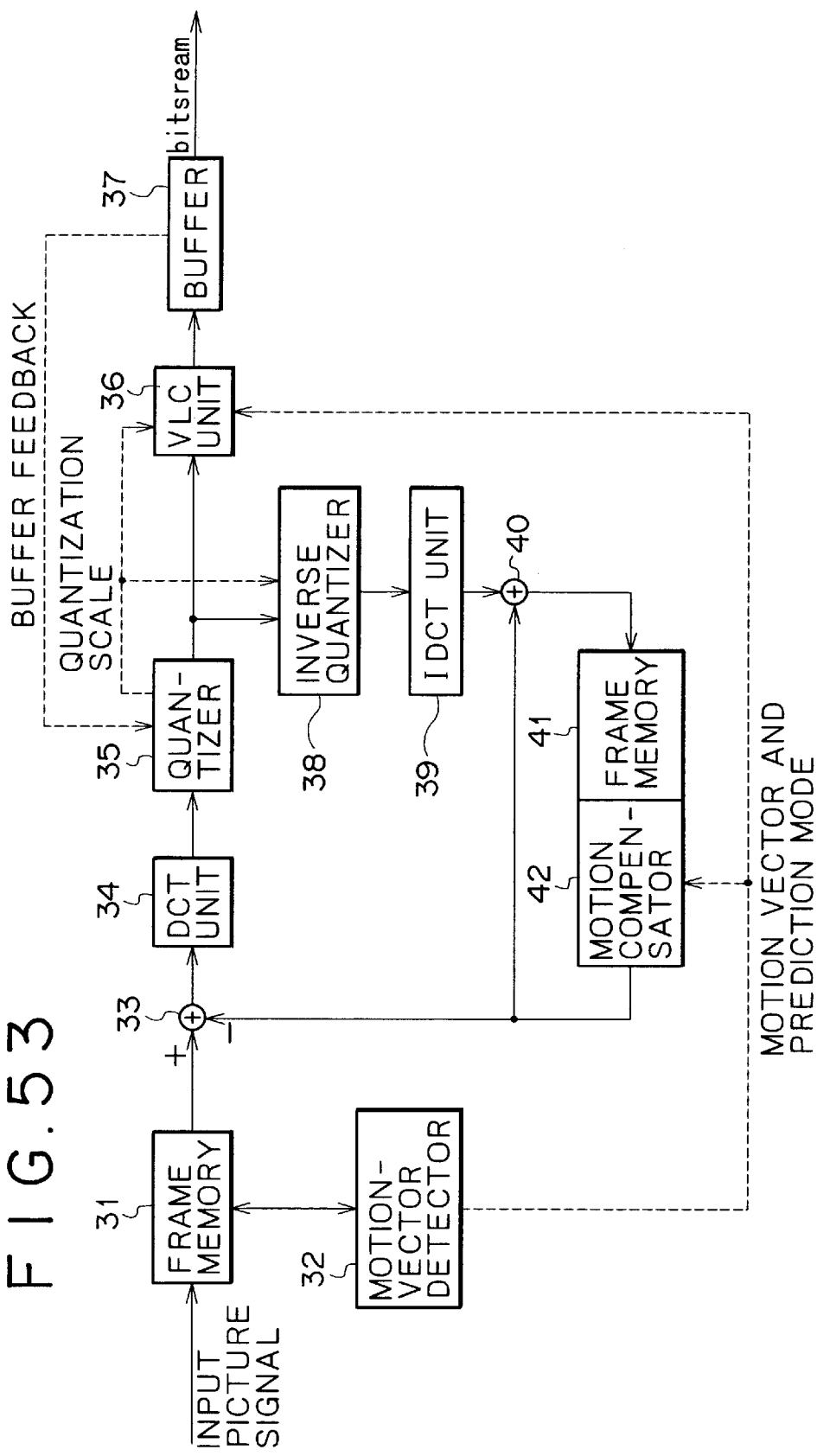
FIG. 53 is a block diagram showing a typical configuration of the conventional encoder.

FIG. 9 is a block diagram showing a typical detailed configuration of the low-level -layer encoding unit 25 shown in FIG. 3. It should be noted that components identical with those shown in FIG. 53 are denoted by the same reference numerals as the latter. That is to say, the low-level-layer encoding unit 25 basically has a configuration similar to the encoder shown in FIG. 53.

Much like the encoder shown in FIG. 53, picture data output by the picture-hierarchy forming unit 21 (shown in FIG. 3) is supplied to the frame memory 31 to be stored therein. The motion-vector detector 32 detects a motion vector for each macroblock.

It should be noted, however, that the size data FSZ_B and the offset data FPOS_B of a VOP pertaining to the low-level layer are supplied to the motion-vector detector 32 employed in the low-level-layer encoding unit 25. The motion-vector detector 32 detects a motion vector of a macroblock based on the size data FSZ_B and the offset data FPOS_B.

That is to say, since a VOP has the size and the position changing from time to time (or from frame to frame) as described before, in detection of its motion vector, it is necessary to set a coordinate system serving as a reference for the detection and to detect a motion in the coordinate system. In this case, the motion-vector detector 32 thus takes the absolute coordinate system cited before as a coordinate system to be used as the reference, places the VOP of an encoded object and a VOP serving as a reference picture in the absolute coordinate system in accordance with the size data FSZ_B and the offset data FPOS_B and detects a motion vector.

It should be noted that a detected motion vector (MV) and information on a prediction mode are supplied also to the high-level-layer encoding unit 23 (shown in FIG. 3) in addition to the VLC unit 36 and the motion compensator 42.

Also in motion compensation, since it is necessary to detect a motion also in the coordinate system used as the reference, the size data FSZ_B and the offset data FPOS_B are supplied to the motion compensator 42.

(A macroblock of) a VOP with the motion vector thereof detected is supplied to the VLC unit 36 as a quantized coefficient as is the case with the encoder shown in FIG. 53. Much like the encoder shown in FIG. 53, the VLC unit 36 receives the size data FSZ_B and the offset data FPOS_B from the picture-hierarchy forming unit 21 in addition to a quantized coefficient, information on a quantization step, the motion vector and information on a prediction mode. In the VLC unit 36, these pieces of data are all subjected to a variable-length encoding process.

(A macroblock of) a VOP with the motion vector thereof detected is not only encoded as described above, but also locally decoded as is the case with the encoder shown in FIG. 53 and a result of the local decoding is stored in the frame memory 41. The locally decoded picture is used as a reference picture as described above and also output to the resolution transforming unit 24 shown in FIG. 3.

It should be noted that, unlike the MPEG1 and MPEG2 systems, a B-picture (B-VOP) is also used as a reference picture in the MPEG4 system. For this reason, a B-picture is also locally decoded and stored in the frame memory 41. (It is worth noting, however, that a locally decoded B-picture is used as a reference picture only for the high-level layer only, so far by now).

On the other hand, the VLC unit 36 determines whether or not a macroblock of an I, P or B-picture (I-VOP, P-VOP or B-VOP) is to be treated as a skip macroblock and sets or resets flags COD and MODB in accordance with a result of the determination. The COD and MODB flags are also transmitted after completing a variable-length encoding process. In addition, the COD flag is also supplied to the high-level-layer encoding unit 23.

Figure 10:
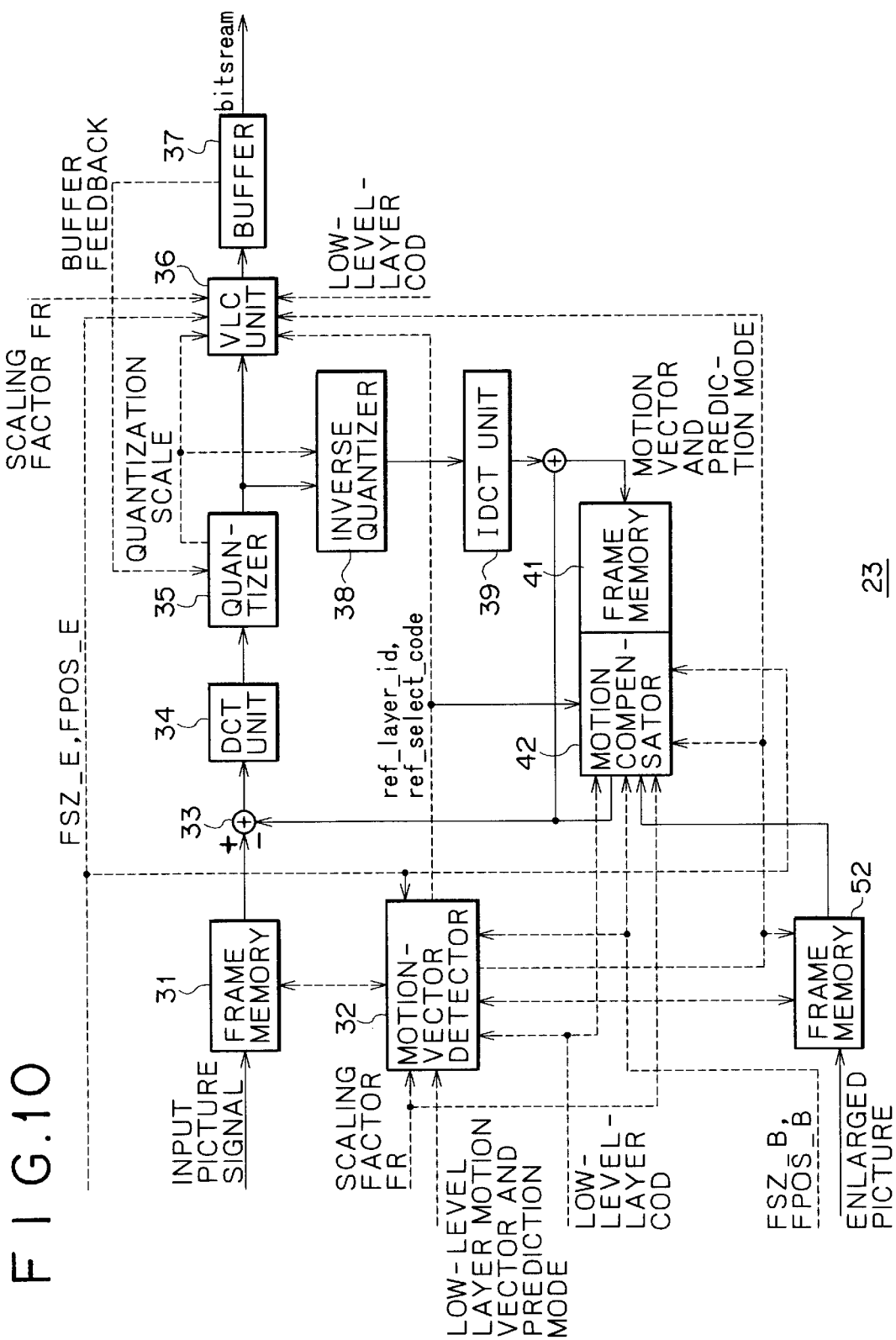
FIG. 10 is a block diagram showing a typical configuration of a high-level-layer encoding unit shown FIG. 3.

FIG. 10 is a block diagram showing a typical configuration of the high-level-layer encoding unit 23 shown in FIG. 3. It should be noted that components identical with those shown in FIG. 9 or 53 are denoted by the same reference numerals. As is obvious from the figures, the high-level-layer encoding unit 23 basically has the same configuration as the low-level-layer encoding unit 25 shown in FIG. 9 or the encoder shown in FIG. 53 except that, in the case of the high-level-layer encoding unit 23, a frame memory 52 is newly provided.

Picture data generated by the picture-hierarchy forming unit 21 shown in FIG. 3, that is, a VOP pertaining to the high-level layer, is supplied to the frame memory 31 to be stored therein before being subjected to motion-vector detection carried out by the motion-vector detector 32 in macroblock units as is the case with the encoder shown in FIG. 53. It should be noted that, also in this case, the size data FSZ_E and the offset data FPOS_E are also supplied to the motion-vector detector 32 in addition to the VOP pertaining to the high-level layer as is the case with the low-level-layer encoding unit 25 shown in FIG. 9. Much like the low-level-layer encoding unit 25, the motion-vector detector 32 recognizes the position of the VOP pertaining to the high-level layer in the absolute coordinate system for detecting a motion vector of a macroblock based on the size data FSZ_E and the offset data FPOS_E.

The motion-vector detectors 32 of the high-level-layer encoding unit 23 and the low-level-layer encoding unit 25 each process VOPs in accordance with a predetermined sequence which is set in advance as is the case with the encoder described earlier by referring to FIG. 53. The sequence is set typically as follows.

Figure 11:
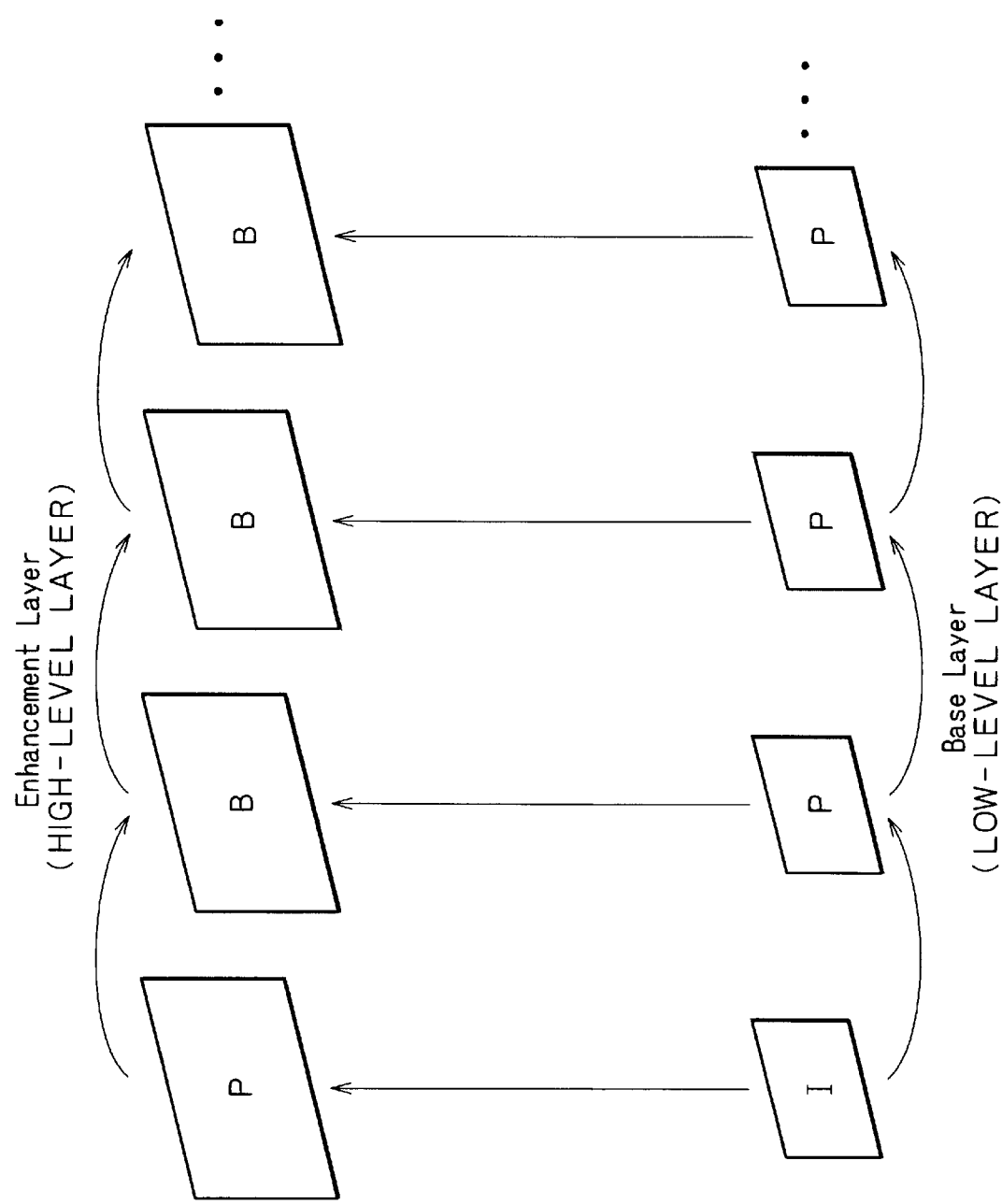
FIGS. 11A and 11B are diagrams used for explaining space scalability.

In the case of the space scalability, VOPs pertaining to the high-level layer are processed in a sequence which is set as follows: P, B, B, B and so on as shown in FIG. 11A. On the other hand, VOPs pertaining to the low-level layer are processed in a sequence which is set as follows: I, P, P, P and so on as shown in FIG. 11B.

In this case, a P-picture (P-VOP) which is the first VOP (in the display sequence) at the high-level layer is encoded by using typically a VOP pertaining to the low-level layer displayed at the same time as the P-picture (an I-picture or an I-VOP in the display sequence for the low-level layer) as a reference picture. Then, B-pictures (B-VOPs) which are the second and subsequent VOPs pertaining to the high-level layer are encoded sequentially one after another by using typically a VOP pertaining to the high-level layer immediately preceding the B-picture being encoded and a VOP pertaining to the low-level layer displayed at the same time as the B-picture being encoded as reference pictures. In this way, each B-picture pertaining to the high-level layer is used as a reference picture similar to a P-picture pertaining to the low-level layer for encoding another VOPS.

It should be noted that each VOP pertaining to the low-level layer is encoded in the same way as, for example, the MPEG1, MPEG2 or H.263 system.

The SNR-scalable encoding process can be considered to be the same as the space-scalable encoding process for a scaling factor FR of 1. Thus, SNR-scalability VOPs are encoded in the same way as space-scalability VOPs.

Figure 12:
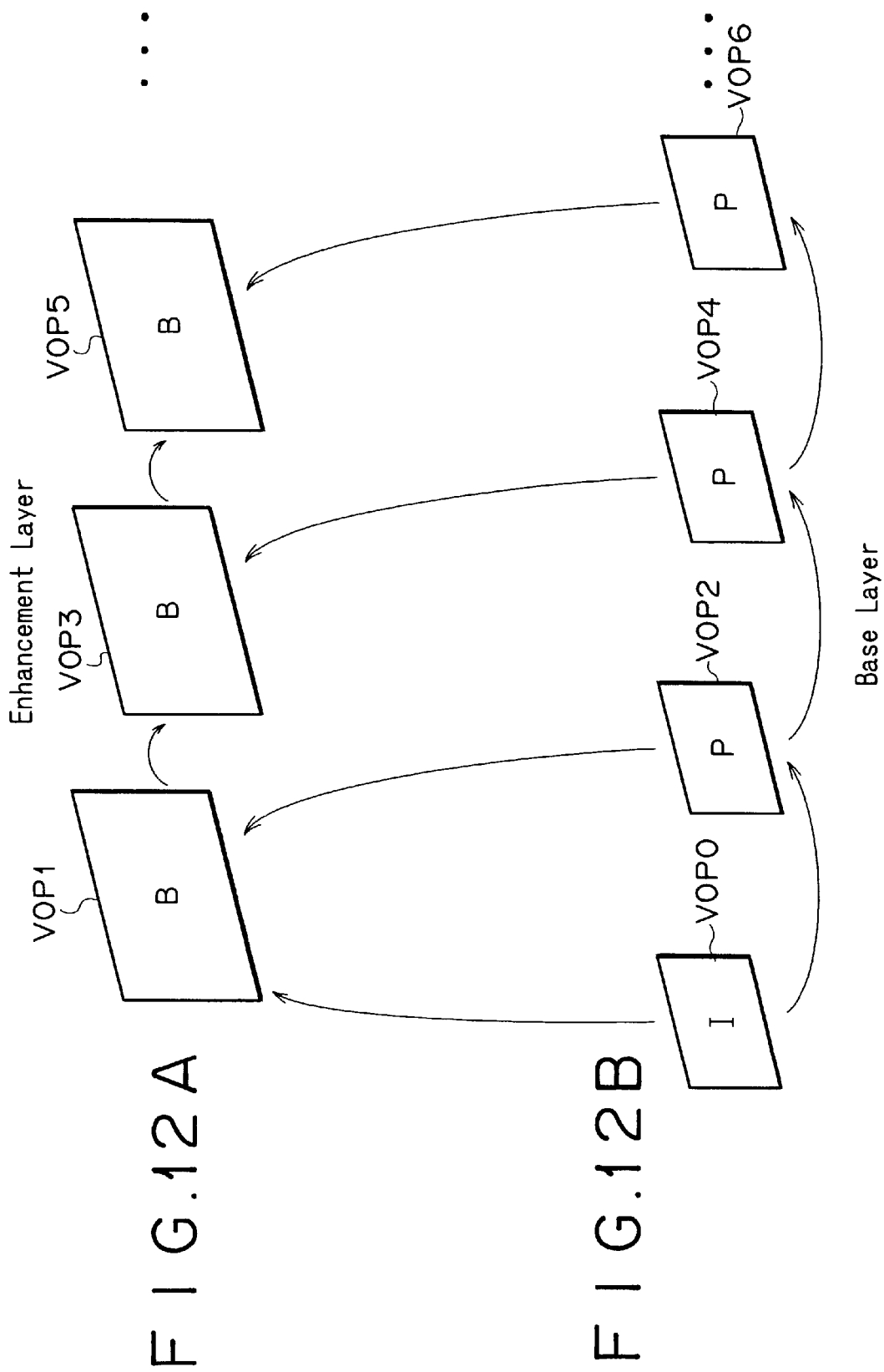
FIGS. 12A and 12B are diagrams used for explaining temporal scalability.

In the case of the temporal scalability, on the other hand, a VO typically comprises VOP0, VOP1, VOP2, VOP3 and so on as described above, with VOPs each having an odd subscript, namely, VOP1, VOP3, VOP5, VOP7 and so on, put at the high-level layer as shown in FIG. 12A and VOPs each having an even subscript, namely, VOP0, VOP2, VOP4, VOP6 and so on, put at the low-level layer as shown in FIG. 12B. As shown in FIGS. 12A and 12B, the VOPs pertaining to the high-level layer are each processed typically as a B-picture and the VOPs pertaining to the low-level layer are each processed typically as an I-picture, a P-picture, a P-picture, a P-picture and so on.

In this case, the first picture in the display sequence, VOP1 (a B-picture) at the high-level layer is encoded by using typically VOPO (an I-picture) and VOP2 (a P-picture) pertaining to the low-level layer as reference pictures. Then, the second picture VOP3 (a B-picture) pertaining to the high-level layer is encoded by using typically the immediately preceding picture VOP1 encoded as a B-picture pertaining to the high-level layer and a picture VOP4 (a P-picture) displayed at a time (frame) immediately after VOP3 pertaining to the low-level layer as reference pictures. Much like VOP3, the third picture VOP5 (a B-picture). pertaining to the high-level layer is then encoded by using typically the immediately preceding picture VOP3 encoded as a B-picture pertaining to the high-level layer and a picture VOP6 (a P-picture) displayed at a time (frame) immediately after VOP5 pertaining to the low-level layer as reference pictures.

As described above, when a VOP pertaining to a certain layer (the high-level layer in this case) is encoded as a P or B-picture, a VOP pertaining to another layer (a scalable layer or the low-level layer in this case) can be used as a reference picture. When a VOP pertaining to a certain layer is used as a reference picture for encoding a VOP pertaining to another layer, that is, when a VOP pertaining to the low-level layer is used as a reference picture in a prediction-encoding process of a VOP pertaining to the high-level layer as is the case described above, the motion-vector detector 32 employed in the high-level-layer encoding unit 23 shown in FIG. 10 sets and outputs a ref_layer_id flag indicating that a VOP pertaining to another layer is used as a reference picture. (If 3 or more hierarchical layers exist, the ref_layer_id flag represents the layer to which a VOP used as a reference picture pertains).

In addition, the motion-vector detector 32 employed in the high-level-layer encoding unit 23 also sets and outputs a ref_select_code flag (reference image information) indicating which layer of a VOP to be used as a reference picture, either in a forward-prediction encoding process or a backward-prediction encoding process in accordance with the ref_layer_id flag for a VOP to be encoded.

For example, assume that a P-picture pertaining to the high-level layer (the enhancement layer) is encoded by using a VOP which pertains to the same layer and was decoded (locally decoded) immediately before the P-picture itself as a reference picture. In this case, the ref_select_code flag is set at "00". As an alternative, the P-picture can also be encoded by using a VOP which is displayed immediately before the P-picture itself and pertains to a different layer (the reference layer or the low-level layer in this case) as a reference picture. In this case, the ref_select_code flag is set at "01". As another alternative, the P-picture can also be encoded by using a VOP which is displayed immediately after the P-picture and pertains to the different layer as a reference picture. In this case, the ref_select_code flag is set at "10". As still another alternative, the P-picture can also be encoded by using a VOP which is displayed at the same time as the P-picture and pertains to the different layer as a reference picture. In this case, the ref_select_code flag is set at "11".

On the other hand, assume for example that a B-picture pertaining to the high-level layer is encoded by using a VOP displayed at the same time pertaining to a different layer as a reference picture for forward prediction, and a VOP which pertains to the same layer and was decoded immediately before the B-picture as a reference picture for backward prediction. In this case, the ref_select_code flag is set at "00". As an alternative, the B-picture pertaining to the high-level layer can also be encoded by using a VOP pertaining to the same layer as a reference picture for forward prediction, and a VOP which is displayed immediately before the B-picture and pertains to the different layer as a reference picture for backward prediction. In this case, the ref_select_code flag is set at "01". As another alternative, the B-picture pertaining to the high-level layer can also be encoded by using a VOP which pertains to the same layer and was decoded immediately before the B-picture as a reference picture for forward prediction, and a VOP which is displayed immediately after the B-picture and pertains to the different layer as a reference picture for backward prediction. In this case, the ref_select_code flag is set at "10". As still another alternative, the B-picture pertaining to the high-level layer can also be encoded by using a VOP which is displayed immediately before the B-picture and pertains to the different layer as a reference picture for forward prediction, and a VOP which is displayed immediately after the B-picture and pertains to the different layer as a reference picture for backward prediction. In this case, the ref_select_code flag is set at "11".

The prediction-encoding methods shown in FIGS. 11A, 11B, 12A and 12B are typical. It is possible to select VOPs to be used as reference pictures for forward-prediction encoding, backward-prediction encoding and bidirectional-prediction encoding processes as well as layers of the VOPs within typically the range described above with a high degree of freedom.

It should be noted that, in the case described above, the technical terms "space scalability", "temporal scalability" and "SNR scalability" are used only for the sake of convenience. If a reference picture to be used in a prediction-encoding process is set in accordance with the ref_select_code flag, however, it will be difficult to clearly distinguish the space scalability, the temporal scalability and the SNR scalability from each other. Conversely speaking, by using the ref_select_code flag, a reference picture to be used in a prediction-encoding process can be selected without the need to distinguish the space scalability, the temporal scalability and the SNR scalability from each other.

The scalability described above can be associated with the ref_select_code flag for example as follows. In the case of a P-picture, a ref_select_code flag of "11" corresponds to the space scalability or the SNR scalability since a VOP which pertains to a layer indicated by the ref_layer_id flag and is displayed at the same time as the P-picture itself is used as a reference picture (a reference picture for forward prediction) for such a ref_select_code flag. A ref_select_code flag having a value other than "11" corresponds to the temporal scalability.

In the case of a B-picture, on the other hand, a ref_select_code flag of "00" corresponds to the space scalability or the SNR scalability since a VOP which pertains to a layer indicated by the ref_layer_id flag and is displayed at the same time as the P-picture is also used as a reference picture for forward prediction for such a ref_select_code flag. A ref_select_code flag having a value other than "00" corresponds to the temporal scalability.

It should be noted that, when a VOP which pertains to a different layer (the low-level layer in this case) and is displayed at the same time as a VOP pertaining to the high-level layer is used as a reference picture in a prediction-encoding process of the VOP pertaining to the high-level layer, there is no motion between the two VOPs. Thus, the motion vector is always set at 0 or (0, 0).

Refer back to FIG. 10, the motion-vector detector 32 employed in the high-level-layer encoding unit 23 sets the ref_layer_id_ and the ref_select_code flags likes the ones described above, supplying the flags to the motion compensator 42 and the VLC unit 36.

In addition, in accordance with the ref_layer_id_ and the ref_select_code flags, the motion-vector detector 32 refers to not only the frame memory 31 but also to the frame memory 52 if necessary, in order to detect a motion vector.

The frame memory 52 receives a locally decoded enlarged picture pertaining to the low-level layer from the resolution transforming unit 24 shown in FIG. 3. That is to say, the resolution transforming unit 24 enlarges (interpolates) a locally decoded VOP pertaining to the low-level layer, typically by means of the so-called interpolation filter, magnifying the VOP by FR times to create an enlarged picture, that is, an enlarged picture with the same size of a VOP at the high-level layer corresponding to the VOP pertaining to the low-level layer. The enlarged picture is then supplied by the resolution transforming unit 24 to the high-level-layer encoding unit 23 and stored in the frame memory 52.

Thus, for a scaling factor FR of 1, the resolution transforming unit 24 does not specially carry out processing on a locally decoded VOP generated by the low-level-layer encoding unit 25 and supplies the VOP to the high-level-layer encoding unit 23 as it is.

The motion-vector detector 32 receives size data FSZ_B and offset data FPOS_B from the low-level-layer encoding unit 25 as well as the scaling factor FR from the delay circuit 22 shown in FIG. 3. When the enlarged picture stored in the frame memory 52 is used as a reference picture, that is, when a VOP which pertains to the low-level layer and is displayed at the same time as a VOP pertaining to the high-level layer is used as a reference picture in a prediction-encoding process of the VOP pertaining to the high-level layer (in this case, the ref_select_code_flag is set at "11" for a P-picture or "00" for a B-picture), the motion-vector detector 32 multiplies the size data FSZ_B and the offset data FPOS_B corresponding to the enlarged picture by the scaling factor FR. On the basis of a result of the multiplication, the motion-vector detector 32 then recognizes the position of the enlarged picture in the absolute coordinate system and detects a motion vector.

It should be noted that the motion-vector detector 32 receives information on the prediction mode and a motion vector for the low-level layer which are used in the following case. For example, with the ref_select_code flag for a B-picture of the high-level layer set at "00" and a scaling factor FR set at 1, that is, in the case of the SNR scalability, the motion-vector detector 32 can use the prediction mode and the motion vector of a picture which pertains to the low-level layer and is displayed at the same time as the B-picture pertaining to the high-level layer in the prediction-encoding process of the B-picture pertaining to the high-level layer as they are since the picture pertaining to the low-level layer is the same time as the picture pertaining to the high-level layer. (It should be noted, however, that the SNR scalability in this case is different from the SNR scalability prescribed in the MPEG2 specifications in that, in this case, a VOP pertaining to the high-level layer is used in a prediction-encoding process pertaining to the high-level layer). Thus, in this case, the motion-vector detector 32 does not specially carry out processing on the B-picture pertaining to the high-level layer and adopts the prediction mode as well as the motion vector for the low-level layer as they are.

It should be noted that, in this case, the motion-vector 32 does not output (thus, does not transfer) a motion vector and information on the prediction mode to the VLC unit 36, those employed in the high-level layer encoding unit 23. This is because, on the receiver side, a motion vector and a prediction mode for the high-level layer can be recognized from a result of a decoding process on the high-level layer.

As described above, the motion-vector detector 32 detects a motion vector by using even an enlarged picture in addition to a VOP pertaining to the high-level layer as reference pictures. In addition, as described earlier by referring to FIG. 53, a prediction mode that reduces a prediction residual (or a variation) to a minimum is set. Moreover, the motion-vector detector 32 sets and outputs typically the ref_select_code and the ref_layer_id flags and other necessary information.

It should be noted that the high-level encoding unit 23 supplies a COD flag to the motion-vector detector 32, the.VLC unit 36 and the motion compensator 42 as shown in FIG. 10. The COD flag is a flag indicating whether or not a macroblock composing an I or P-picture pertaining to the high-level layer is a skip macroblock.

A macroblock with a motion vector thereof detected is encoded as is the case described above. As a result, the VLC unit 36 outputs a variable-length code as a result of the encoding process.

It should be noted that the VLC unit 36 employed in the high-level-layer encoding unit 23 sets and outputs the COD and MODB flags as the VLC unit 36 employed in the low-level-layer encoding unit 25. As described above, the COD flag is a flag indicating whether or not a macroblock composing an I or P-picture pertaining to the low-level layer is a skip macroblock. On the other hand, the MDOB flag is a flag indicating whether or not a macroblock composing a B-picture is a skip macroblock.

In addition, the VLC unit 36 also receives a scaling factor FR, the ref_select_code and the ref_layer_id flags, size data FSZ_E and offset data FPOS_E in addition to a quantization coefficient, a quantization step, a motion vector and a prediction mode. The VLC unit 36 converts and outputs each of these pieces of information into a variable-length code.

On the other hand, the macroblock with a motion vector thereof detected is also locally decoded as described above after being encoded and then stored into the frame memory 41. Then, much like the motion-vector detector 32, the motion compensator 42 carries out motion compensation by using not only a VOP of the high-level layer locally decoded and stored in the frame memory 41 but also an enlarged VOP of the low-level layer locally decoded and stored in the frame memory 52 as reference pictures to create a predicted picture.

That is to say, the motion compensator 42 receives a scaling factor FR, the ref_select_code and the ref_layer_id. flags, size data FSZ_E and offset data FPOS_E, size data FSZ_B and offset data FPOS_B in addition to a motion vector and a prediction mode. Then, the motion compensator 42 recognizes a reference picture to be subjected to motion compensation on the basis of the ref_select_code and the ref_layer_id flags. If a locally decoded VOP pertaining to the high-level layer or an enlarged picture is used as a reference picture, the motion compensator 42 further recognizes its size and its position in the absolute coordinate system by using the size data FSZ_E and the offset data FPOS_E or the size data FSZ_B and the offset data FPOS_B, respectively and creates a predicted picture by using the scaling factor FR if necessary.

Figure 13:
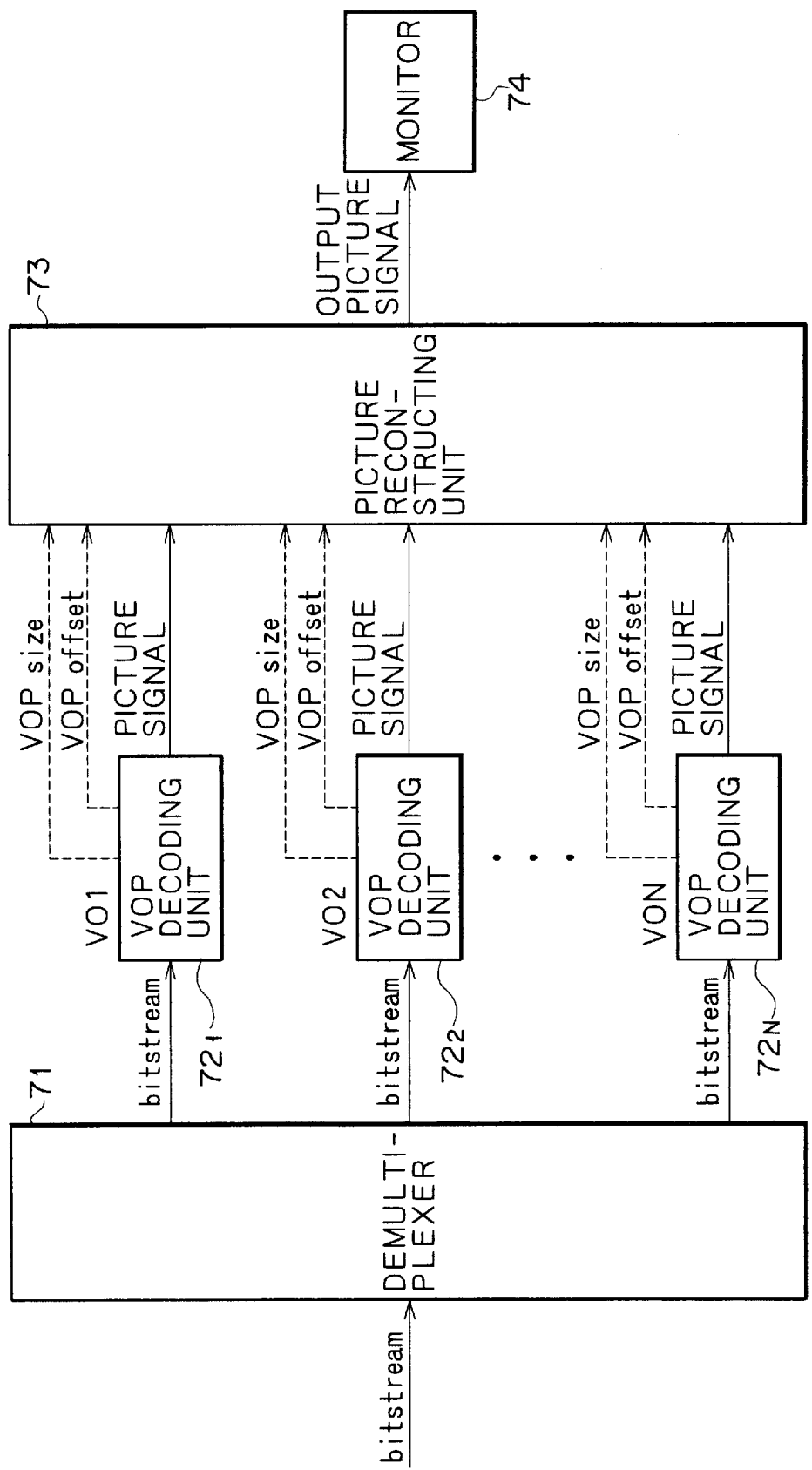
FIG. 13 is a block diagram showing a typical configuration of an embodiment implementing a decoder to which the present invention is applied.

FIG. 13 is a block diagram showing a typical configuration of an embodiment implementing a decoder for decoding a bitstream output by the encoder shown in FIG. 1.

An encoded bitstream generated by the encoder shown in FIG. 1 is supplied to this decoder through a transmission line 5 or by using a recording medium 6. To put it in detail, a bitstream generated by the encoder shown in FIG. 1 and transmitted through the transmission line 5 is received by a receiver not shown in the figure and then supplied to a demultiplexer 71. As an alternative, a bitstream generated by the encoder shown in FIG. 1 and recorded on the recording medium 6 is played back by a playback apparatus also not shown in the figure and then supplied to the demultiplexer 71.

The demultiplexer 71 thus receives the encoded bitstream which is also referred to as a VS (Visual Object Sequence) to be described later. The demultiplexer 71 further splits the bitstream supplied thereto into bitstreams VO#1, VO#2 and so on which are each a bitstream of a VO. The bitstreams VO#1, VO#2 and so on are each supplied to a VOP decoding unit $72_n$ associated with the bitstream. The VOP decoding unit $72_n$ decodes the bitstream received from the demultiplexer 71 to produce a VOP (picture data), size data (VOP size) and offset data (VOP offset) composing the VO, which are then supplied to a picture reconstructing unit 73.

The picture reconstructing unit 73 reconstructs the original picture based on the outputs of the VOP decoding units $72_1$ to $72_N$. The reconstructed picture is then supplied to typically a monitor 74 to be displayed thereon.

FIG. 14 is a block diagram showing a typical configuration of the VOP decoding unit $72_n$ of FIG. 13 for enabling scalability.

A bitstream supplied by the demultiplexer 71 shown in FIG. 13 is supplied to a demultiplexer 91 for splitting the bitstream into a bitstream of a VOP pertaining to the high-level layer and a bitstream of a VOP pertaining to the low-level layer. The bitstream of a VOP pertaining to the high-level layer is delayed by a delay circuit 92 by a time to carry out processing in a low-level-layer decoding unit 95 before being supplied to a high-level-layer decoding unit 93. On the other hand, the bitstream of a VOP pertaining to the low-level layer is supplied directly to the low-level-layer decoding unit 95.

The low-level-layer decoding unit 95 decodes the bitstream of a VOP pertaining to the low-level layer and supplies a decoded picture of the low-level layer obtained as a result of the decoding process to a resolution transforming unit 94. In addition, the low-level-layer decoding unit 95 also supplies information required for decoding a VOP pertaining to the high-level layer to the high-level-layer decoding unit 93. The information includes a motion vector (MV), a prediction mode, a COD flag, size data FSZ_B and offset data FPOS_B which are each obtained as a result of the process to decode the bitstream of a VOP pertaining to the low-level layer.

The high-level-layer decoding unit 93 decodes the bitstream of a VOP at the high-level layer received from the delay circuit 92 by referring to the information received from the low-level-layer decoding unit 95 and data output by the resolution transforming unit 94 if necessary to produce a decoded picture, size data FSZ_E and offset data FPOS_E of the high-level layer which are each obtained as a result of the decoding process. In addition, the high-level-layer decoding unit 93 supplies a scaling factor FR also obtained as a result of the process to decode the bitstream of a VOP pertaining to the high-level layer to the resolution transforming unit 94. The resolution transforming unit 94 transforms a decoded picture pertaining to the low-level layer by using the scaling factor FR received from the high-level layer-decoding unit 93 in the same way as the resolution transforming unit 24 shown in FIG. 3. An enlarged picture obtained as a result of this transformation is supplied to the high-level-layer decoding unit 93 to be used in the process of decoding the bitstream of a VOP pertaining to the high-level layer described above.

Figure 15:
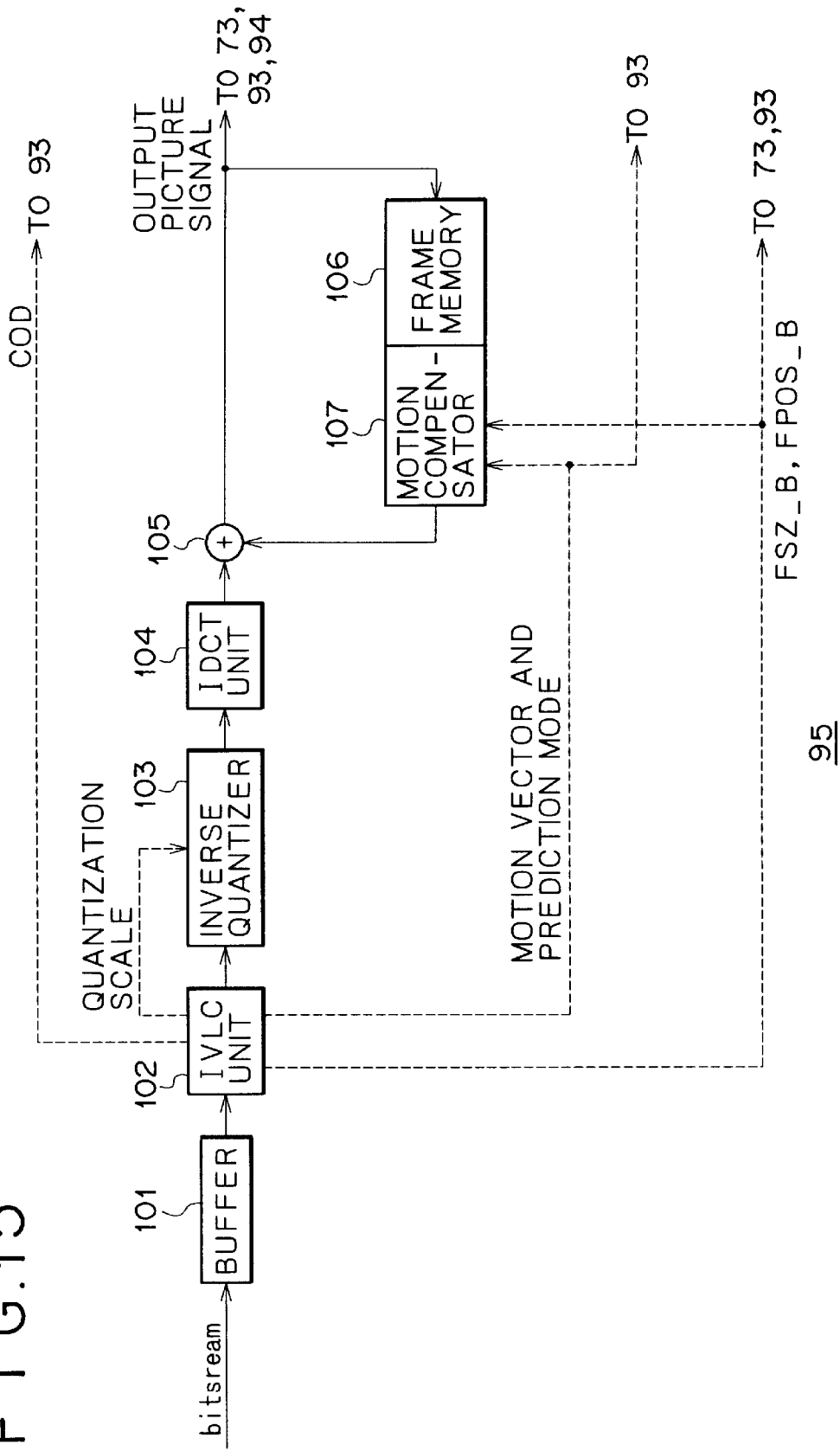
FIG. 15 is a block diagram showing a typical configuration of a low-level-layer decoding unit shown in FIG. 14.
Figure 54:
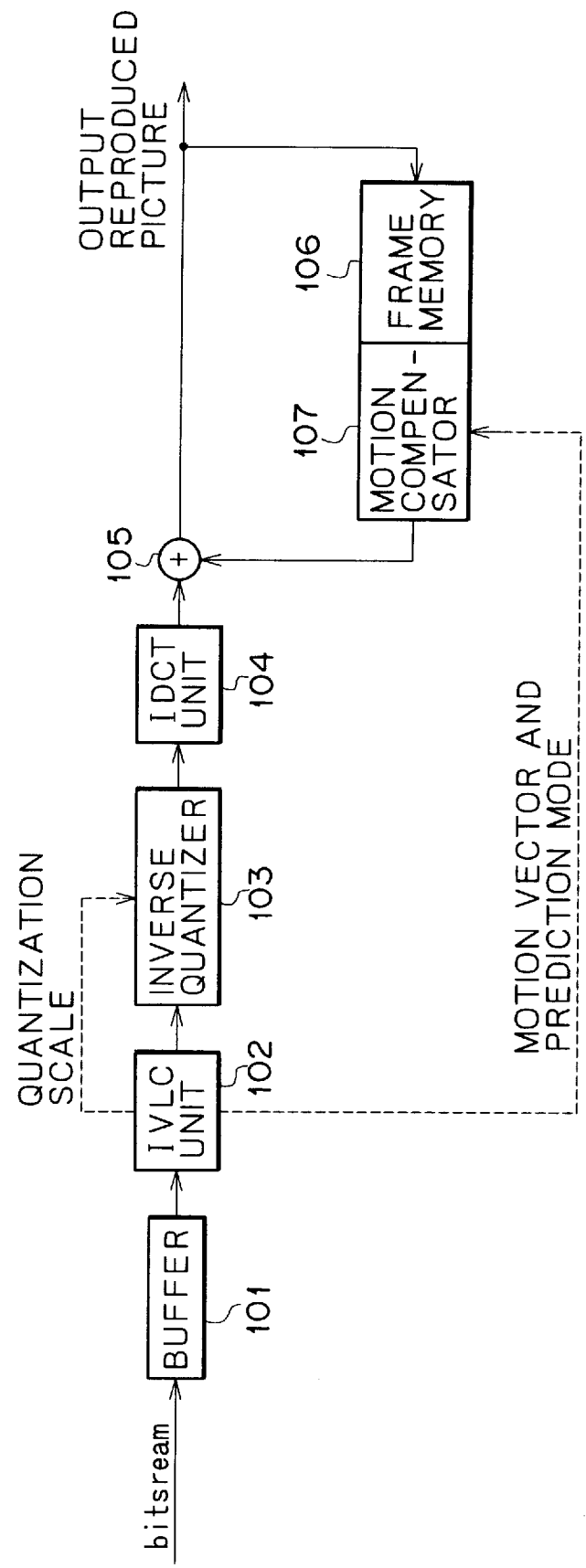
FIG. 54 is a block diagram showing a typical configuration of the conventional decoder.

FIG. 15 is a block diagram showing a typical configuration of the low-level-layer decoding unit 95 shown in FIG. 14. It should be noted that components of FIG. 15 identical with those employed in the decoder shown in FIG. 54 are denoted by the same reference numerals. The low-level-layer decoding unit 95 basically has a configuration similar to that of the decoder shown in FIG. 54.

A bitstream of a VOP at the low-level layer generated by the demultiplexer 91 is supplied to a buffer 101 to be temporarily stored therein. An IVLC unit 102 appropriately reads out the bitstream from the buffer 101 in accordance with a state of processing of a block at the following stage, carrying out a variable-length decoding process on the bitstream to split it into pieces of information including a quantization coefficient, a motion vector, a prediction mode, a quantization step, size data FSZ_B, offset data FPOS_B and a COD flag. The quantization coefficient and the quantization step are supplied to an inverse quantizer 103 whereas the motion vector and the prediction mode are supplied to a motion compensator 107 and the high-level-layer decoding unit 93 shown in FIG. 16. The size data FSZ_B and the offset data FPOS_B are supplied to. the motion compensator 107, the picture reconstructing unit 73 shown in FIG. 13 and the high-level-layer decoding unit 93 whereas the COD flag is supplied to the high-level-layer decoding unit 93.

The inverse quantizer 103, an IDCT unit 104, a processor 105, a frame memory 106 and the motion compensator 107 carry out the same pieces of processing as the inverse quantizer 38, an IDCT unit 39, the processor 40, the frame memory 41 and the motion compensator 42 employed in the low-level-layer encoding unit 25, respectively shown in FIG. 9 to produce a decoded VOP of the low-level layer which is then supplied to the picture reconstructing unit 73, the high-level-layer decoding unit 93 and the resolution transforming unit 94 shown in FIG. 14.

Figure 16:
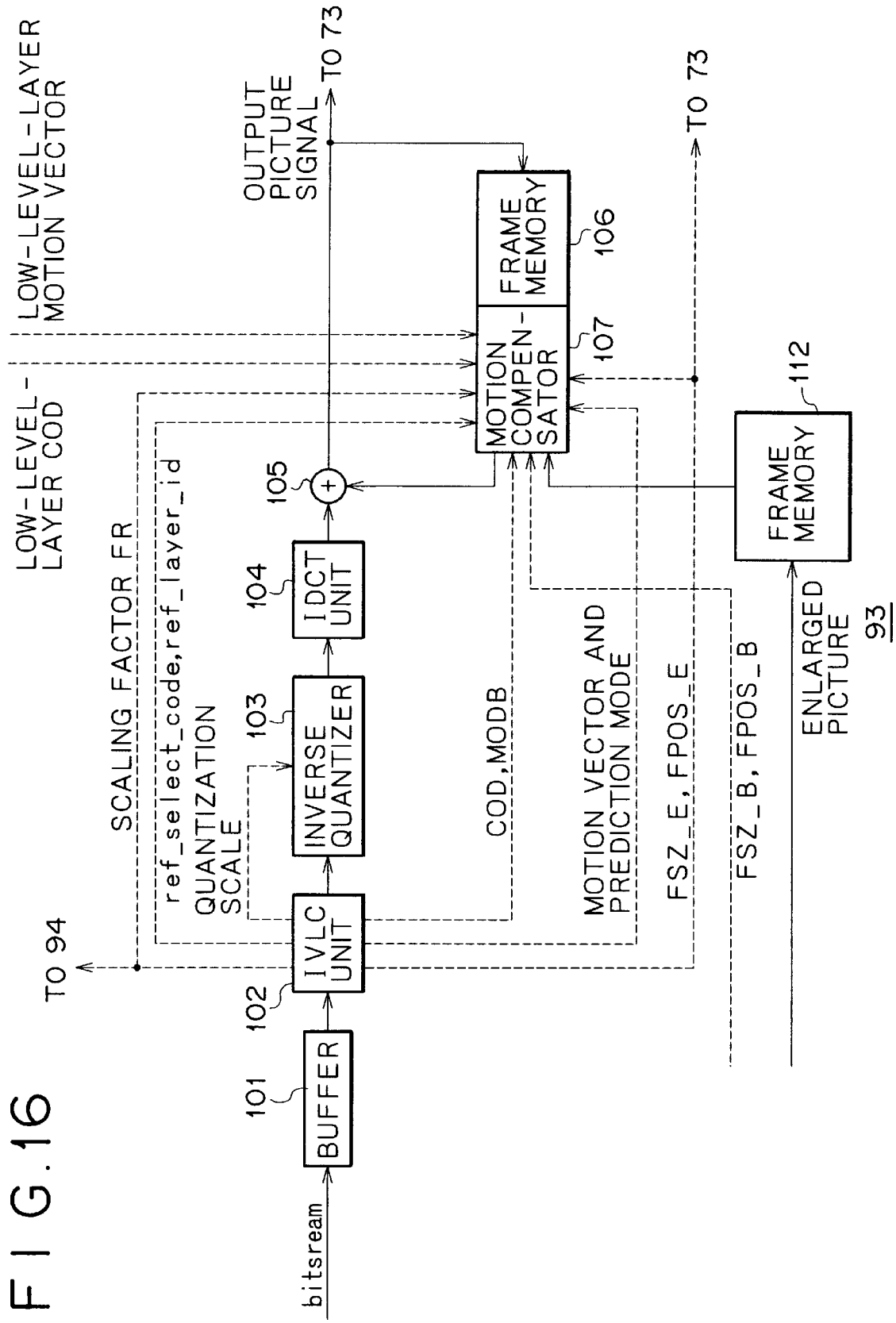
FIG. 16 is a block diagram showing a typical configuration of a high-level-layer decoding unit 93 shown in FIG. 14.

FIG. 16 is a diagram showing a typical configuration of the high-level-layer decoding unit 93 shown in FIG. 14. It should be noted that components of FIG. 16 identical with those employed in the decoder shown in FIG. 54 are denoted by the same reference numerals. The high-level-layer decoding unit 93 basically has a configuration similar to that of the decoder shown in FIG. 54 except that, in the case of the former, a frame memory 112 is newly provided.

A bitstream of a VOP pertaining to the high-level layer generated by the demultiplexer 91 is supplied to an IVLC unit 102 by way of a buffer 101. The IVLC unit 102 carries out a variable-length decoding process on the bitstream of a VOP pertaining to the high-level layer to split it into pieces of information including a quantization coefficient, a motion vector, a prediction mode, a quantization step, size data FSZ_E, offset data FPOS_E, a scaling factor FR and the ref_layer_id, the ref_select_code, COD and MODB flags. The quantization coefficient and the quantization step are supplied to an inverse quantizer 103 whereas the motion vector and the prediction mode are supplied to a motion compensator 107 as is the case with the low-level-layer decoding unit 95 shown in FIG. 15. The size data FSZ_E and the offset data FPOS_E are supplied to the motion compensator 107 and the picture reconstructing unit 73 shown in FIG. 13 whereas the ref_layer_id, the ref_select_code, COD and MODB flags are supplied to the motion compensator 107. The scaling factor FR is supplied to the motion compensator 107 and the resolution transforming unit 94 shown in FIG. 14.

It should be noted that the motion compensator 107 also receives a motion vector for the low-level layer, a COD flag, size data FSZ_B and offset data FPOS_B from the low-level-layer decoding unit 95 shown in FIG. 14 in addition to the data described above. Besides, the enlarged picture output by the resolution transforming unit 94 is supplied to the frame memory 112.

The inverse quantizer 103, an IDCT unit 104, a processor 105, a frame memory 106 and the motion compensator 107 or a frame memory 112 carry out the same pieces of processing as the inverse quantizer 38, an IDCT unit 39, the processor 40, the frame memory 41 and the motion compensator 42 or a frame memory 42 employed in the high-level-layer encoding unit 23, respectively shown in FIG. 10 to produce a decoded VOP of the high-level layer which is then supplied to the picture reconstructing unit 73.

Thus, the VOP decoding unit $72_n$ comprising the high-level-layer decoding unit 93 and the low-level-layer decoding unit 95 as described above generates a decoded picture, size data FSZ_E and offset data FPOS_E for the high-level layer (all referred to hereafter simply as high-level-layer data for the sake of convenience) as well as a decoded picture, size data FSZ_B and offset data FPOS_B for the low-level layer (all referred to hereafter simply as low-level-layer data for the sake of convenience). The picture reconstructing unit 73 reconstructs a picture from the high-level-layer data or the low-level-layer data by the steps typically as follows.

In the case of the first space scalability shown in FIGS. 4A and 4B (in which an entire input VOP is placed at the high-level layer while the entire VOP with a shrunk size is placed at the low-level layer), for example, the picture reconstructing unit 73 receiving both the high-level-layer data and the low-level-layer data obtained as a result of the decoding processes places a decoded picture (VOP) pertaining to the high-level layer with a size corresponding to the size data FSZ_E at a position indicated by the offset data FPOS_E by using only data pertaining to the high-level layer. In the event of an error detected in the bitstream of a VOP pertaining to the high-level layer or when only the low-level-layer data is created from a decoding process for the low-level layer due to the fact that a monitor 74 is capable of displaying only a picture with a low resolution, the picture reconstructing unit 73 receiving only the low-level-layer data places a decoded picture (VOP) pertaining to the low-level layer with a size corresponding to the size data FSZ_B at a position indicated by the offset data FPOS_B by using only data pertaining to the low-level layer.

Further, in the case of the second space scalability shown in FIGS. 5A and 5B (in which a portion of an input VOP is placed at the high-level layer while the entire VOP with a shrunk size is placed at the low-level layer), for example, the picture reconstructing unit 73 receiving both the high-level-layer data and the low-level-layer data obtained as a result of the decoding processes multiplies a decoded picture pertaining to the low-level layer with a size corresponding to the size data FSZ_B by a scaling factor FR to generate an enlarged picture. The picture reconstructing unit 73 further places the enlarged picture at a position indicated by a value obtained as a result of multiplication of the offset data FPOS_B by the scaling factor FR. Then, the picture reconstructing unit 73 places a decoded picture pertaining to the high-level layer with a size corresponding to the size data FSZ_E at a position indicated by the offset data FPOS_E.

As a result, the portion of the decoded picture pertaining to the high-level layer is displayed at a resolution higher than other portions.

It should be noted that, in an operation to place the decoded picture pertaining to the high-level layer, the decoded picture and the enlarged picture are synthesized.

In addition, the high-level-layer decoding unit 93 (employed in the VOP decoding unit $72_n$ not shown in FIGS. 13 and 14) also supplies a scaling factor FR to the picture reconstructing unit 73 in addition to the pieces of data described above. The picture reconstructing unit 73 generates an enlarged picture by using the scaling factor FR supplied thereto.

If only decoded data pertaining to the low-level layer is obtained as a result of a decoding process for the low-level layer in the case of the second space scalability, on the other hand, a picture is reconstructed in the same way as the first space scalability described above.

In the case of the third space scalability shown in FIGS. 6 and 7 (in which, for each of objects composing an input VOP, the entire object is placed at the high-level layer while a thinned entire object is placed at the low-level layer), a picture is reconstructed in the same way as the second space scalability described above.

As described above, since the offset data FPOS_B and the FPOS_E have such values that each pixel composing an enlarged picture pertaining to the low-level layer is placed at a position coinciding with a corresponding pixel composing a picture pertaining to the high-level layer in-the absolute coordinate system. Thus, by reconstructing a picture as described above, an accurate picture (with no positional shifts) can be obtained.

Next, the syntax of an encoded bitstream output by the encoder shown in FIG. 1 is exemplified by, for example, a Video Verification Model (Version 10.0) of the MPEG4 specifications. For the sake of convenience, the Video Verification Model (Version 10.0) is referred to simply as a VM10.0.

Figure 17:
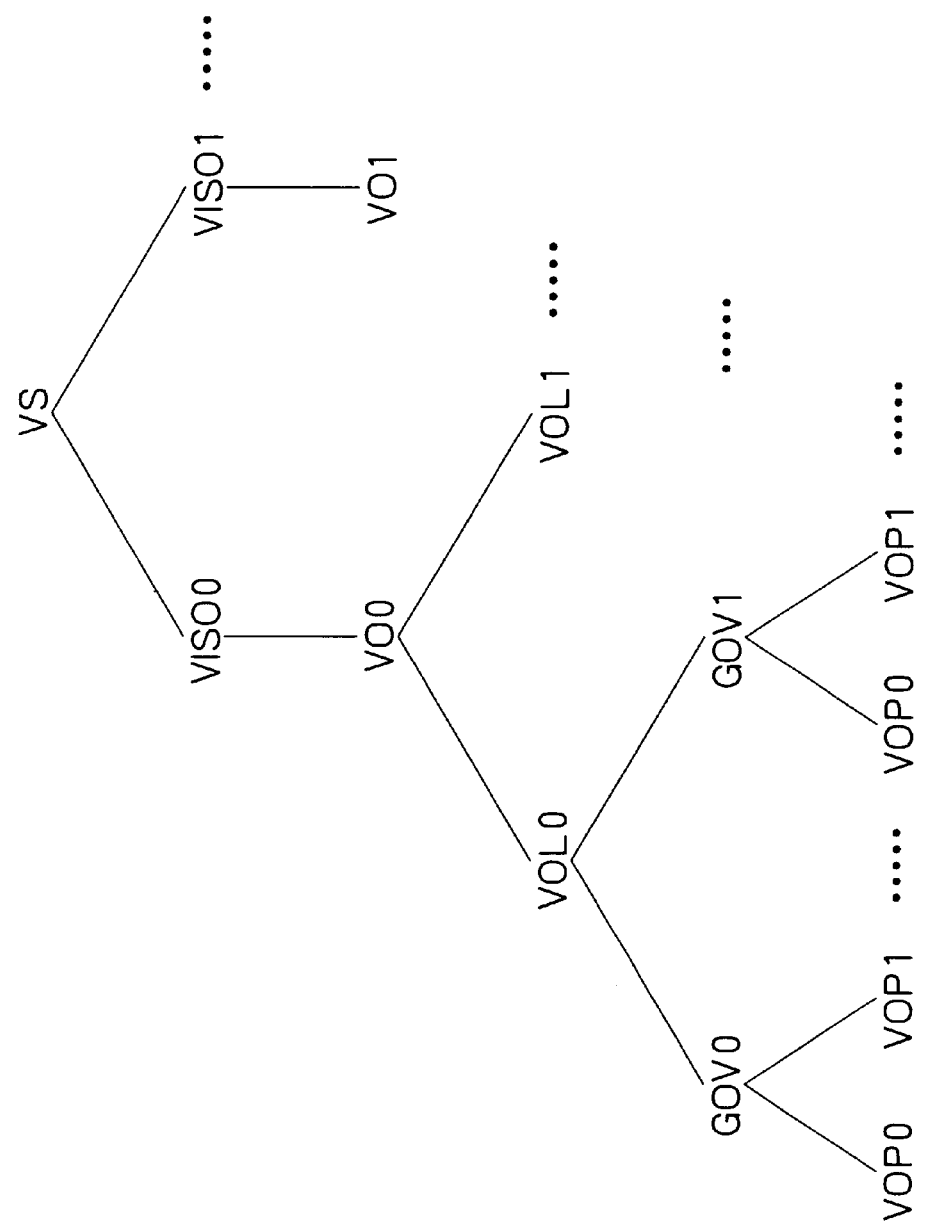
FIG. 17 is a diagram showing the structure of an encoded litstream conforming to a Visual Committee Draft (CD) of MPEG4 specifications.

FIG. 17 is a diagram showing the structure of an encoded bitstream prescribed in a Visual Committee Draft (CD) of MPEG4 specifications.

An encoded stream comprises VS (Visual Object Sequence) as a unit. A VS is a picture sequence corresponding to typically a program or a movie.

Each VS comprises one or more VISOs (Visual Objects). There are several types of VISO. For example, a VISO can be a still texture object which is a static picture, a face object composed of a face picture, or a VO (Video Object) as an object of a moving picture. Thus, in the case of an encoded bitstream of a moving picture, the VISOs thereof are composed of VOs.

A VO comprises one or more VOLs (Video Object Layers). To put it in detail, in the case of a picture not set in a hierarchical structure, the VO comprises one VOL. In the case of a picture set in a hierarchical structure, on the other hand, the VO comprises as many VOLs as hierarchical layers.

A VOL comprises as many GOVs (Group of VOPs) as required. A GOV is a sequence of VOPs (Video Object Planes). It should be noted that GOVs may not exist at all, in such a case, a VOL may be comprised of one or more VOPs.

FIGS. 18 and 19 show the syntax of the VS and the VO, respectively. A VO is a bitstream corresponding to a sequence of an entire picture or a portion (an object) of a picture. Thus, a VS is a set of such sequences. (Therefore, a VS corresponds to, for example, a program or the like).

FIGS. 20 to 25 show the syntax of the VOL.

The VOL is a class for the different kinds of scalability described earlier. A VOL is identified by a number called a video_object_layer_id. For example, the video_object_layer_id is set at 0 to indicate that the VOL is the low-level layer, or 1 to indicate that the VOL is the high-level layer. It should be noted that, as described earlier, the number of layers is not limited to 2. For example, the number of layers takes one or three or any integer greater than three.

A video_object_layer_shape is used to indicate whether the VOL is a VOL for the entire picture or a portion of the picture. The video_object_layer_shape is a flag for indicating the shape of the VOL and set at a value typically as follows.

For a rectangular shape of the VOL, the video_object_layer_shape is set at a typical value of "00". If the VOL has a shape of an area extracted by a hard key (that is, a binary signal having a value of either 0 or 1), the video_object_layer_shape is set at a typical value of "01". If the VOL has a shape of an area extracted by a soft key (that is, a signal having any value in the continuous range 0 to 1), the video_object_layer_shape is set at a typical value of "110". The value in the continuous range 0 to 1, known as a gray-scale and the signal is expressed by 8 bits in the MPEG4 specifications.

As described above, a video_object_layer_shape value of "00" indicates that the shape of the VOL is rectangular and, on the top of that, the position and the size of the VOL in the absolute coordinate system do not change with the lapse of time, that is, they are fixed. The size of the VOL, that is, the horizontal and vertical lengths, are represented by a video_object_layer_width and a video_object_layer_height, respectively. The video_object_layer_width and the video_object_layer_height are each flag with a fixed length of 10 bits and transmitted only once initially for a video_object_layer_shape value of "00". (This is because, for a video_object_layer_shape value of "00", the position and the size of the VOL in the absolute coordinate system are fixed as described above).

A 1-bit scalability flag is used to indicate whether the VOL is a high-level layer or a low-level layer. To be more specific, for example, when VOL is of a low-level layer, the scalability flag is set "1", otherwise "0" is set for the scalability flag.

In addition, if a picture in a VOL other than its own VOL is used as a reference picture, the other VOL to which the reference picture pertains is indicated by the ref_layer_id as described above. It should be noted that the ref_layer_id is transmitted for the high-level layer only.

In a VOL, a hor_sampling_factor_n and a hor_sampling_factor_m represent the length in the horizontal direction of the VOP pertaining to the low-level layer and the length in the horizontal direction of the VOP pertaining to the high-level layer, respectively. Thus, a ratio of the length in the horizontal direction for the low-level layer to the length in the horizontal direction for the high-level layer (that is, the resolution scaling factor in the horizontal direction) is given by the following expression;

hor_sampling_factor_n/hor_sampling_factor_m.

In addition, in a VOL, a ver_sampling_factor_n and a ver_sampling_factor_m represent the length in the vertical direction of the VOP pertaining to the low-level layer and the length in the vertical direction of the VOP pertaining to the high-level layer, respectively. Thus, a ratio of the length in the vertical direction for the low-level layer to the length in the vertical direction for the high-level layer (that is, the resolution scaling factor in the vertical direction) is given by the following expression;

ver_sampling_factor_n/ver_sampling_factor_m.

FIGS. 26 and 27 show the syntax of the GOV.

The GOV layer is prescribed between the VOL and VOP layers as shown in FIG. 17 so that a GOV layer can be inserted into not only the head of an encoded bitstream, but also any position in the encoded bitstream. For example, assume that VOL #0 comprises the sequence of VOP #0, VOP #1, - - - , VOP #n, VOP # (n+1), - - - , VOP #m. In this case, a GOV layer can be inserted into not only a position in front of VOP #0, or the beginning of the sequence, but also into a position in front of VOP #(n+1), that is, a position between VOP #n and VOP #(n+1). Thus, the encoder can insert a GOV layer into for example a position in the encoded stream to be accessed at random. By inserting a GOV layer, a sequence of consecutive VOPs composing a VOL can be encoded by grouping the sequence into a plurality of groups (GOVs).

As shown in FIG. 26, a GOV layer comprises a group_start_code, a VOP_time_increment_resolution, a time_code, a closed_gov, a broken_link, a Group_of_VideoobjectPlane( ), a VOP composing GOV, and a next_start_code( ) which are laid out sequentially one after another.

Next, the semantics of the GOV layer is explained. The semantics of the GOV layer is basically the same as the GOP layer of the MPEG2 system. Thus, for what is not described in this specification, refer to the MPEG2 Video specifications (the ISO/IEC13818-2).

To begin with, a group_start_code is set at 000001B8, a number expressed in the hexadecimal format indicating the start position of the GOV. The VOP_time_increment_resolution represents a resolution at which the VOP_time_increment of one second is divided. (Thus, the VOP_time_increment_resolution represents the number of divisions into which the VOP_time_increment is to be divided.) As will be described later, the VOP_time_increment represents a gap between synchronization points.

As shown in FIG. 27, the time_code comprises a time_code_hours representing the number of hour units of a time, a time_code_minutes representing the number of minute units of the time, a marker_bit and a time_code_seconds representing the number of second units of the time. The time_code_hours, the time_code_minutes and the time_code_seconds of the time_code represent the display time of the beginning of the GOV. As a result, the time_code of a GOV layer (that is, the display time of the beginning at a one-second resolution) represents the time of the beginning of the GOV layer expressed in terms of one-second resolution units or represents an absolute time on the sequence of VOPs at which the process to encode the GOV is started. To put it concretely, the time_code is set at a value representing an absolute time to display the first VOP in the GOV in terms of one-second resolution units.

With regard to the time_code, the VM10.0 states: "The parameters correspond to those defined in the IEC standard publication 461 for "time and control codes for video tape recorders." The time code refers to the first plane (in display sequence) following to the GOV header."

The marker_bit of the time_code is deliberately set at "1" to prevent 23 or more "0"s from being displayed consecutively in a row.

The next_start_code( ) specifies the position of the beginning of the next GOV.

The time_code of the GOV thus allows an absolute time for displaying the first VOP in the GOV display sequence after the GOV header to be recognized at a one-second resolution. It should be noted that, since the time_code of the GOV layer represents a time expressed in terms of one-second resolution units as described above, a finer resolution of a display time of a VOP can be set for each VOP as will be described later.

It should be noted that, as described above, the GOV layer was introduced in the MPEG4 specifications after its proposal made by the applicants of this patent.

FIGS. 28 to 36 show the syntax of the VOP (Video Object Plane) class.

The size (that is, the horizontal and vertical lengths) of a VOP are expressed, respectively by a VOP_width and a VOP_height each having a fixed length of typically 10 bits. The position of a VOP in the absolute coordinate system is expressed by the VOP_horizontal_mc_spatial_ref and the VOP_vertical_mc_spatial_ref each having a fixed length of typically 10 bits as well. It should be noted that the VOP_width or the VOP_height representing the length of the VOP in the horizontal or vertical direction, respectively as described above corresponds to the size data FSZ_B and the size data FSZ_E explained before. On the other hand, the VOP_horizontal_mc_spatial_ref or the VOP_vertical_mc_spatial_ref representing the coordinate of the VOP in the horizontal or vertical direction (that is, the x or y coordinate), respectively corresponds to the offset data FPOS_B and FPOS_E explained before.

The VOP_width and the VOP_height, the VOP_horizontal_mc_spatial_ref and the VOP_vertical_mc_spatial_ref are transmitted only for cases other than an instance in which the video_object_layer_shape is "00", That is to say, with the video_object_layer_shape set at "00", the size and the position of the VOP are both fixed as described above, so that it is not necessary to transmit the VOP_width and the VOP_height, the VOP_horizontal_mc_spatial_ref and the VOP_vertical_mc_spatial_ref. In this case, the VOP is placed on the receiver side at such a location that the left upper corner thereof coincides with typically the origin of the absolute coordinate system. The size of the VOP is found from the video_object_layer_width and the video_object_layer_height of the VOL shown in FIGS. 20 to 25.

It should be noted that the ref_select_code of a VOP indicates which picture is to be used as a reference picture as described above.

By the way, in the VM10.0, the display time of each VOP (Video Object Plane corresponding to the conventional frame) is prescribed by a modulo_time_base and a VOP_time_increment determined in the VOP as shown in FIG. 28 as well as the time_code prescribed in the GOV including the VOP as shown in FIG. 27 as follows.

That is, the modulo_time_base represents a time on a local time axis of the encoder in terms of one-second (=1000 ms) resolution units. The modulo_time_base comprises as many "1"s as necessary and a "0" which are each expressed by a marker transmitted in the VOP header. The number of necessary "1"s composing the modulo_time_base represents a cumulative time relative to an encoded/decoded modulo_time_base in an I-VOP or a P-VOP displayed last (or most recently as seen retroactively from the present time) or an immediately preceding (in display sequence) I-VOP or P-VOP, or relative to a synchronization point (a time expressed in terms of one-second resolution units) represented by the time_code in the GOP header.

To put it concretely, assume for example that the modulo_time_base of a VOP is "0". In this case, the value "0" indicates that a cumulative time relative to the modulo_time_base in an immediately preceding (in display sequence) I-VOP or a P-VOP or relative to a synchronization point represented by the time_code in the GOV header is 0 second. An modulo_time_base of a VOP set at "10" indicates that a cumulative time relative to the modulo_time_base in an immediately preceding (in display sequence) I-VOP or a P-VOP or relative to a synchronization point represented by the time_code in the GOV header is one second. As another example, assume that the modulo_time_base of a VOP is "110". In this case, the value "110" indicates that a cumulative time relative to the modulo_time_base in an immediately preceding (in display sequence) I-VOP or a P-VOP or relative to a synchronization point represented by the time_code in the GOV header is two seconds. As is obvious from the above examples, the number of necessary "1"s composing the modulo_time_base of VOP is the number of seconds in units representing a cumulative time relative to the modulo_time_base in an immediately preceding (in display sequence) I-VOP or a P-VOP displayed last or relative to a synchronization point represented by the time_code in the GOV header.

With regard to the modulo_time_base, the VM10.0 states:

"This value represents the local time base at the one-second resolution unit (1000 milliseconds). It is represented as a marker transmitted in the VOP header. The number of consecutive "1" followed by a "0" indicates the number of seconds has elapsed since the synchronization point marked by the modulo_time_base of the last displayed I/P-VOPs belonging to the same VOL. There are two exceptions, one for the first I/P-VOP following to the GOV header, and the other is for B-VOPs (in display sequence) to the first I-VOP following to the GOV header.

For the first I/P-VOP following to the GOV header, the modulo_time_base indicates the time relative to the time_code in the GOV header.

For the B-VOPs prior (in display sequence) to the first I-VOP following to the GOV header, the modulo_time_base indicates the time relative to the time_code in the GOV header."

That is to say, the modulo_time_base of a VOP of interest represents the display time of the VOP of interest expressed in terms of one-second resolution units as a time relative to the synchronization point marked by the modulo_time_base of the immediately preceding I-VOP and P-VOP or the display time of the immediately preceding (in display sequence) I-VOP and P-VOP expressed in terms of one-second resolution units. It should be noted, however, that the modulo_time_base of an I-VOP or an P-VOP to be encoded/decoded first following to the GOV header represents the display time of the I-VOP or the P-VOP expressed in terms of one-second resolution units as a time relative to the time_code of the GOV header. By the same token, the modulo_time_base of a B-VOP displayed before an I-VOP encoded/decoded first following to the GOV header also represents the display time of the B-VOP expressed in terms of one-second resolution units as a time relative to the time_code of the GOV header.

It should be noted that, with regard to an I-VOP or an P-VOP encoded/decoded first following to the GOV header and a B-VOP displayed before such an I-VOP, by regarding a synchronization point marked by the time_code of the GOV header as a synchronization point marked by the modulo_time_base of an immediately preceding (in display sequence) I-VOP or P-VOP (or a time representing the display time of the immediately preceding I-VOP and P-VOP (in display sequence) in terms of one-second resolution units), the modulo_time_base of a VOP can represent the display time of the VOP in terms of one-second resolution units as a time relative to the synchronization point marked by the modulo_time_base of the immediately preceding (in display sequence) I-VOP or P-VOP without regard to the type of the VOP.

A VOP_time_increment is used to represent a display time of a VOP expressed in terms of one-second resolution units or smaller. That is to say, the time_code and the modulo_time_base are each used to represent a time expressed in terms of one-second resolution units while the VOP_time_increment is used to represent a time at a resolution not coarser than the one-second resolution. In the VM10.0, the resolution of the VOP_time_increment is indicated by the VOP_time_increment_resolution (shown in FIG. 26) of the GOV layer described earlier. For a VOP_time_increment_resolution of 1000, the VOP_time_increment represents a display time of the VOP at a resolution of 1 ms (=1000 milliseconds/the VOP_time_increment_resolution) in units.

Figure 38:
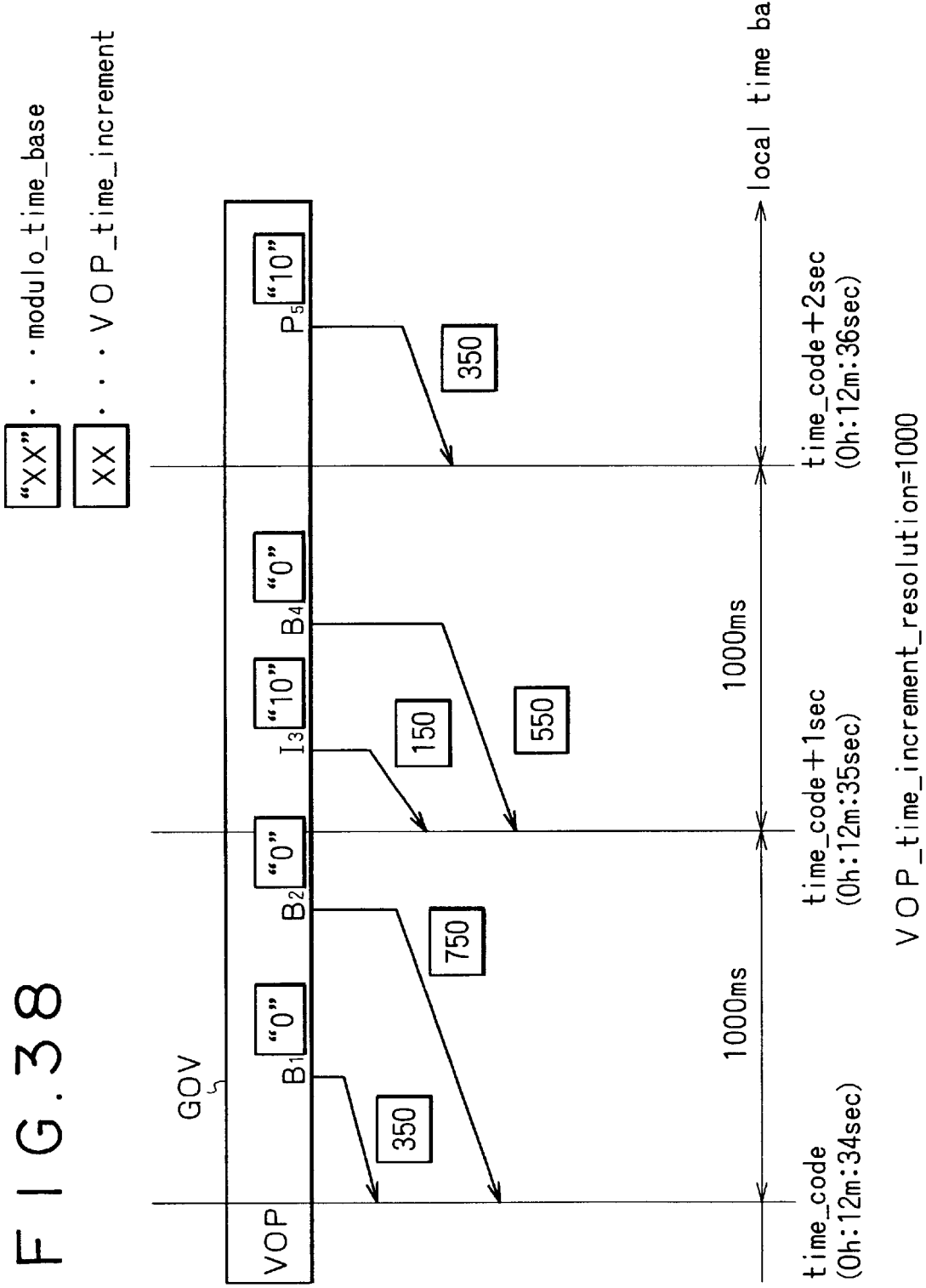
FIG. 38 is a diagram showing a relation among the time_code, the modulo_time_base and the VOP_time_increment.

FIGS. 37 and 38 are diagrams each showing a relation among the time_code, the modulo_time_base and the VOP_time_increment based on the definitions given above.

FIG. 37 is a diagram showing a relation for a VO comprising a GOV header and a sequence of VOPs including $B_1$ (B-VOP), $I_2$ (I-VOP), $B_3$, $B_4$, $P_5$ (P-VOP) and so on. Let the time_code in the GOV header represents a point of time $t_0$=0 h:12 m:34 sec or 12 minutes and 34 seconds sharp. Used to represent a time relative to the time_code in the one-second resolution, the modulo_time_base thus represents points of time such as $t_0$+1 second, $t_0$+2 seconds and so on as synchronization points. It should be noted that, in the example shown in FIG. 37, while the display sequence is $B_1$, $I_2$, $B_3$, $B_4$, $P_5$ and so on, the encoding/decoding order is the GOV header, $I_2$, $B_1$, $P_5$, $B_3$, $B_4$ and so on.

Figure 46:
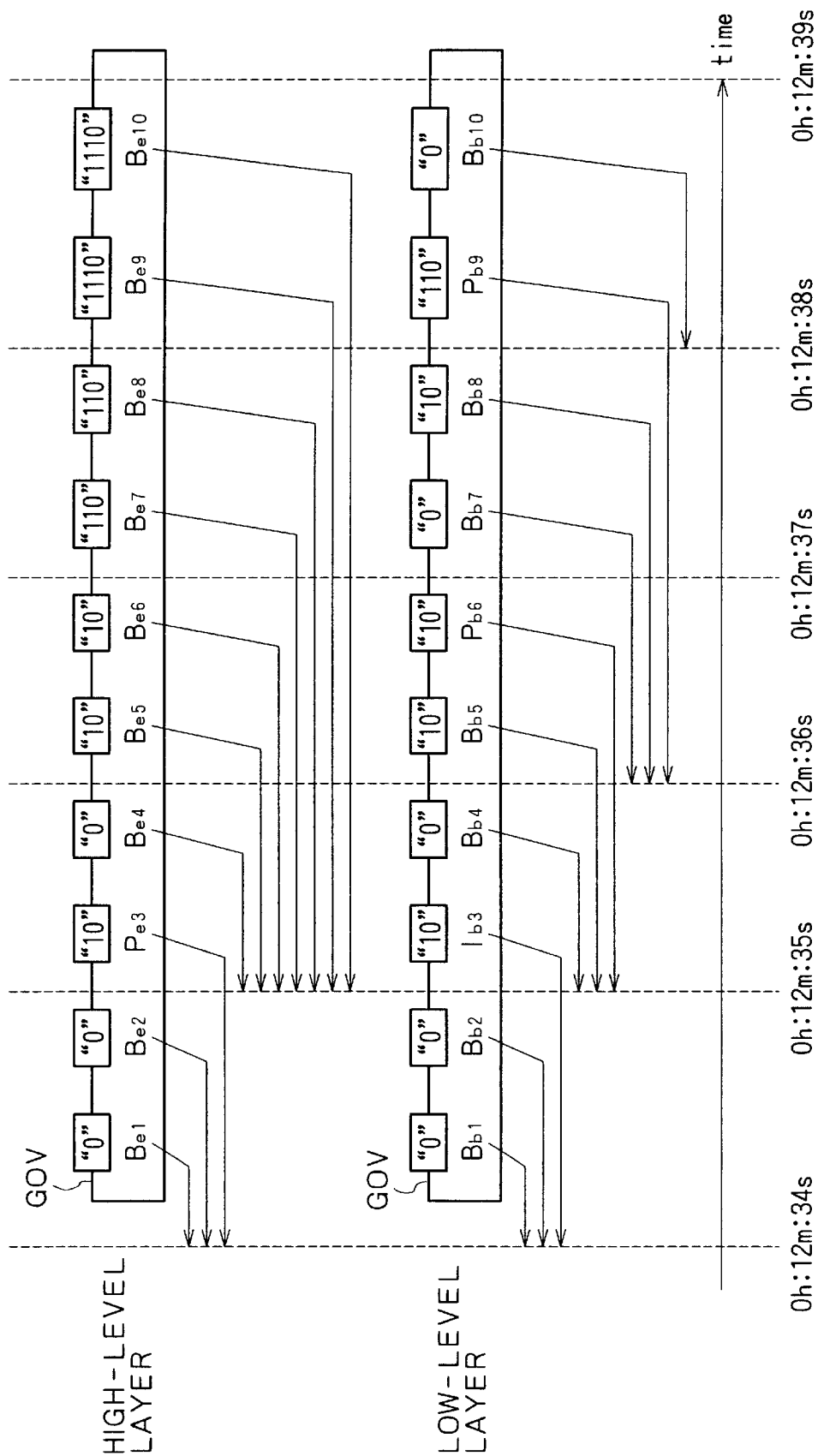
FIG. 46 is a diagram showing a case in which the modulo_time_base has an increasing bit count.
Figure 47:
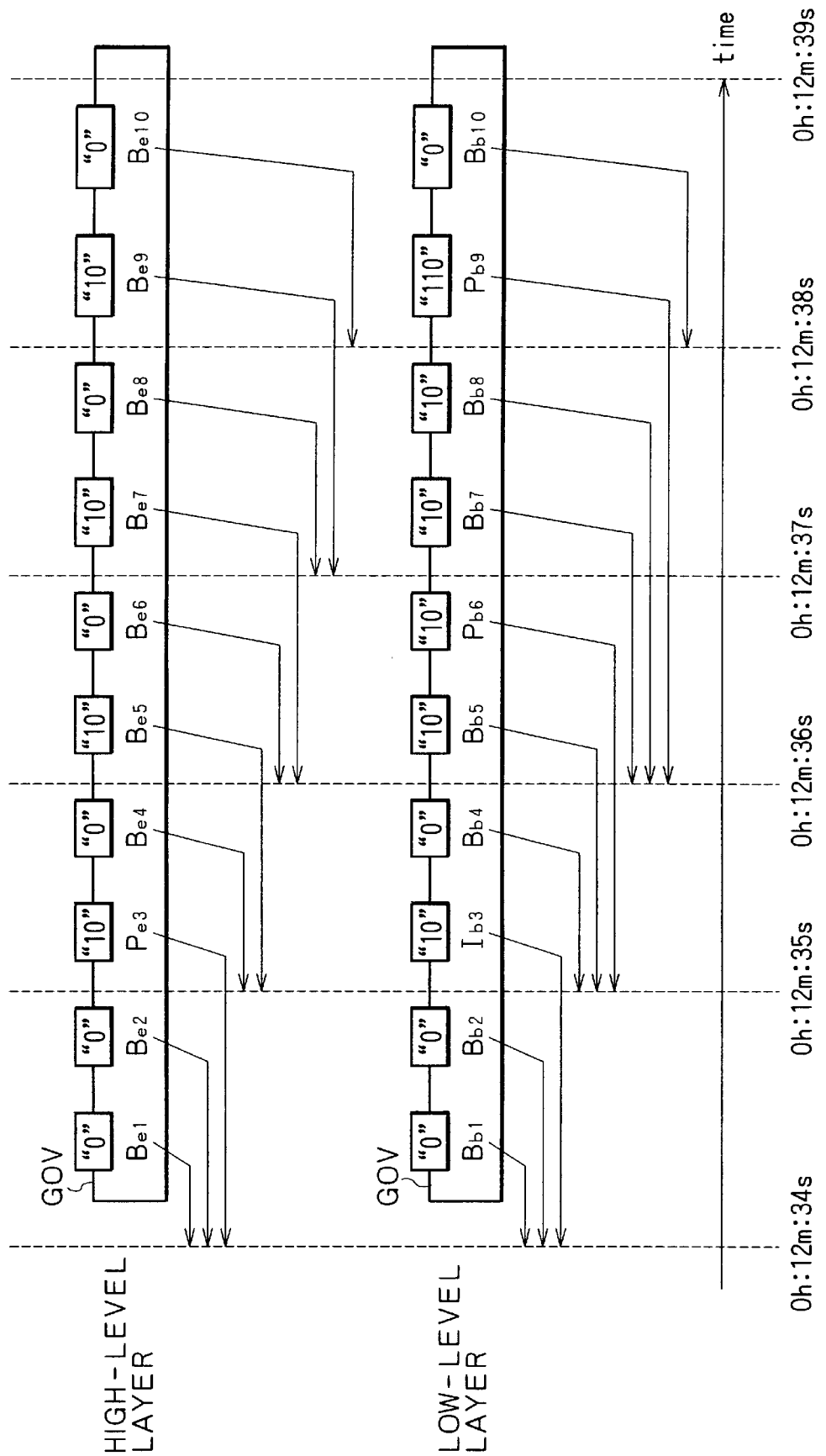
FIG. 47 is a diagram used for explaining a technique to prevent the number of bits in the modulo_time_base from increasing.

Much like examples shown in FIGS. 38, 46 and 47, in the example shown in FIG. 37, the VOP_time_increment of each VOP is represented by a number in a rectangular box whereas the modulo_time_base is represented by a string of bits put between double quotations (") in a rectangular box. In the example shown in FIG. 37, the VOP_time_increment_resolution is set at 1000 and the VOP_time_increments of $B_1$, $I_2$, $B_3$, $B_4$ and $P_5$ are 350, 750, 150, 550 and 350, respectively. Since the VOP_time_increment resolution is set at 1000, parts of display times smaller than the one-second resolution unit of $B_1$, $I_2$, $B_3$, $B_4$ and $P_5$ are 350 ms (=350/1000 seconds), 750 ms (=750/1000 seconds), 150 ms (=150/1000 seconds), 550 ms (=550/1000 seconds) and 350 ms (=350/1000 seconds), respectively.

In the example shown in FIG. 37, $B_1$ is a B-VOP displayed before $I_2$ which is an I-VOP first encoded/decoded after the encoding/decoding process of the GOV header. The referential display time of $B_1$ is thus computed as a value relative to the synchronization point $t_0$ marked by the time_code of the GOV header. The modulo_time_base of $B_1$ is "0" at present, therefore, the display time of $B_1$ relative to $t_0$ marked by the time code of GOV header is 0+350/1000 seconds later, that is, 0 h:12 m:34 s+0 s:350 ms=0 h:12 m:34 s:350 ms.

As described above, $I_2$ is the first I-VOP encoded/decoded after the encoding/decoding process of the GOV header. The referential display time of $I_2$ is thus also computed as a value relative to the synchronization point to marked by the time_code of the GOV header. The modulo_time_base of $I_2$ is 0 at present. Therefore, the display time of $I_2$ relative to $t_0$ marked by the time code of GOV header is 0+750/1000 seconds later, that is, 0 h:12 m:34 s+0 s:750 ms=0 h:12 m:34 s:750 ms.

Since $B_3$ is displayed right after $I_2$, the referential display time of $B_3$ is computed as a value relative to a synchronization point marked by the modulo_time_base of $I_2$. As described above, the display time of $I_2$ is 0 h:12 m:34 s:750 ms and the modulo_time_base of $I_2$ is 0 second later relative to the time $t_0$=0 h:12 m:34 s as a synchronization point. The modulo_time_base of $B_3$ is "10" at present. Therefore, the display time of $B_3$ is 1+150/1000 seconds later relative to the synchronization point marked by the modulo_time_base of $I_2$, that is, 0 h:12 m:34 s+1 s:150 ms=0 h:12 m:35 s:150 ms. By the same token, the display time of $B_4$ can be found in the same way as $B_3$. The modulo_time_base of $I_2$ is 1. Therefore, the display time of $I_4$ relative to the synchronization point marked by the modulo_time_base of $I_2$ is 1+550/1000 seconds later, that is, 0 h:12 m:34 s+1 s:550 ms=0 h:12 m:35 s:550 ms.

Since $B_3$ and $B_4$ displayed before $P_5$ are both a B-VOP, the display time of $P_5$ is computed as a value relative neither to a synchronization point marked by the modulo_time_base of $B_3$ nor the modulo_time_base of $B_4$, but computed as a value relative to the synchronization point (0 h:12 m:34 s) marked by the modulo_time_base of $I_2$ which is the most recent displayed I/P-VOP before $P_5$. In the example shown in FIG. 37, the modulo_time_base and the VOP_time_increment of $P_5$ are "110" and 350, respectively. Therefore, the display time of $P_5$ relative to the synchronization point marked by the modulo_time_base of $I_2$ is 2+350/1000 seconds later, that is, 0 h:12 m:34 s+2 s:350 ms=0 h:12 m:36 s:350 ms.

Next, FIG. 38 is a diagram showing a relation for a VO comprising a GOV header and a sequence of VOPs including $B_1$, $B_2$, $I_3$, $B_4$, $P_5$ and so on. Much like the example shown in FIG. 37, the time_code in the GOV header represents a point of time $t_0=0$ h:12 m:34 sec or 12 minutes and 34 seconds sharp.

In the example shown in FIG. 38, the modulo_time_base and the VOP_time_increment of $B_1$ are "0" and 350, respectively. $B_1$ is a B-VOP displayed before $I_3$ which is a first I-VOP encoded/decoded after the encoding/decoding process of the GOV header. The display time of $B_1$ is thus computed as a value relative to a synchronization point $t_0$ marked by the time_code of the GOV header. Much like $B_1$ in the example shown in FIG. 37, the display time of $B_1$ is 0 h:12 m:34 s+0 s:350 ms=0 h:12 m:34 s:350 ms.

Much like $B_1$, $B_2$ is a B-VOP displayed before $I_3$ which is the first I-VOP encoded/decoded after the encoding/decoding process of the GOV header. The display time of $B_2$ is thus computed as a value relative to the synchronization point $t_0$ marked by the time_code of the GOV header. The modulo_time_base and the VOP_time_increment of $B_2$ are "0" and 750, respectively. Therefore, the display time of $B_2$ is 0+750/1000 seconds later relative to the time $t_0$ marked by the time_code of the GOV header, that is, 0 h:12 m:34 s+0 s:750 ms=0 h:12 m:34 s:750 ms.

As described above, $I_3$ is the first I-VOP encoded/decoded after the encoding/decoding process of the GOV header and the modulo_time_base and the VOP_time_increment of $I_3$ are "01" and 150, respectively. Therefore, the display time of $I_3$ relative to the synchronization point to marked by the time_code of the GOV header becomes 1+150/1000 seconds behind the synchronization point. The display time of $I_3$ is thus computed as 0 h:12 m:34 s+1 s:150 ms=0 h:12 m:35 s:150 ms.

Since $B_4$ is displayed right after $I_3$ which is an I/P-VOP, the display time of $B_4$ is computed as a value relative to a synchronization point marked by the modulo_time_base of $I_3$ (the display time of $I_3$ expressed in terms of one-second resolution units), that is 0 h:12 m:35 s, taking it as a reference time. The modulo_time_base and the VOP_time_increment of $B_4$ are "0" and 550, respectively. The display time of $B_4$ relative to 0 h:12 m:35 s is therefore 0 h:12 m:35 s+0 s:550 ms=0 h:12 m:35 s:550 ms.

Much like $B_4$, the display time of $P_5$ is computed as a value relative to a synchronization point marked by the modulo_time_base of $I_3$ which is the most recent I/P-VOP displayed before $P_5$. Thus, the display time of $P_5$ is computed as a value relative to 0 h:12 m:35 s. The modulo_time_base and the VOP_time_increment of $P_5$ are "10" and 350, respectively, so that the display time of $P_5$ is 0 h:12m:35 s+1 s :350 ms=0 h:12 m:36 s:350 ms.

As described above, according to the VM10.0, a display time is found by using a synchronization point marked by the modulo_time_base of an I/P-VOP (which is the display time of the I/P-VOP expressed in terms of one-second resolution units) instead of using a synchronization point marked by the modulo_time_base of a B-VOP because of the following reason. In the display sequence, a B-VOP is sandwiched between I/P VOPs, but in the encoding/decoding order, a B-VOP is encoded/decoded after the encoding/decoding processes of the I/P VOPs sandwiching the B-VOP. Thus, if a display time is found by using a synchronization point marked by the modulo_time_base of a B-VOP, that is, by using the display time of the B-VOP expressed in terms of one-second resolution units, the display time of an I/P-VOP placed right after a B-VOP being encoded/decoded in the sequence order can not be found till the encoding/decoding process of the B-VOP is completed in spite of the fact that the encoding/decoding process of the I/P-VOP has been completed, making the processing complicated.

In addition, the GOV layer is used in the VM10.0 as described above to thereby allow efficient random accesses being made. To be more specific, the time_code of a GOV layer determines the absolute start time of the GOV (expressed in terms of one-second resolution units) and, as described above, the start time is used in conjunction with a modulo_time_base and a VOP_time_increement for finding the absolute display time of each VOP included in the GOV with ease. Then, by referring to the display time, it is possible to make an access to a VOP in a middle of an encoded bitstream, that is, a random access.

By the way, the VM10.0 also states:

"The GOV layer is an optional layer, so the bitstream can have any (include non) number of the GOV header and the frequency of the GOV header is an encoder issue. Since the GOV header shall be followed by the I-VOP."

The above statement indicates that the number and the frequency of the GOV header can be set in the encoder with a high degree of freedom for an insertion of GOV layer, except that there is a restriction in which an I-VOP should be placed after a GOV header in the encoded bitstream.

That is to say, if a hierarchical structure is created to enable scalability in the VM10.0, the position into which a GOV is inserted is not specially prescribed. Thus, if the hierarchical structure comprises two.layers, namely, high-level and low-level layers, it is possible to form a GOV wherein an I-VOP is placed following to the GOV header (in the encoded bitstream though) independently for each of the high-level and low-level layers.

In the MPEG4 system, on the other hand, the high-level layer can be encoded/decoded without requiring the use of an I-VOP. This is because, in the encoding/decoding process for the high-level layer, a VOP pertaining to the low-level layer is basically used as a reference picture, and such use of a VOP pertaining to the low-level layer as a reference picture in the MPEG4 system increases the encoding efficiency.

As described above, however, the use of a GOV necessitates that an I-VOP be placed following to the GOV header in the encoding/decoding order. In addition, since the amount of data of an I-VOP is generally larger than those of a P-VOP and a B-VOP, the use of an I-VOP for the high-level layer which does not naturally need an I-VOP decreases the encoding efficiency.

In order to prevent the encoding efficiency from decreasing, the above statement prescribed in the VM10.0 should be changed to the following one:

"The GOV layer is an optional layer, so the bitstream can have any (include non) number of the GOV header, and the frequency of the GOV header is an encoder issue. Since the GOV header shall be followed by an I-VOP in the base layer."

As described above, a restriction requiring that the GOV header be followed by an I-VOP needs to be imposed only for the low-level layer but not for the high-level layer.

The encoder shown in FIG. 1 and the decoder shown in FIG. 13 carry out encoding and decoding processes in accordance with the modified statement described above, respectively.

The VM10.0 does not impose a particular restriction on the positional relation along the time axis between GOVs pertaining to the low-level and high-level layers. Thus, the positions of the first and last VOPs of a GOV pertaining to the low-level layer on the time axis do not necessarily coincide with the positions of the first and last VOPs of a GOV pertaining to the high-level layer.

If the insertion position of a GOV into the low-level layer is different from that of the high-level layer, however, there exists a case in which a VOP of the low-level layer naturally not to be displayed has to be decoded in a random access to the encoded stream in order to obtain a decoded picture of the low-level layer to be used by a VOP pertaining to the high-level layer as a reference picture. In such a case, it becomes difficult to make an efficient random access at a high speed.

To put it in detail, let $I_{bi}$ or $P_{bi}$ denote an I-VOP or a P-VOP, respectively which is an i-th I/P-VOP pertaining to the low-level layer in the display sequence. By the same token, let $P_{ei}$ denote a P-VOP which is an i-th P-VOP pertaining to the high-level layer in the display sequence. Assume that, for example, an encoded bitstream comprising a low-level layer including $I_{b1}$, $P_{b2}$, $P_{b3}$, $P_{b4}$, $P_{b5}$, $I_{b6}$, $P_{b7}$, $P_{b8}$, $P_{b9}$, $P_{b10}$, $I_{b11}$, $P_{b12}$, $P_{b13}$ and so on, and a high-order layer including $P_{e1}$, $P_{e2}$, $P_{e3}$, $P_{e4}$, $P_{e5}$, $P_{e6}$, $P_{e7}$, $P_{e8}$, $P_{e9}$, $P_{e10}$, $P_{e11}$, $P_{e12}$, $P_{e13}$ and so on as shown in FIG. 39.

Figure 39:
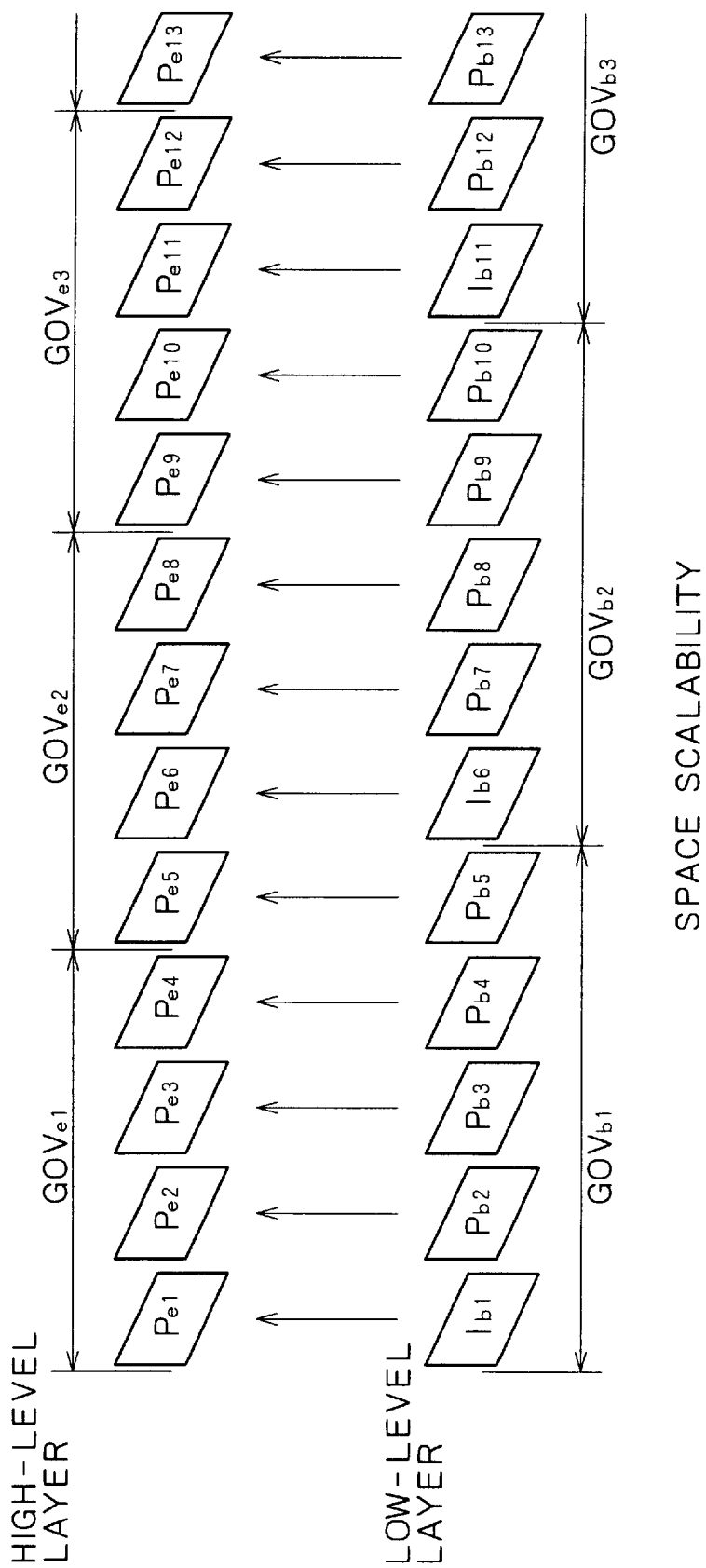
FIG. 39 is a diagram showing a configuration of GOVs composed independently of a low-level layer and a high-level layer.

In the example shown in FIG. 39, $I_{b1}$, $P_{b2}$, $P_{b3}$, $P_{b4}$, $P_{b5}$, $I_{b6}$, $P_{b7}$, $P_{b8}$, $P_{b9}$, $P_{b10}$, $I_{b11}$, $P_{b12}$, $P_{b13}$ and so on pertaining to the low-level layer are VOPs displayed at times coinciding with the display times of $P_{e1}$, $P_{e2}$, $P_{e3}$, $P_{e4}$, $P_{e5}$, $P_{e6}$, $P_{e7}$, $P_{e8}$, $P_{e9}$, $P_{e10}$, $P_{e11}$, $P_{e12}$, $P_{e13}$ and so on pertaining to the high-level layer, respectively. In addition, VOPs from $P_{e1}$ through $P_{e13}$ pertaining to the high-level layer are encoded by using VOPs from $I_{b1}$ through $P_{b13}$ pertaining to the low-level layer, respectively each as a reference picture. That is to say, the, space scalability is implemented. In addition in FIG. 39, VOPs from $I_{b1}$ through $P_{b5}$ pertaining to the low-level layer form $GOV_{b1}$ whereas from $I_{b6}$ through $P_{b10}$ pertaining to the low-level layer constitute $GOV_{b2}$. On the other hand, from $P_{e1}$ through $P_{e4}$ pertaining to the high-level layer constitute $GOV_{e1}$ whereas from $P_{e5}$ through $P_{e8}$ pertaining to the high-level layer constitute $GOV_{e2}$. Subsequently, from $P_{e9}$ through $P_{e12}$ pertaining to the high-level layer constitute. $GOV_{e3}$. In this way, a GOV is formed for each five VOPs at the low-level layer, while a GOV is formed for each four VOPs at the high-level layer.

Thus, in the example described above, when a random access is made to the beginning of $GOV_{e2}$ pertaining to the high-level layer, $P_{e5}$ at the beginning of $GOV_{e2}$ uses $P_{b5}$ of $GOV_{b1}$ pertaining to the low-level layer as a reference picture for decoding, making it necessary to decode $P_{b5}$. Since $P_{b5}$ is a VOP composing $GOV_{b1}$ pertaining to the low-level layer (a VOP last displayed), it is necessary to decode the VOPs composing $GOV_{b1}$ sequentially one after another in order to decode $P_{b5}$. Thus, $P_{e5}$ pertaining to the high-level layer which uses $P_{b5}$ as a reference layer can not be decoded till $P_{b5}$ is decoded. As a result, it becomes difficult to make an efficient random access at a high speed.

Such a problem also exists similarly in the case of the temporal scalability.

Figure 40:
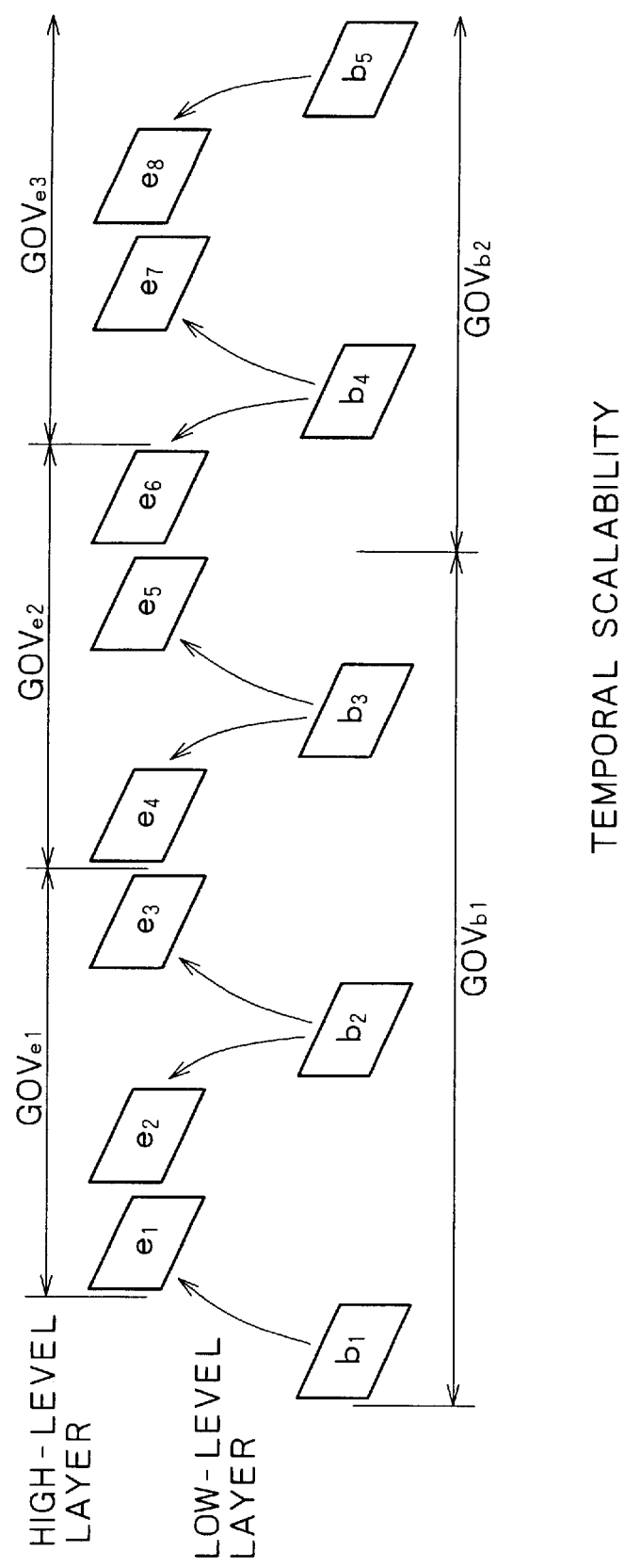
FIG. 40 is a diagram showing a configuration of GOVs composed independently of a low-level layer and a high-level layer.

The problem encountered in the temporal scalability is exemplified by an example shown in FIG. 40. An encoded bitstream shown in the figure comprises a low-level layer including VOPs represented by $b_1$, $b_2$, $b_2$, $b_4$, $b_5$ and so on, and a high-level layer including VOPs represented by $e_1$, $e_2$, $e_3$, $e_4$, $e_5$, $e_6$, $e_7$, $e_8$ and so on. It should be noted that $e_1$, $b_1$, $e_2$, $b_2$, $e_3$, $e_4$, $b_3$, $e_5$, $e_6$, $b_4$, $e_7$, $e_8$, $b_5$ and so on form a sequence of consecutive pictures. In the example shown in FIG. 40, $b_1$, $b_2$, $b_3$, $b_4$, $b_5$ and so on are extracted from the sequence to form the low-level layer while $e_1$, $e_2$, $e_3$, $e_4$, $e_5$, $e_6$, $e_7$, $e_8$ and so on are extracted from the sequence to form the high-level layer.

In addition, in the example in FIG. 40, from $b_1$ through $b_3$ pertaining to the low-level layer form $GOV_{b1}$ whereas from $b_4$ through $b_6$ pertaining to the low-level layer constitute $GOV_{b2}$. On the other hand, from $e_1$ through $e_3$ pertaining to the high-level layer form $GOV_{e1}$ whereas from $e_4$ through $e_6$ pertaining to the high-level layer form $GOV_{e2}$. Subsequently, from $e_7$ through $e_9$ pertaining to the high-level layer form $GOV_{e3}$. In this way, a GOV is formed for each three VOPs for both the low-level and high-level layers. It should be noted that $e_1$ uses $b_1$ as a reference picture whereas $e_2$ and $e_3$ use $b_2$ as a reference picture. Similarly, $e_4$ and $e_5$ use $b_3$ as a reference picture whereas $e_6$ and $e_7$ use $b_4$ as a reference picture. Finally, $e_8$ uses $b_5$ as a reference picture.

Thus, in the example described above, when a random access is made to the beginning of $GOV_{e2}$ pertaining to the high-level layer, since $e_4$ at the beginning of $GOV_{e2}$ uses $b_3$ of $GOV_{b1}$ pertaining to the low-level layer as a reference picture for decoding as described above, it is necessary to decode $b_3$. Since $b_3$ is a VOP of $GOV_{b1}$ pertaining to the low-level layer (a VOP last displayed), it is necessary to decode the VOPs composing $GOV_{b1}$ sequentially one after another in order to decode $b_3$. Thus, $e_4$ of the high-level layer, which is a target VOP using $b_3$ as a reference layer, can not be decoded till $b_3$ is decoded. As a result, it becomes difficult to make an efficient random access at a high speed.

In order to solve the problem described above, VOPs pertaining to the high-level layer are divided into GOVs, so that a VOP pertaining to the high-level layer to be displayed at a time coinciding with or immediately after a display time of a VOP displayed at the beginning of a GOV pertaining to the low-level layer is displayed at the beginning of a GOV pertaining to the high-level layer. In this way, a GOV pertaining to the high-level layer can be associated with a GOV pertaining to the low-level layer on a one-to-one basis, making it possible to prevent a random access made at a high speed from being hindered.

Figure 41:
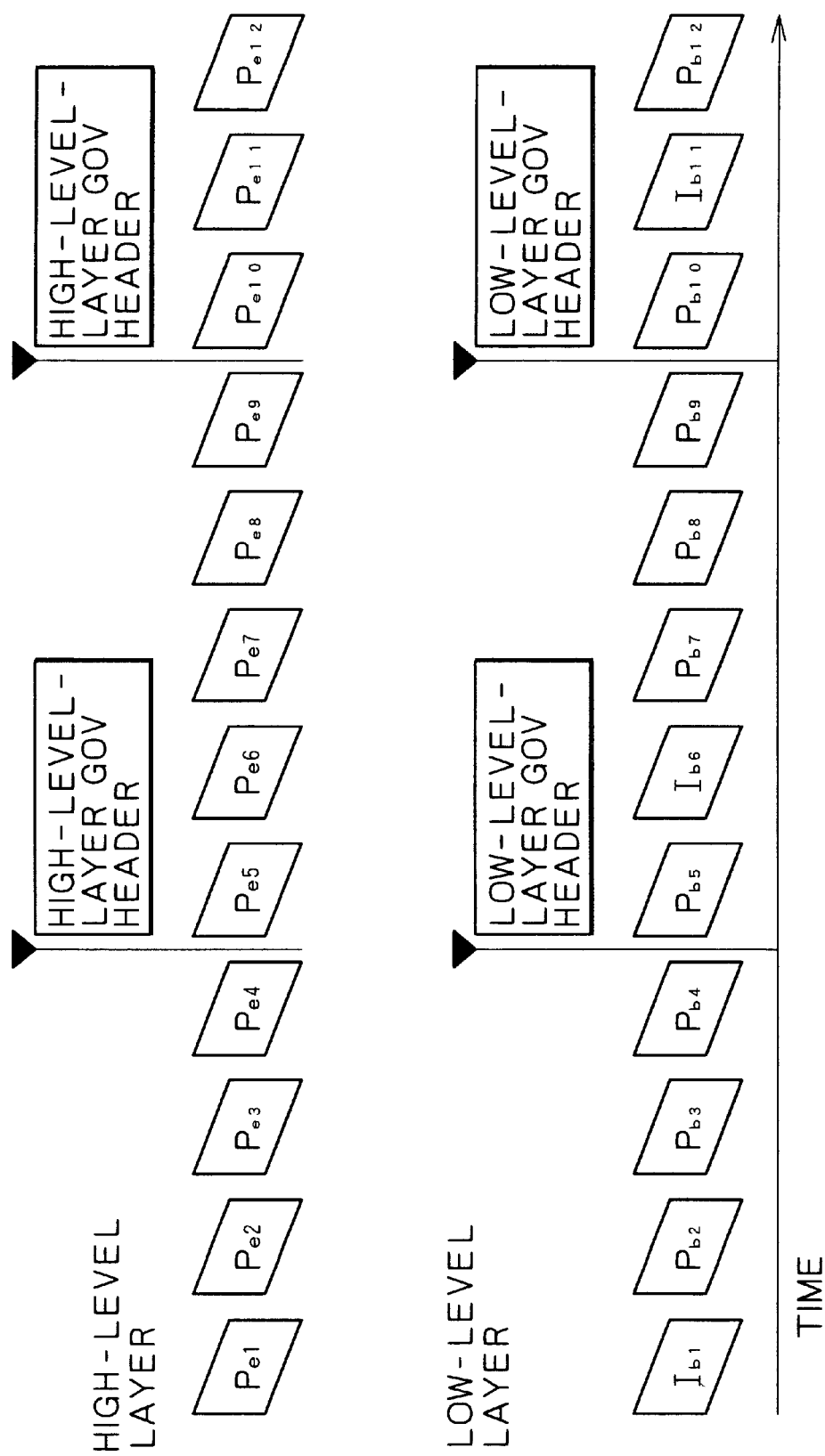
FIG. 41 is a diagram showing a configuration in which GOVs pertaining to the high-level layer are each associated with a GOV pertaining to the low-level layer.

The solution described above is exemplified by an example shown in FIG. 41. In the case that the high-level and low-level layers having the same configuration as is the case with FIG. 39, in which a GOV pertaining to the low-level layer is formed so that $P_{b5}$ pertaining to the low-level layer is displayed as a first VOP in the GOV as shown in FIG. 41, for example, a GOV pertaining to the high-level layer is formed so that $P_{e5}$ pertaining to the high-level layer to be displayed at a time coinciding with a display time of $P_{b5}$ is displayed as a VOP at the beginning of the GOV pertaining to the high-level layer. Likewise, when a GOV pertaining to the low-level layer is formed with $P_{b10}$ pertaining to the low-level layer displayed as a first VOP in the GOV, for example, a GOV pertaining to the high-level layer is formed so that $P_{e10}$ pertaining to the high-level layer to be displayed at a time coinciding with a display time of $P_{b10}$ is displayed as a VOP at the beginning of the GOV pertaining to the high-level layer as shown in FIG. 41.

Figure 42:
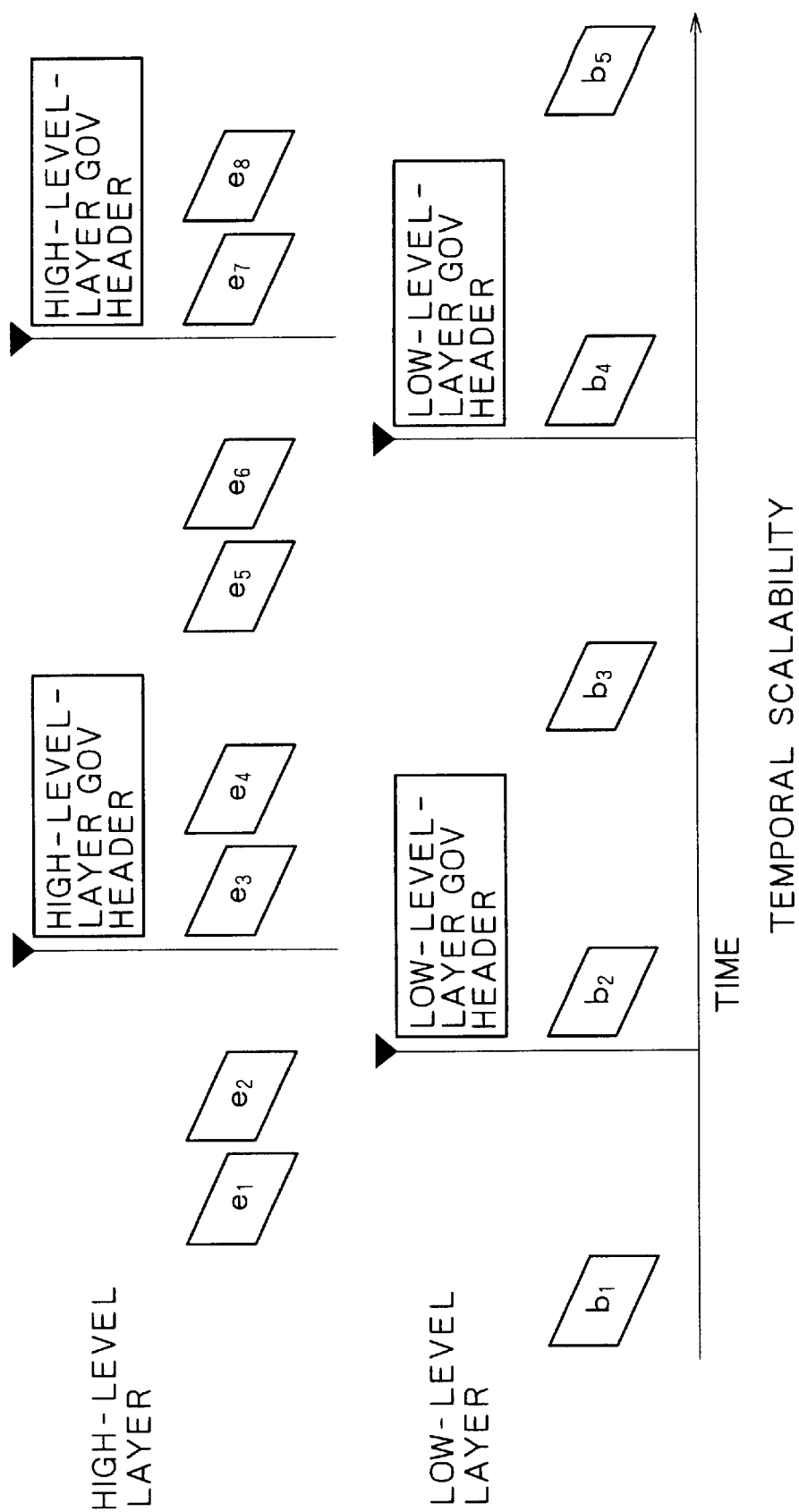
FIG. 42 is a diagram showing a configuration in which GOVs pertaining to the high-level layer are each associated with a GOV pertaining to the low-level layer.

By the same token, in the case that the high-level and low-level layers having the same configuration as is the case with FIG. 40, in which a GOV pertaining to the low-level layer is formed so that b2 pertaining to the low-level layer is displayed as a first VOP in the GOV as shown in FIG. 42, for example, a GOV pertaining to the high-level layer is formed so that $e_3$ pertaining to the high-level layer to be displayed at a time immediately after a display time of $b_2$ is displayed as a VOP at the beginning of the GOV pertaining to the high-level layer. Likewise, when a GOV pertaining to the low-level layer is formed with $b_4$ pertaining to the low-level layer displayed as a first VOP in the GOV, for example, a GOV pertaining to the high-level layer is formed so that $e_7$ pertaining to the high-level layer to be displayed at a time immediately after a display time of $b_4$ is displayed as a VOP at the beginning of the GOV pertaining to the high-level layer as shown in FIG. 42.

It should be noted that the GOV header of each GOV at the GOV layer is encoded and a result of the encoding process is placed at a location immediately preceding a VOP in the GOV to be first encoded/decoded. In addition, the time_code of the GOV header is set at a display time of a VOP in the GOV to be first encoded/decoded with the display time encoded expressed in terms of one-second resolution units.

Thus, in the example shown in FIG. 41, the time_code placed in the GOV header of a GOV of the low-level layer including $P_{b5}$ to be displayed as the first VOP is the display time of $P_{b5}$ encoded in terms of one-second resolution units and the time_code placed in the GOV header of a GOV of the high-level layer including $P_{e5}$ to be displayed as the first VOP is the display time of $P_{e5}$ encoded in terms of one-second resolution units. In the example shown in FIG. 41, the display time of $P_{b5}$ coincides with the display time of $P_{e5}$. Thus, the value of time_code placed in the GOV header of the GOV of the low-level layer including $P_{b5}$ to be displayed as the first VOP matches the value of time_code placed in the GOV header of the GOV of the high-level layer including $P_{e5}$ to be displayed as the first VOP.

By the same token, in the example shown in FIG. 42, the time_code placed in the GOV header of a GOV of the low-level layer including $b_2$ to be displayed as the first VOP is the display time of $b_2$ encoded in terms of one-second resolution units and the time_code placed in the GOV header of a GOV of the high-level layer including $e_3$ to be displayed as the first VOP is the display time of $e_3$ encoded in terms of one-second resolution units.

The processing to form a GOV pertaining to the low-level layer (that is, the processing to insert a GOV header) is carried out by the VLC unit 36 employed in the low-level-layer encoding unit 25 shown in FIG. 9 (referred to hereafter simply as a low-level VLC unit 36 for the sake of convenience) whereas the processing to form a GOV pertaining to the high-level layer is carried out by the VLC unit 36 employed in the high-level-layer encoding unit 23 shown in FIG. 10 (referred to hereafter simply as a high-level VLC unit 36 for the sake of convenience), so that a VOP pertaining to the high-level layer to be displayed at a time coinciding with or immediately after a display time of a VOP displayed at the beginning of a GOV pertaining to the low-level layer is displayed at the beginning of a GOV pertaining to the high-level layer.

Pieces of processing to form a GOV carried out by the low-level VLC unit 36 and the high-level VLC unit 36 are explained by referring to flowcharts shown in FIGS. 43 and 44, respectively.

First of all, the processing carried out by the low-level VLC unit 36 to form a GOV is explained by referring to the flowchart shown in FIG. 43.

As shown in FIG. 43, the flowchart begins with a step S1 at which the low-level VLC unit 36 forms a judgment as to whether or not encoded data of a VOP of the low-level layer now being processed is the data of a VOP having been encoded first in a GOV. If the encoded data of a VOP of the low-level layer now being processed is not the data of a VOP having been encoded first in a GOV, the flow of the processing goes back to the step S1 after receiving data of the next VOP pertaining to the low-level layer being supplied thereto. If the outcome of the judgment formed at the step S1 indicates that the encoded data of a VOP of the low-level layer now being processed is the data of a VOP having been encoded first in a GOV, on the other hand, the flow of the processing goes on to a step S2 at which a GOV header is inserted into a location preceding the data of the VOP of the low-level layer now being processed, or the data first encoded in GOV. The flow of the processing then goes on to a step S3. At the step S3, a GOV-header insertion signal indicating that the GOV header has been inserted into the GOV pertaining to the low-level layer is supplied to the high-level VLC unit 36 along with information on a display time of the VOP in the GOV pertaining to the low-level layer to be displayed first. The flow of the processing goes back to the step S1 after receiving data of the next VOP pertaining to the low-level layer being supplied thereto.

Next, the processing to form a GOV carried out by the high-level VLC unit 36 is explained by referring to the flowchart shown in FIG. 44.

As shown in FIG. 44, the flowchart begins with a step S1 at which the high-level VLC unit 36 forms a 22 judgment as to whether or not a GOV-header insertion signal has been received from the low-level VLC unit 36. If a GOV-header insertion signal has not been received from the low-level VLC unit 36, the flow of the processing goes back to the step S11. If the outcome of the judgment formed at the step S11 indicates that a GOV-header insertion signal has been received from the low-level VLC unit 36, on the other hand, the flow of the processing goes on to a step S12 at which the display time of a VOP in a GOV pertaining to the low-level layer to be displayed first transmitted along with the GOV-header insertion signal is recognized. In addition, at the step S12, a GOV header is inserted into the encoded stream so that a VOP pertaining to the high-level layer to be displayed at a time coinciding with or immediately after the display time is displayed as a first VOP in a GOP of the high-level layer described by the GOP header.

It should be noted that, when a command to make a random access is made in the decoder shown in FIG. 13, the time_code included in the GOV header as well as the VOP_time_increment and the modulo_time_base in the VOP header in the encoded bitstream are used to find the display time of a target VOP of the random access as described above before the random access based on the display time is made.

The MPEG4 specifications do not specially prescribe a sequence of picture types (a picture structure) of VOPs composing the low-level layer and VOPs composing the high-level layer.

When a sequence of objects composing a picture to be encoded is for example formed into a hierarchical structure comprising typically two or more hierarchical layers, namely, the low-level and high-level layers, or more than two layers in order to enable space scalability, VOPs pertaining into the high-level layer are encoded by the encoder shown in FIG. 1 in the same order as the display sequence.

Figure 45:
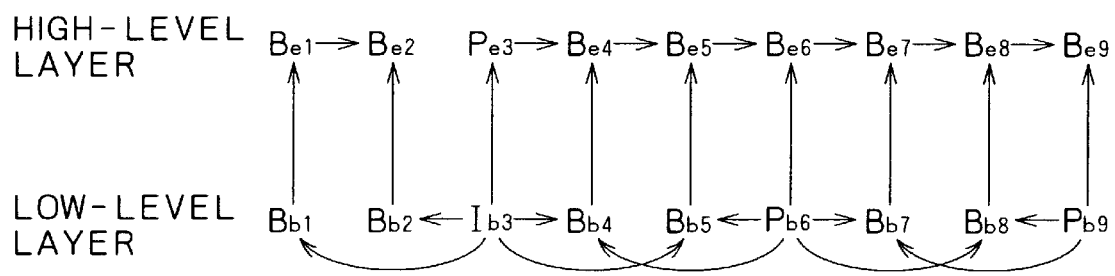
FIG. 45 is a diagram showing typical picture structures of the high-level and low-level layers in a space-scalable encoding process.

That is to say, FIG. 45 is a diagram showing picture structures of the high-level and low-level layers in a space-scalable encoding process. It should be noted that, in the picture structure shown in FIG. 45, an i-th I-VOP, an i-th P-VOP and an i-th B-VOP (in the display sequence) pertaining to the low-level layer are denoted by notations $I_{b1}$, $P_{b1}$ and $B_{b1}$, respectively whereas an i-th P-VOP and an i-th B-VOP (in the display sequence) pertaining to the high-level layer are denoted by notations $P_{e1}$ and $B_{e1}$, respectively.

In the picture structure shown in FIG. 45, $I_{b3}$ is an I-VOP of the low-level layer that is encoded/decoded first. Then, $I_{b3}$ pertaining to the low-level layer is used as a reference picture for encoding/decoding $B_{b1}$ pertaining to the low-level layer to be displayed first. A VOP pertaining to the high-level layer is subjected to the space-scalable encoding process basically using a VOP of the low-level layer displayed at the same time as the VOP pertaining to the high-level layer as a reference picture. Thus, after $B_{b1}$ pertaining to the low-level layer is encoded/decoded, $B_{e1}$ pertaining to the high-level layer is encoded/decoded by using $B_{b1}$ as a reference picture. Subsequently, $B_{b2}$ displayed as a second VOP pertaining to the low-level layer is encoded/decoded by using already encoded/decoded $I_{b3}$ pertaining to the low-level layer as a reference picture. $B_{e2}$ of the high-level layer displayed at the same time as $B_{b2}$ displayed as a second VOP is then encoded by using $B_{b2}$ pertaining to the low-level layer and $B_{e1}$ pertaining to the high-level layer as reference pictures.

Then, $P_{e3}$ pertaining to the high-level layer is encoded/decoded by using $I_{b3}$ pertaining to the low-level layer as a reference picture. Subsequently, $P_{b6}$ pertaining to the low-level layer to be used as a reference picture for encoding/decoding $B_{b4}$ pertaining to the low-level layer is encoded/decoded. $B_{b4}$ pertaining to the low-level layer is then encoded/decoded by using $P_{b6}$ pertaining to the low-level layer as well as $I_{b3}$ also pertaining to the low-level layer as reference pictures. Then, $B_{e4}$ pertaining to the high-level layer is encoded/decoded by using $B_{b4}$ pertaining to the low-level layer and $P_{e3}$ pertaining to the high-level layer as reference pictures.

Subsequently, $B_{b5}$ pertaining to the low-level layer is encoded/decoded by using $I_{b3}$ pertaining to the low-level layer and $P_{b6}$ also pertaining to the low-level layer as reference pictures whereas $Be_5$ pertaining to the high-level layer is encoded/decoded by using $B_{b5}$ pertaining to the low-level layer and $B_{e4}$ pertaining to the high-level layer as reference pictures. Since $P_{b6}$ pertaining to the low-level layer has already been encoded/decoded, $B_{e6}$ pertaining to the high-level layer is then encoded/decoded by using $P_{b6}$ pertaining to the low-level layer and $B_{e5}$ pertaining to the high-level layer as reference pictures.

Subsequently, $P_{b9}$ of the low-level layer to be used as a reference picture for encoding/decoding $B_{b7}$ pertaining to the low-level layer is encoded/decoded. $B_{b7}$ pertaining to the low-level layer is then encoded/decoded by using $P_{b9}$ pertaining to the low-level layer and $P_{b6}$ also pertaining to the low-level layer as reference pictures. Subsequently, $B_{e7}$ pertaining to the high-level layer is encoded/decoded by using $B_{b7}$ pertaining to the low-level layer and $B_{e6}$ pertaining to the high-level layer as reference pictures whereas $B_{b8}$ pertaining to the low-level layer is encoded/decoded by using already encoded/decoded $P_{b6}$ pertaining to the low-level layer and already encoded/decoded $P_{b9}$ also pertaining to the low-level layer as reference pictures. Then, $B_{e8}$ pertaining to the high-level layer is encoded/decoded by using $B_{b8}$ pertaining to the low-level layer and $B_{e7}$ pertaining to the high-level layer as reference pictures. $B_{e9}$ pertaining to the high-level layer is then encoded/decoded by using $B_{e8}$ pertaining to the high-level layer and $P_{b9}$ pertaining to the low-level layer as reference pictures.

Thus, $B_{b1}$, $B_{b2}$, $I_{b3}$, $B_{b4}$, $B_{b5}$, $P_{b6}$, $B_{b7}$, $B_{b8}$ and $P_{b9}$, VOPs pertaining to the low-level layer displayed in this order, are enumerated on the lis t are encoded/decoded in the following order: $I_{b3}$, $B_{b1}$, $B_{b2}$, $P_{b6}$, $B_{b4}$, $B_{b5}$, $P_{b9}$, $B_{b7}$ and $B_{b8}$.

On the other hand, $B_{e1}$, $B_{e2}$, $P_{e3}$, $B_{e4}$, $B_{e5}$, $B_{e6}$, $B_{e7}$, $B_{e8}$ and $Be_9$ displayed as VOPs pertaining to the high-level layer in the order they are enumerated on the list are encoded/decoded in the same order: $B_{e1}$, $B_{e2}$, $P_{e3}$, $B_{e4}$, $B_{e5}$, $B_{e6}$, $B_{e7}$, $B_{e8}$ and then $B_{e9}$. In other word, the VOPs pertaining to the high-level layer.are encoded/decoded in the same order as they are displayed.

By encoding/decoding VOPs pertaining to the high-level layer in the order they are displayed, the processing can be carried out with ease in comparison with processing in which VOPs are encoded/decoded in an order different from an order they are displayed.

Also in the case of a space-scalable encoding process, the encoder shown in FIG. 1 and the decoder shown in FIG. 13 are capable of carrying out an encoding and decoding processes, respectively on a picture structure different from the picture structure shown in FIG. 45. That is to say, a picture structure subjected to an encoding and decoding processes carried out by the encoder shown in FIG. 1 and the decoder shown in FIG. 13, respectively is not limited to the picture structure shown in FIG. 45. By the same token, the reference relations and the encoding/decoding order do not have to be those shown in FIG. 45.

It should be noted that the reference relations shown in FIG. 45 each conform to a reference relation prescribed by the ref_select_code of the MPEG4 specifications. In addition, the technique of encoding/decoding VOPs pertaining to the high-level layer in the order they are displayed can be applied to a space-scalable encoding process without regard to whether or not GOVs exist.

By the way, in the picture structure shown in FIG. 45, VOPs of the high-level layer displayed after $P_{e3}$ displayed as the third VOP pertaining to the high-level layer are all B-VOPs.

On the other hand, the display time of a VOP is a time relative to a synchronization point marked by the time_code of the GOV header or the modulo_time_base of an I/P-VOP immediately before the VOP in the display sequence, and is found on the basis of the modulo_time_base and the VOP_time_increment of the VOP header. (It should be noted, however, that the synchronization point marked by the modulo_time_base of an I/P-VOP immediately before the VOP in the display sequence, that is, the display time of the I/P-VOP immediately before the VOP in the display sequence expressed in terms of one-second resolution units is also found as a time originally relative to the synchronization point marked by the time_code of the GOV header. Thus, the display time of each VOP is actually found as a time relative to the synchronization point marked by the time_code of the GOV header).

Accordingly, for the low-level layer shown in FIG. 45, the display times of $B_{b1}$, $Bb_{b2}$ and $I_{b3}$ are each computed by using the time_code of the GOV header whereas the display times of $B_{b4}$, $B_{b5}$ and $P_{b6}$ are each found by using the display time (expressed in terms of one-second resolution units) of $I_{b3}$ displayed immediately before $B_{b4}$, $B_{b5}$ and $P_{b6}$ in the display sequence. On the other hand, the display times of $B_{b7}$, $B_{b8}$ and $P_{b9}$ are each computed by using the display time (expressed in terms of one-second resolution units) of $P_{b6}$ displayed immediately before $B_{b7}$, $B_{b8}$ and $P_{b9}$ in the display sequence.

For the high-level layer shown in FIG. 45, on the other hand, the display times of $B_{e1}$, $B_{e2}$ and $P_{e3}$ are each computed by using the time_code of the GOV header. Since VOPs displayed after $P_{e3}$ are all B-VOPs as described above, the display times of the B-VOPs are each computed by using the display time (expressed in terms of one-second resolution units) of $P_{e3}$ displayed immediately before the B-VOPs in the display sequence. As a result, the number of bits in the modulo_time_base in B-VOPs can be prevented from increasing and the encoding efficiency can hence be raised.

A "0" is set as the least significant bit of the modulo_time_base of a VOP of interest and as many "1"s as required to represent a difference in display time expressed in terms of one-second resolution units between the VOP of interest and an I/P-VOP immediately before the VOP of interest in the display sequence are set as more significant bits of the modulo_time_base. That is to say, after an I/P-VOP is displayed, the modulo_time_base of each VOP is reset to the so-called value of "0" to prevent the number of bits in the modulo_time_base from increasing forever.

In the high-level layer shown in FIG. 45, however, VOPs of the high-level layer displayed after $P_{e3}$ are all B-VOPs so that the modulo_time_base of each of the B-VOPs except the B-VOP immediately after $P_{e3}$ is not reset. As a result, the number of bits in the modulo_time_base increases as the processing goes on.

To put it concretely, first of all, consider the low-level layer of an example shown in FIG. 46. The modulo_time_base of a VOP immediately after $I_{b3}$, $P_{b6}$ and $P_{b9}$ in the display sequence is reset at "0". Then, as many "1"s as required to represent a display-time gap expressed in terms of one-second resolution units between $I_{b3}$ and $B_{b4}$ immediately after $I_{b3}$ in the display sequence are set as bits more significant than the least significant bit reset at "0" in the modulo_time_base of $B_{b4}$. By the same token, as many "1"s as required to represent a display-time gap expressed in terms of one-second resolution units between $P_{b6}$ and $B_{b7}$ immediately after $P_{b6}$ in the display sequence are set as bits more significant than the least significant bit reset at "0" in the modulo_time_base of $B_{b7}$. Likewise, as many "1"s as required to represent a display-time gap expressed in terms of one-second resolution units between $P_9$ and $B_{b10}$ immediately after $P_{b9}$ in the display sequence are set as bits more significant than the least significant bit reset at "0" in the modulo_time_base of $B_{b10}$ (In the example shown in FIG. 46, the display-time gap between $I_{b3}$ and $B_{b4}$, the display-time gap between $P_{b6}$ and $B_{b7}$ and the display-time gap between $P_{b9}$ and $B_{b10}$ are each shorter than one second. As a result, no "1" is set as a bit more significant than the least significant bit reset at "0" in the modulo_time_base of $B_{b4}$, $B_{b7}$ or $B_{b10}$).

For VOPs pertaining to the high-level layer, on the other hand, only the modulo_time_base of $B_{e4}$ immediately after $P_{e3}$ in the display sequence is reset to "0". Thereafter, a "1" bit is added to the modulo_time_base of each VOP succeeding $P_{e3}$ in the display sequence each time the display time, which is measured expressed in terms of one-second resolution units as a time relative to the display time of $P_{e3}$ also expressed in terms of one-second resolution units, increases by one second. As a result, after the modulo_time_base of $B_{e4}$ immediately after $P_{e3}$ in the display sequence is reset to "0", a "1" bit is added to the modulo_time_base of each of $B_{e4}$, $B_{e5}$, $B_{e6}$, $B_{e7}$, $B_{e8}$, $B_{e9}$ and $B_{e10}$ succeeding $P_{e3}$ in the display sequence, and thus, the modulo_time_base thereof increase the number of bits as "0", "10", "10", "110", "110", "1110" and "1110" with an increasing bit count, respectively as shown in FIG. 46.

In order to solve the problem caused by an increasing bit count of the modulo_time_base as described above, when the encoding/decoding process of VOPs pertaining to the high-level layer in a space-scalable encoding process is carried out in the order the VOPs are displayed as is the case with the picture structure shown in FIG. 45, for example, the modulo_time_base of a VOP immediately after a B-VOP in the display sequence pertaining to the high-level layer can also be reset to "0", and then as many "1"s as required to represent a display-time gap expressed in terms of one-second resolution units between the B-VOP and the VOP immediately after the B-VOP in the display sequence are set as bits more significant than the least significant bit reset at "0" in the modulo_time_base of the VOP. In this case, the display time of the VOP of interest pertaining to the high-level layer is measured as a time relative to the display time (expressed in terms of one-second resolution units) of a VOP (which can be an I-VOP, a P-VOP or a B-VOP) immediately preceding the VOP of interest in the display sequence. If no VOP immediately preceding the VOP of interest exists in the display sequence, that is, if the VOP of interest is the first VOP in the GOV to be displayed, the display time of the VOP of interest to be displayed as the first VOP in the GOV is measured and, hence, the modulo_time_base thereof is set typically with the time_code used as a reference since no VOP immediately before the VOP of interest exists.

FIG. 47 is a diagram showing modulo_time_base of the picture structure shown in FIG. 45 for a way of measuring the display time of a VOP and, thus, a technique of setting a modulo_time_base of the VOP modified as described above.

For $B_{e1}$ displayed as the first VOP pertaining to the high-level layer, since the difference between the display time of $B_{e1}$ expressed in terms of one-second resolution units (0 h:12 m:34 s in the example shown in FIG. 47) and the time_code (0 h:12 m:34 s in the example shown in FIG. 47) is 0, no "1" is added to the "0" least significant bit of the modulo_time_base of $B_{e1}$ to produce a modulo_time_base of "0". Also for $B_{e2}$, since the difference between the display time of $B_{e2}$ expressed in terms of one-second resolution units (0 h:12 m:34 s in the example shown in FIG. 47) and the display time expressed in terms of one-second resolution units of $B_{e1}$ immediately before $B_{e2}$ in the display sequence (0 h:12 m:34 s in the example shown in FIG. 47) is 0, no "1" is added to the "0" least significant bit of the modulo_time_base of $B_{e2}$ to produce a modulo_time_base of "0". As for $P_{e3}$, since the difference between the display time of $P_{e3}$ expressed in terms of one-second resolution units (0 h:12 m:35 s in the example shown in FIG. 47) and the display time expressed in terms of one-second resolution units of $B_{e2}$ immediately preceding $P_{e3}$ in the display sequence (0 h:12 m:34 s in the example shown in FIG. 47) is 1, a "1" is added to the "0" least significant bit of the modulo_time_base of $P_{e3}$ to produce a modulo_time_base of "10". As for $B_{e4}$, since the difference between the display time of $B_{e4}$ expressed in terms of one-second resolution units (0 h:12 m:35 s in the example shown in FIG. 47) and the display time expressed in terms of one-second resolution units of $P_{e3}$ immediately before $B_{e4}$ in the display sequence (0 h:12 m:35 s in the example shown in FIG. 47) is 0, no "1" is added to the "0" least significant bit of the modulo_time_base of $B_{e4}$ to produce a modulo_time_base of "0". That is to say, since the difference between the display time of $B_{e4}$ expressed in terms of one-second resolution units and the display time (expressed in terms of one-second resolution units) of $P_{e3}$ is smaller than one second, the modulo_time_base of $B_{e4}$ is reset to "0" so to speak.

As for $B_{e5}$, since the difference between the display time of $B_{e5}$ expressed in terms of one-second resolution units (0 h:12 m:36 s in the example shown in FIG. 47) and the display time expressed in terms of one-second resolution units of $B_{e4}$ immediately preceding $B_{e5}$ in the display sequence (0 h:12 m:35 s in the example shown in FIG. 47) is 1, a "1" is added to the "0" least significant bit of the modulo_time_base of $B_{e5}$ to produce a modulo_time_base of "10". As for $B_{e6}$, since the difference between the display time of $B_{e6}$ expressed in terms of one-second resolution units (0 h:12 m:36 s in the example shown in FIG. 47) and the display time expressed in terms of one-second resolution units of $B_{e5}$ immediately preceding $B_{e6}$ in the display sequence (0 h:12 m:36 s in the example shown in FIG. 47) is 0, no "1" is added to the "0" least significant bit of the modulo_time_base of $B_{e6}$ to produce a modulo_time_base of "0". Much like $B_{e4}$, the modulo_time_base of $B_{e6}$ is reset to "0".

Thereafter, the modulo_time_base of each of $B_{e7}$, $B_{e8}$, $B_{e9}$ and $B_{e10}$ is set in the same way as the preceding VOPs to give a remaining modulo_time_base series of "10", "0", "10" and "0" as shown in FIG. 47.

The processing to set the modulo_time_base (modulo_time_base setting process) of a VOP pertaining to the low-level layer is carried out by the VLC unit 36 employed in the low-level-layer encoding unit 25 shown in FIG. 9 (the low-level VLC unit 36). By the same token, the processing to set the modulo_time_base of a VOP pertaining to the high-level layer is carried out by the VLC unit 36 employed in the high-level-layer encoding unit 23 shown in FIG. 10 (the high-level VLC unit 36).

The modulo_time_base setting processing carried out by the high-level VLC unit 36 is explained by referring to a flowchart shown in FIG. 48.

As shown in the figure, the flowchart begins with a step S21 at which the high-level VLC unit 36 finds a difference D in display time expressed in terms of one-second resolution units between a VOP of interest and a VOP immediately preceding the VOP of interest in the display sequence. The flow of the processing then goes on to a step S22 to form a judgment as to whether or not the difference D is equal to 0. If the outcome of the judgment formed at the step S22 indicates that the difference D is equal to 0, the flow of the processing proceeds to a step S23 at which a modulo_time_base is reset to "0". The flow of the processing then continues to a step S28 at which the modulo_time_base reset to "0" is set in the VOP of interest before going back to the step S21 upon receiving a VOP serving as next object of processing being supplied thereto.

If the outcome of the judgment formed at the step S22 indicates that the difference D is not equal to 0, on the other hand, the flow of the processing proceeds to a step S24 at which a modulo_time_base is reset to "0". The flow of the processing then continues to a step S25 at which a "1" is added to the modulo_time_base as a most significant bit. The flow of the processing then continues to a step S26 at which the difference D is decremented by 1. The flow of the processing then continues to a step S27 to form a judgment as to whether or not the difference D is equal to 0. If the outcome of the judgment formed at the step S27 indicates that the difference D is not equal to 0, the flow of the processing goes back to the step S25 to repeat the pieces of processing at the steps S25 to S27 till the outcome of the judgment formed at the step S27 indicates that the difference D is equal to 0.

As the outcome of the judgment formed at the step S27 indicates that the difference D is equal to 0, that is, when as many "1"s as required to represent the difference D in display time expressed in terms of one-second resolution units between the VOP of interest and the VOP immediately before the VOP of interest have been sequentially added to the "0" least significant bit of the modulo_time_base as most significant bits one after another, the flow of the processing then continues to the step S28 at which the modulo_time_base most recently obtained is set in the VOP of interest before going back to the step S21 upon receiving a VOP serving as next object of processing being supplied thereto.

It should be noted that the modulo_time_base setting processing carried out by the low-level VLC unit 36 is the same as the modulo_time_base setting processing carried out by the high-level VLC unit 36 except for the step S21 of the flowchart shown in FIG. 48. To be more specific, the high-level VLC unit 36 finds a difference D in display time expressed in terms of one-second resolution units between a VOP of interest and a VOP (an I/P/B-VOP) immediately preceding the VOP of interest in the display sequence, while the low-level VLC unit 36 finds a difference D in display time expressed in terms of one-second resolution units between a VOP of interest and an I/P-VOP immediately preceding the VOP of interest in the display sequence.

In addition, the decoder shown in FIG. 13 finds the display time of a VOP pertaining to the low-level layer as a time relative to the display time (expressed in terms of one-second resolution units), or the time_code of an I/P-VOP immediately preceding the VOP in the display sequence, and finds the display time of a VOP pertaining to the high-level layer as a time relative to the display time (expressed in terms of one-second resolution units) of a VOP (which can be an I-VOP, a P-VOP or a B-VOP) immediately preceding the VOP in the display sequence (or the time_code).

By the way, in the picture structure shown in FIG. 45, $B_{e1}$ pertaining to the high-level layer is encoded/decoded by using $B_{b1}$ of the low-level layer displayed at the same time as $B_{e1}$ as a reference picture.

$B_{e1}$ pertaining to the high-level layer is a B-VOP which is normally encoded to result-in a number of generated bits smaller than that of an I/P-VOP. For this reason, it is quite within the bounds of possibility that the quality of an decoded picture of $B_{e1}$ deteriorates. If the quality of an decoded picture of $B_{e1}$ deteriorates, it is also quite within the bounds of possibility that the quality of an decoded picture of $B_{e2}$ using $B_{e1}$ as a reference picture deteriorates as well. That is to say, in the picture structure shown in FIG. 45, in the case of the high-level layer, it is quite within the bounds of possibility that the quality of a B-VOP displayed before $P_{e3}$ which is a P-VOP deteriorates.

Figure 49:
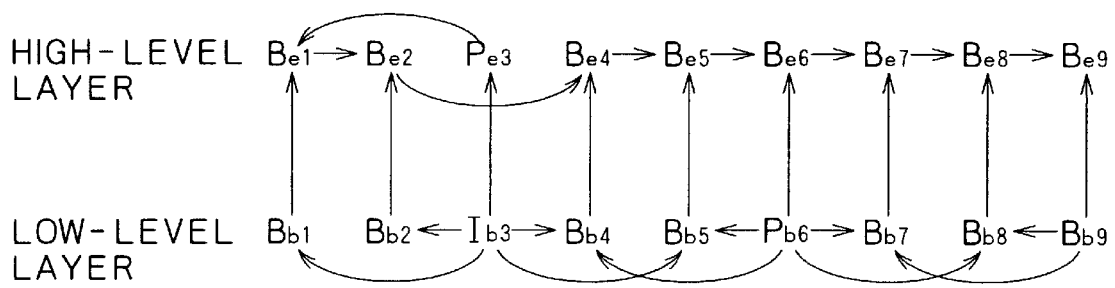
FIG. 49 is a diagram used for explaining an encoding/decoding order and reference relations for preventing a picture quality from deteriorating.

In order to prevent the quality of a picture from deteriorating as described above (or to reduce the amount of its deterioration), for the picture sequence of FIG. 45 for implementing space scalability, for example, the encoding/decoding order and the reference relations can be changed to typically those shown in FIG. 49.

In the picture structure shown in FIG. 49, when an I-VOP pertaining to the low-level layer is encoded/decoded, a P-VOP of the high-level layer displayed at a display time coinciding with the display time of the I-VOP pertaining to the low-level layer is encoded/decoded immediately after the I-VOP pertaining to the low-level layer.

Thus, in the case of the picture structure shown in FIG. 49, first of all, $I_{b3}$ displayed as a first I-VOP pertaining to the low-level layer is encoded/decoded. Then, $P_{e3}$ which is a P-VOP of the high-level layer displayed at the same time as $I_{b3}$ pertaining to the low-level layer is encoded/decoded by using $I_{b3}$ encoded/decoded immediately before as a reference picture.

Later on, $B_{b1}$ pertaining to the low-level layer is further encoded/decoded also by using $I_{b3}$ pertaining to the lower-level layer as a reference picture. Then, $B_{e1}$ pertaining to the high-level layer is encoded/decoded by using not only $B_{b1}$ pertaining to the low-level layer as a reference picture, but also $P_{e3}$ pertaining to the high-level layer as a reference picture. This is because the MPEG4 specifications prescribe that, in forward prediction of a B-VOP subjected to a space-scalable encoding process, a "most recent decoded enhancement VOP of the same layer" shall be used as a reference picture. In the picture structure shown in FIG. 49, the "most recent decoded enhancement VOP of the same layer" is $P_{e3}$.

After $B_{e1}$ pertaining to the high-level layer is encoded/decoded, $B_{b2}$ pertaining to the low-level layer is encoded/decoded by using $I_{b3}$ also pertaining to the low-level layer as a reference picture. Then, $B_{e2}$ pertaining to the high-level layer is encoded/decoded by using $B_{e1}$ pertaining to the high-level layer and $B_{b2}$ pertaining to the low-level layer as reference pictures. Subsequently, $P_{b6}$ pertaining to the low-level layer is encoded/decoded. Thereafter, much like the picture structure shown in FIG. 45, $B_{b4}$ pertaining to the low-level layer, $B_{e4}$ pertaining to the high-level layer, $B_{b5}$ pertaining to the low-level layer, $B_{e5}$ pertaining to the high-level layer, $P_{b9}$ pertaining to the low-level layer, $B_{b7}$ pertaining to the low-level layer, $B_{e7}$ pertaining to the high-level layer, $B_{b8}$ pertaining to the low-level layer, $B_{e8}$ pertaining to the high-level layer and Beg pertaining to the high-level layer are encoded/decoded in the order they are enumerated.

As described above, when an I-VOP pertaining to the low-level layer is encoded/decoded, a P-VOP of the high-level layer displayed at a display time coinciding with the display time of the I-VOP pertaining to the low-level layer is encoded/decoded immediately after the I-VOP pertaining to the low-level layer, so that a B-VOP of the high-level layer to be displayed first is encoded/decoded by using the P-VOP as a reference picture (in the picture structure shown in FIG. 49, $B_{e1}$ is encoded/decoded by using $P_{e3}$ as a reference picture). It is thus possible to prevent the quality of B-VOP displayed before a P-VOP pertaining to the high-level layer from deteriorating.

The encoder shown in FIG. 1 and the decoder shown in FIG. 13 are capable of carrying out encoding and decoding processes, respectively based on reference relations and an encoding/decoding order other than the reference relations and the encoding/decoding order shown in FIG. 49. That is to say, reference relations and encoding/decoding orders are not limited to the reference relations and the encoding/decoding order shown in FIG. 49.

It should be noted that the reference relations shown in FIG. 49 each conform to the reference relation prescribed by the ref_select_code of the MPEG4 specifications. In addition, the technique of encoding/decoding in the order shown in FIG. 49 can be applied to a space-scalable encoding process without regard to whether or not a GOV exists.

Furthermore, in an encoding/decoding process based on the reference relations shown in FIG. 49, the encoding/decoding order can be changed to the one different from the order described above. For example, after all VOPs pertaining to the low-level layer have been encoded/decoded, a VOP pertaining to the high-level layer is encoded/decoded. In the case of the picture structure shown in FIG. 49, however, a VOP pertaining to the low-level layer is used as a reference picture for encoding/decoding a VOP pertaining to the high-level layer. Thus, it may be necessary to keep a VOP pertaining to the low-level layer to be used as a reference picture for encoding/decoding a VOP pertaining to the high-level layer for a long period of time till the encoding/decoding process of the VOP pertaining to the high-level layer is completed. In order to prevent a VOP pertaining to the low-level layer to be used as a reference picture for encoding/decoding a VOP pertaining to the high-level layer from being kept for a long period of time, it is desirable to adopt an encoding/decoding order like the one described earlier by referring to FIG. 49. It should be noted that the encoding/decoding order described earlier by referring to FIG. 45 also provides the same effect as well.

In addition, in this embodiment, in order to prevent a random access made at a high speed from being hindered, as described earlier by referring to FIGS. 39 to 42, VOPs pertaining to the high-level layer are divided into GOVs so that a VOP pertaining to the high-level layer to be displayed at a time coinciding with or immediately after a display time of a VOP displayed at the beginning of a GOV pertaining to the low-level layer is displayed at the beginning of a GOV pertaining to the high-level layer.

Since the display time (expressed in terms of one-second resolution units) of a VOP in a GOV to be displayed first is set in the time_code of the GOV header, when VOPs pertaining to the high-level layer are divided into GOVs so that a VOP pertaining to the high-level layer to be displayed at a time immediately after a display time of a VOP displayed at the beginning of a GOV pertaining to the low-level layer is displayed at the beginning of a GOV pertaining to the high-level layer, a value set in the time_code in a GOV pertaining to the low-level layer (that is, the display time of the beginning of the GOV expressed in terms of one-second resolution units) may not match a value set in the time_code in a GOV of the high-level layer corresponding to the GOV pertaining to the low-level layer in some cases.

Figure 50:
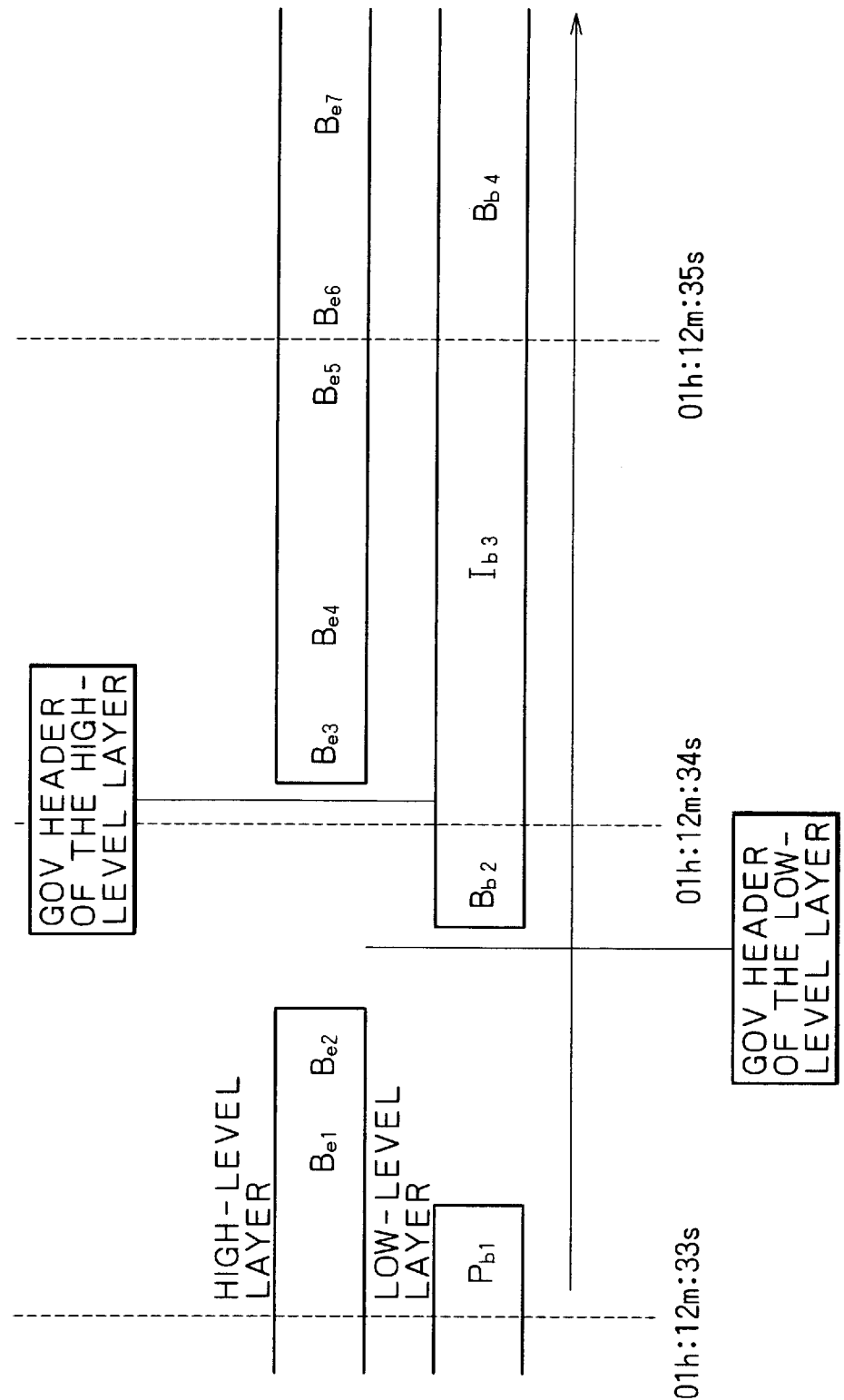
FIG. 50 is a diagram showing a state in which the time_code of the low-level layer does not match the time_code of the high-level layer.

FIG. 50 is a diagram showing typical structures of a low-level layer and a high-level layer subjected to a temporal-scalable encoding process.

As shown in FIG. 50, let $B_{b2}$ denote a VOP of a GOV pertaining to the low-level layer to be displayed first. A GOV is formed at the high-level layer, so that $B_{e3}$ of the VOP pertaining to the high-level layer to be displayed at a time immediately after the display time of $B_{b2}$ first displayed in the GOV pertaining to the low-level layer is displayed as the first VOP in the GOV pertaining to the high-level layer. In this case, the display time (expressed in terms of one-second resolution units) of $B_{b2}$ to be displayed first in the GOV pertaining to the low-level layer is set in the time_code in a header of the GOV pertaining to the low-level layer. By the same token, the display time (expressed in terms of one-second resolution units) of $B_{e3}$ to be displayed first in the GOV pertaining to the high-level layer is set in the time_code in a header of the GOV pertaining to the high-level layer.

In the picture structure shown in FIG. 50, since the display time of $Bb_2$ is a time between 01 h:12 m:33 s and 01 h:12 m:34 s whereas the display time of $B_{e3}$ is a time between 01 h:12 m:34 s and 01 h:12 m:35 s, 01 h:12 m:33 s is set in the time_code in a header of the GOV pertaining to the low-level layer whereas 01 h:12 m:34 s is set in the time_code in a header of the GOV pertaining to the high-level layer. Thus, the value set in the time_code in the GOV header pertaining to the low-level layer does not match the value set in the time_code in a header of the GOV pertaining to the high-level layer corresponding to the GOV pertaining to the low-level layer.

If a value set in the time_code in the header of a GOV pertaining to the low-level layer does not match a value set in the time_code in the header of a GOV of the high-level layer corresponding to the GOV pertaining to the low-level layer as described above, when a random access to the encoded bitstream is made, the display time of a VOP pertaining to the low-level layer is found as a time relative to a reference time expressed in terms of one-second resolution units for the low-level layer (a synchronization point marked by the time_code) while the display time of a VOP pertaining to the high-level layer is found as a time relative to a reference time expressed in terms of one-second resolution units for the high-level layer which is different from the synchronization point marked by the time_code as the reference time expressed in terms of one-second resolution units for the low-level layer.

In order to solve this problem, a value matching a value set in the time_code in the header of a GOV pertaining to the low-level layer can be set in the time_code in the header of a GOV of the high-level layer corresponding to the GOV pertaining to the low-level layer as follows.

Figure 51:
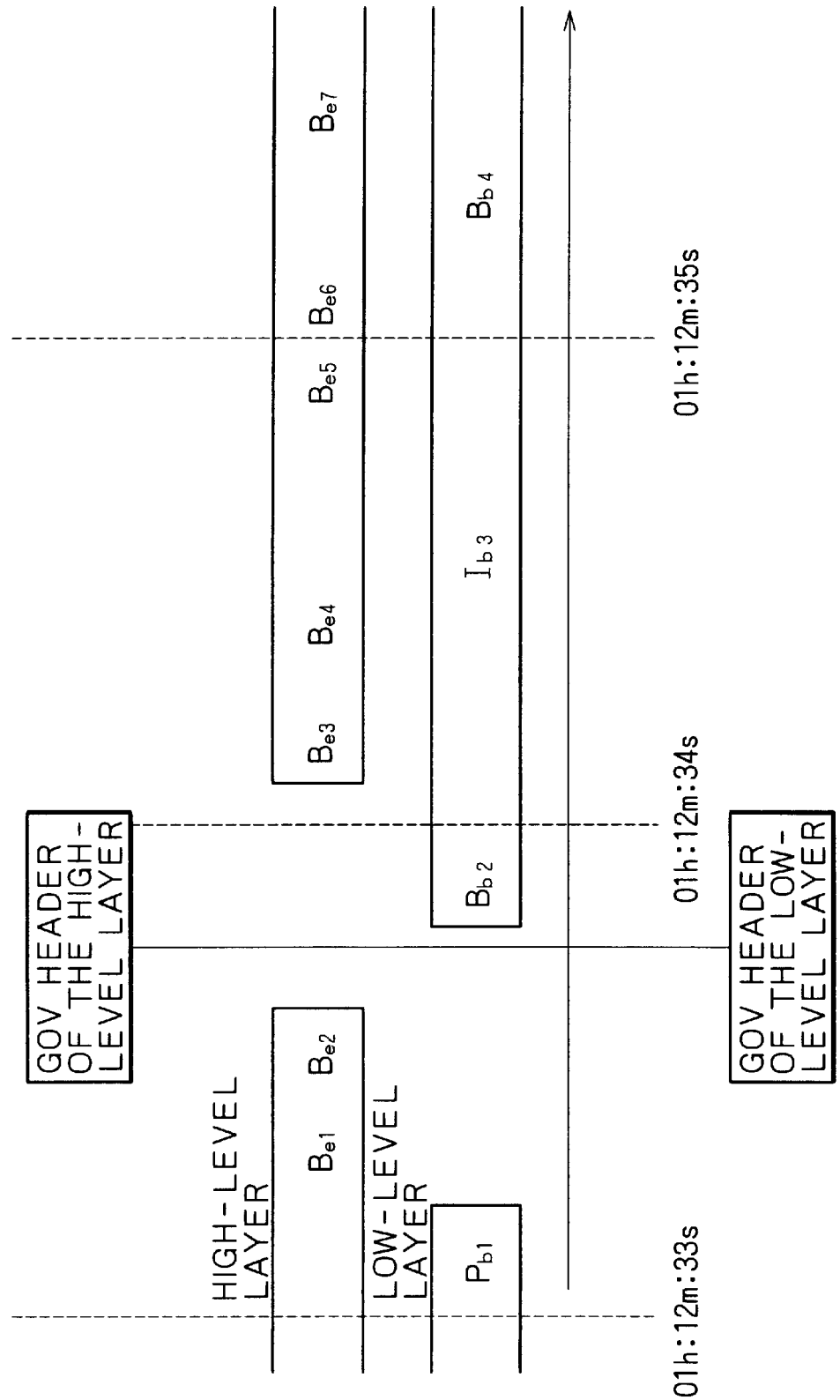
FIG. 51 is a diagram used for explaining a technique to make the time_code of the low-level layer match the time_code of the high-level layer.

FIG. 51 is a diagram showing other typical structures of a low-level layer and a high-level layer subjected to a temporal-scalable encoding process like the ones shown in FIG. 50.

Much like the picture structure shown in FIG. 50, with $B_{b2}$ denoting a VOP of a GOV pertaining to the low-level layer to be displayed first, a GOV is formed at the high-level layer so that $B_{e3}$ of the GOP pertaining to the high-level layer to be displayed at a time immediately after the display time of $B_{b2}$ first displayed in the GOV pertaining to the low-level layer is displayed as the first VOP in the GOV pertaining to the high-level layer.

Much like the picture structure shown in FIG. 50, the display time (expressed in terms of one-second resolution units) of $B_{b2}$ to be displayed first in the GOV pertaining to the low-level layer is set in the time_code in a header of the GOV pertaining to the low-level layer. Thus, 01 h:12 m:33 s is set in the time_code in the GOV header pertaining to the low-level layer.

On the other hand, a value equal to the value set in the time_code in the header of the GOV pertaining to the low-level layer is also set in the time_code in the header of the GOV pertaining to the high-level layer corresponding to the GOV pertaining to the low-level layer. Thus, 01 h:12 m:33 s is set also in the time_code in the GOV header pertaining to the high-level layer.

When a random access to the encoded bitstream of the picture structure described above is made, it is thus possible to avoid a case wherein the display time of a VOP pertaining to the low-level layer is found as a time relative to a reference time expressed in terms of one-second resolution units for the low-level layer (a synchronization point marked by the time_code) while the display time of a VOP pertaining to the high-level layer is found as a time relative to a reference time expressed in terms of one-second resolution units for the high-level layer which is different from the reference time expressed in terms of one-second resolution units for the low-level layer. That is to say, it is possible to find the display time of a VOP pertaining to the low-level layer as a time relative to a reference time expressed in terms of one-second resolution units for the low-level layer (a synchronization point marked by the time_code) and the display time of a VOP pertaining to the high-level layer as a time relative to a reference time expressed in terms of one-second resolution units for the high-level layer which always coincides with the reference time expressed in terms of one-second resolution units for the low-level layer.

It should be noted that, even if a value equal to the value set in the time_code in the GOV header pertaining to the low-level layer is also set in the time_code in the GOV header of the high-level layer corresponding to the GOV pertaining to the low-level layer, the encoder shown in FIG. 1 is capable of setting the modulo_time_base and the VOP_time_increment whereas the decoder shown in FIG. 13 is capable of finding the display time of a VOP by using the modulo_time_base and the VOP_time_increment in conjunction with the time_code as is the case in which the display time expressed in terms of one-second resolution units of a VOP to be displayed first in the GOV pertaining to the high-level layer is set in the time_code in the GOV header pertaining to the high-level layer.

The encoder and the decoder described above can each be implemented by dedicated hardware or a program executed by a computer to carry out the respective processing explained before.

Figure 52:
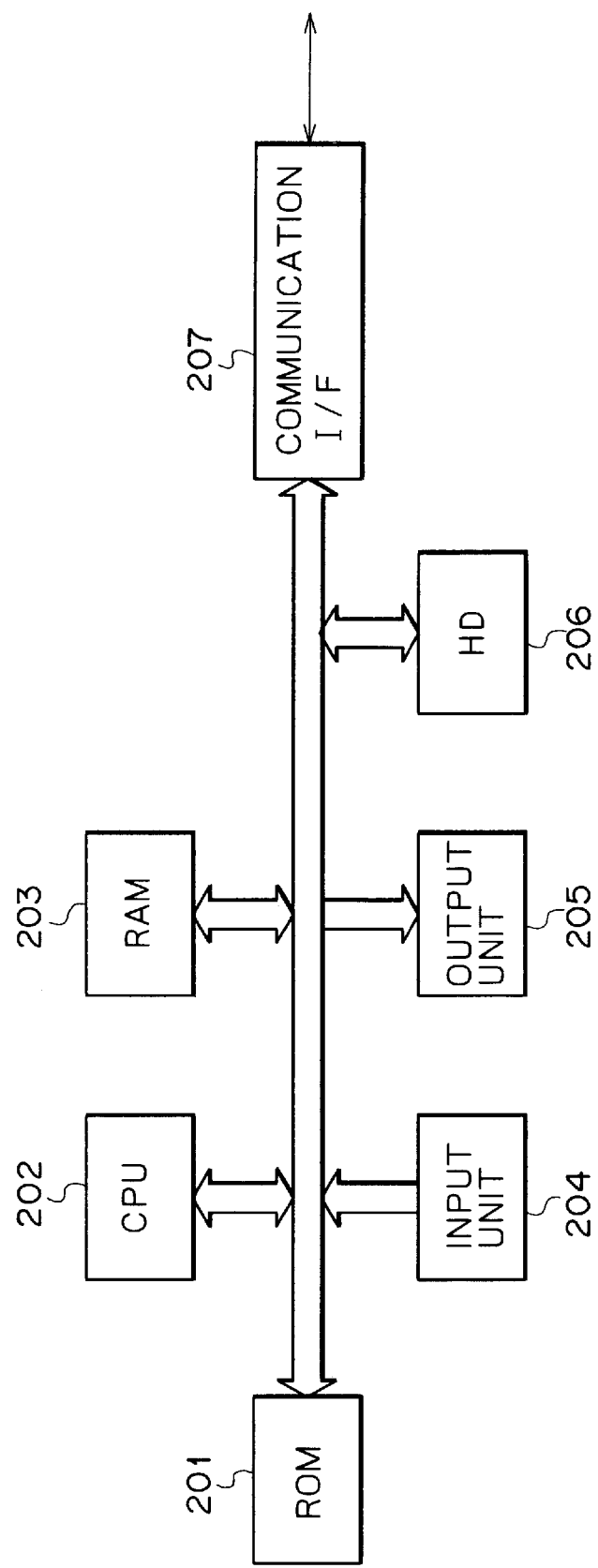
FIG. 52 is a block diagram showing a typical configuration of an embodiment implementing an encoder and a decoder to which the present invention is applied.

FIG. 52 is a block diagram showing a typical configuration of an embodiment implementing a computer functioning as the encoder shown in. FIG. 1 or the decoder shown in FIG. 13.

In the computer, a ROM (Read-Only Memory) 201 is used for storing, among others, a boot program. A CPU (Central Processing Unit) 202 loads programs stored in an HD (Hard Disc) 206 into a RAM (Random-Access Memory) 203 and executes the loaded programs to carry out various kinds of processing. The RAM 203 is used for temporarily storing the programs to be executed by the CPU 202 and data required in processing carried out by the CPU 202. An input unit 204 including typically a keyboard and a mouse is operated to enter a necessary command and necessary data. An output unit 205 which is implemented by typically a display is used for displaying data in accordance with control executed by the CPU 202. The HD 206 is used for storing also data such as picture data to be encoded, encoded data (an encoded bit stream) and decoded picture data in addition to the aforementioned programs to be executed by the CPU 202. A communication I/F (Interface) 207 controls communication with the external world for example to receive picture data to be encoded from an external source or to transmit an encoded bitstream obtained as a result of an encoding process to an external destination. In addition, the communication I/F 207 also receives an encoded bitstream encoded by an external apparatus or transmits decoded picture data to external equipment.

The CPU 202 employed in the computer with a configuration described above executes programs to carry out the processing explained before, making the computer capable of functioning as the encoder shown in FIG. 1 or the decoder shown in FIG. 13.

It should be noted that the scope of the present invention is not limited to a range conforming to the MPEG4 specifications.

What is claimed is:

1. A picture encoding apparatus for encoding a picture and outputting an encoded bitstream obtained as a result of encoding said picture comprising:

a hierarchy forming means for converting a sequence of objects composing said picture into a hierarchy comprising two or more hierarchical layers;

a first encoding means for encoding a first hierarchical layer of said sequence of objects output by said hierarchy forming means by dividing said first hierarchical layer into a plurality of groups; and a second encoding means for encoding a second hierarchical layer of said sequence of objects output by said hierarchy forming means by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

2. A picture encoding apparatus according to claim 1, wherein said first or second encoding means is capable of including a one-second resolution first-object display time representing a display time of a first displayed object in each of said groups pertaining to said first or second hierarchical layer, respectively in terms of one-second resolution units in said group.

3. A picture encoding apparatus according to claim 2, wherein in case a display time of a first displayed object in a group pertaining to said first hierarchical layer expressed in terms of one-second resolution units does not match a display time of a first displayed object in a group pertaining to said second hierarchical layer expressed in terms of one-second resolution units, said second encoding means includes said display time of said first displayed object in said group pertaining to said first hierarchical layer expressed in terms of one-second resolution units as said one-second resolution first-object display time in said group pertaining to said second hierarchical layer.

4. A picture encoding apparatus according to claim 1, wherein said first or second encoding means adds one-second resolution relative time information representing a display time of each of said objects pertaining to said first or second hierarchical layer, respectively relative to said one-second resolution first-object display time in terms of one-second resolution units to said object.

5. A picture encoding apparatus according to claim 4, wherein said second encoding means resets said one-second resolution relative time information added to any one of said objects pertaining to said second hierarchical layer in dependence on a difference in display time between said object and another object of said second hierarchical layer adjacent to said object in a display sequence.

6. A picture encoding apparatus according to claim 1, wherein said hierarchy forming means converts a sequence of objects composing a picture into a hierarchy comprising two or more hierarchical layers including said first and second hierarchical layers for enabling space scalability; and
said second encoding means encodes a sequence of objects pertaining to said second hierarchical layer in the same order as a display sequence of said objects.

7. A picture encoding method for encoding a picture and outputting an encoded bitstream obtained as a result of encoding said picture comprises the steps of:
converting a sequence of objects composing said picture into a hierarchy comprising two or more hierarchical layers;
encoding a first hierarchical layer of said sequence of objects by dividing said first hierarchical layer into a plurality of groups; and
encoding a second hierarchical layer of said sequence of objects by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

8. A picture decoding apparatus for decoding a picture comprising a receiving means for receiving an encoded bitstream and a decoding means for decoding said encoded bitstream;
wherein said encoded bitstream is obtained by executing the steps of;
converting a sequence of objects composing said picture into a hierarchy comprising two or more hierarchical layers;
encoding a first hierarchical layer of said sequence of objects by dividing said first hierarchical layer into a plurality of groups; and
encoding a second hierarchical layer of said sequence of objects by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

9. A picture decoding apparatus according to claim 8, wherein each of said groups pertaining to said first or second hierarchical layer includes a one-second resolution first-object display time representing a display time of a first displayed object in said group in terms of one-second resolution units.

10. A picture decoding apparatus according to claim 9, wherein in case a display time of a first displayed object in a group pertaining to said first hierarchical layer expressed in terms of one-second resolution units does not match a display time of a first displayed object in a group pertaining to said second hierarchical layer expressed in terms of one-second resolution units, said display time of said first displayed object in said group pertaining to said first hierarchical layer expressed in terms of one-second resolution units is included as said one-second resolution first-object display time in said group pertaining to said second hierarchical layer.

11. A picture decoding apparatus according to claim 9, wherein one-second resolution relative time information representing a display time of each of said objects pertaining to said first or second hierarchical layer relative to said one-second resolution first-object display time in terms of one-second resolution units is added to said object.

12. A picture decoding apparatus according to claim 11, wherein said one-second resolution relative time information added to any one of said objects pertaining to said second hierarchical layer is reset in dependence on a difference in display time between said object and another object of said second hierarchical layer adjacent to said object in a display sequence.

13. A picture decoding apparatus according to claim 8, wherein said sequence of objects composing a picture is converted into a hierarchy comprising two or more hierarchical layers including said first and second hierarchical layers for enabling space scalability; and a sequence of objects pertaining to said second hierarchical layer is encoded in the same order as a display sequence of said objects.

14. A picture decoding method for decoding a picture comprises the steps of receiving an encoded bitstream and decoding said encoded bitstream;
wherein said encoded bitstream is obtained by executing the steps of;
converting a sequence of objects composing said picture into a hierarchy comprising two or more hierarchical layers;
encoding a first hierarchical layer of said sequence of objects by dividing said first hierarchical layer into a plurality of groups; and
encoding a second hierarchical layer of said sequence of objects by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

15. A presentation medium for presenting an encoded bitstream obtained as a result of encoding a picture, wherein said encoded bitstream is obtained as a result of executing the steps of:
converting a sequence of objects composing said picture into a hierarchy comprising two or more hierarchical layers;
encoding a first hierarchical layer of said sequence of objects by dividing said first hierarchical layer into a plurality of groups; and
encoding a second hierarchical layer of said sequence of objects by dividing said second hierarchical layer into a plurality of groups in such a way that an object at said second hierarchical layer to be displayed at a time coinciding with or immediately after a display time of an object first displayed in a group pertaining to said first hierarchical layer is first displayed in a group pertaining to said second hierarchical layer.

16. A presentation medium according to claim 15, wherein each of said groups pertaining to said first or second hierarchical layer includes a one-second resolution first-object display time representing a display time of a first displayed object in said group in terms of one-second resolution units.

17. A presentation medium according to claim 16, wherein in case a display time of a first displayed object in a group pertaining to said first hierarchical layer expressed in terms of one-second resolution units does not match a display time of a first displayed object in a group pertaining to said second hierarchical layer expressed in terms of one-second resolution units, said display time of said first displayed object in said group pertaining to said first hierarchical layer expressed in terms of one-second resolution units is included as said one-second resolution first-object display time in said group pertaining to said second hierarchical layer.

18. A presentation medium according to claim 16, wherein one-second resolution relative time information representing a display time of each of said objects pertaining to said first or second hierarchical layer relative to said one-second resolution first-object display time in terms of one-second resolution units is added to said object.

19. A presentation medium according to claim 18, wherein said one-second resolution relative time information added to any one of said objects pertaining to said second hierarchical layer is reset in dependence on a difference in display time between said object and another object of said second hierarchical layer adjacent to said object in a display sequence.

20. A picture encoding apparatus according to claim 15, wherein said sequence of objects composing a picture is converted into a hierarchy comprising two or more hierarchical layers including said first and second hierarchical layers for enabling space scalability; and
a sequence of objects pertaining to said second hierarchical layer is encoded in the same order as a display sequence of said objects.

21. A picture encoding apparatus for encoding a picture and outputting an encoded bitstream obtained as a result of encoding said picture comprising:
a hierarchy forming means for converting a sequence of objects composing said picture into a hierarchy comprising two or more hierarchical layers;
an encoding means for dividing a first or second hierarchical layer of said sequence of objects output by said hierarchy forming means into one or more groups, for encoding each of said groups and for including a one-second resolution first-object display time representing a display time of a first displayed object of each of said groups pertaining to said first or second hierarchical layer in terms of one-second resolution units in said group;
an adding means for providing each of said objects pertaining to said first or second hierarchical layer with one-second resolution relative time information representing a display time of said object relative to said one-second resolution first-object display time in terms of one-second resolution units; and
a resetting means for resetting said one-second resolution relative time information added to any one of said objects pertaining to said second hierarchical layer in dependence on a difference in display time between said object and another object of said second hierarchical layer adjacent to said object in a display sequence.

22. A picture encoding method for encoding a picture and outputting an encoded bitstream obtained as a result of encoding said picture comprises the steps of:
converting a sequence of objects composing said picture into a hierarchy comprising two or more hierarchical layers;
dividing a first or second hierarchical layer of said sequence of objects into one or more groups, encoding each of said groups and including a one-second resolution first-object display time representing a display time of a first displayed object of each of said groups pertaining to said first or second hierarchical layer in terms of one-second resolution units in said group; and
providing each of said objects pertaining to said first or second hierarchical layer with one-second resolution relative time information representing a display time of said object relative to said one-second resolution first-object display time in terms of one-second resolution units;
wherein said one-second resolution relative time information added to any one of said object pertaining to said second hierarchical layer is reset in dependence on a difference in display time between said object and another object of said second hierarchical layer adjacent to said object in a display sequence.

23. A picture decoding apparatus for decoding a picture comprising a receiving means for receiving an encoded bitstream and a decoding means for decoding said encoded bitstream which is obtained by executing the steps of:
converting a sequence of objects composing said picture into a hierarchy comprising two or more hierarchical layers;
dividing a first or second hierarchical layer of said sequence of objects into one or more groups, encoding each of said groups and including a one-second resolution first-object display time representing a display time of a first displayed object of each of said groups pertaining to said first or second hierarchical layer in terms of one-second resolution units in said group; and
providing each of said objects pertaining to said first or second hierarchical layer with one-second resolution relative time information representing a display time of said object relative to said one-second resolution first-object display time in terms of one-second resolution units;

wherein said one-second resolution relative time information added to any one of said objects pertaining to said second hierarchical layer is reset in dependence on a difference in display time between said object and another object pertaining to said second hierarchical layer adjacent to said object in a display sequence.

24. A picture decoding method for decoding a picture comprising the steps of receiving an encoded bitstream and decoding said encoded bitstream which is obtained by executing the steps of:

said encoded bitstream is obtained by executing the steps of converting a sequence of objects composing a picture into a hierarchy comprising two or more hierarchical layers;

dividing a first or second hierarchical layer of said sequence of objects into one or more groups, encoding each of said groups and including a one-second resolution first-object display time representing a display time of a first displayed object of each of said groups pertaining to said first or second hierarchical layer in terms of one-second resolution units in said group; and providing each of said objects pertaining to said first or second hierarchical layer with one-second resolution relative time information representing a display time of said object relative to said one-second resolution first-object display time in terms of one-second resolution units;

wherein said one-second resolution relative time information added to any one of said objects pertaining to said second hierarchical layer is reset in dependence on a difference in display time between said object and another object pertaining to said second hierarchical layer adjacent to said object in a display sequence.

25. A presentation medium for presenting an encoded bitstream obtained by encoding a picture, said encoded bitstream is generated by executing the steps of:

converting a sequence of objects composing a picture into a hierarchy comprising two or more hierarchical layers;

dividing a first or second hierarchical layer of said sequence of objects into one or more groups, encoding each of said groups and including a one-second resolution first-object display time representing a display time of a first displayed object of each of said groups pertaining to said first or second hierarchical layer in terms of one-second resolution units in said group; and providing each of said objects pertaining to said first or second hierarchical layer with one-second resolution relative time information representing a display time of said object relative to said one-second resolution first-object display time in terms of one-second resolution units to said objects, wherein said one-second resolution relative time information added to any one of said objects pertaining to said second hierarchical layer is reset in dependence on a difference in display time between said object and another object pertaining to said second hierarchical layer adjacent to said object in a display sequence.

26. A picture encoding apparatus for encoding a picture and outputting an encoded bitstream comprising:

a hierarchy forming means for converting a sequence of objects composing said picture into a hierarchy comprising two or more hierarchical layers including a high-level hierarchical layer and a low-level hierarchical layer for enabling space scalability;

a first encoding means for encoding a sequence of objects pertaining to said low-level hierarchical layer output by said hierarchy forming means; and a second encoding means for encoding a sequence of objects pertaining to said high-level hierarchical layer output by said hierarchy forming means in the same order as a display sequence of said objects pertaining to said high-level hierarchical layer.

27. A picture encoding method for encoding a picture and outputting an encoded bitstream comprises the steps of:

receiving said picture;

converting a sequence of objects composing said picture into a hierarchy comprising two or more hierarchical layers including a high-level hierarchical layer and a low-level hierarchical layer for enabling space scalability; and encoding a sequence of objects pertaining to said low-level hierarchical layer as well as encoding a sequence of objects pertaining to said high-level hierarchical layer in the same order as a display sequence of said objects pertaining to said high-level hierarchical layer.

28. A picture decoding apparatus for decoding a picture comprising a receiving means for receiving an encoded bitstream and a decoding means for decoding said encoded bitstream;

wherein said encoded bitstream is obtained by executing the steps of;

converting a sequence of objects composing said picture into a hierarchy comprising two or more hierarchical layers including a high-level hierarchical layer and a low-level hierarchical layer for enabling space scalability; and encoding a sequence of objects pertaining to said low-level hierarchical layer as well as encoding a sequence of objects pertaining to said high-level hierarchical layer in the same order as a display sequence of said objects pertaining to said high-level hierarchical layer.

29. A picture decoding method for decoding a picture comprises the steps of:

receiving an encoded bitstream and decoding said encoded bitstream obtained by executing the steps of:

converting a sequence of objects composing said picture into a hierarchy comprising two or more hierarchical layers including a high-level hierarchical layer and a low-level hierarchical layer for enabling space scalability; and encoding a sequence of objects pertaining to said low-level hierarchical layer as well as encoding a sequence of objects pertaining to said high-level hierarchical layer in the same order as a display sequence of said objects pertaining to said high-level hierarchical layer.

30. A presentation medium for presenting an encoded bitstream obtained as a result of encoding a picture;

wherein said encoded bitstream is generated by executing the steps of;

converting a sequence of objects composing said picture into a hierarchy comprising two or more hierarchical layers including a high-level hierarchical layer and a low-level hierarchical layer for enabling space scalability; and encoding a sequence of objects pertaining to said low-level hierarchical layer as well as encoding a sequence of objects pertaining to said high-level hierarchical layer in the same order as a display sequence of said objects pertaining to said high-level hierarchical layer.

* * * * *